United States Patent
Suzuki

(10) Patent No.: US 11,175,129 B2
(45) Date of Patent: Nov. 16, 2021

(54) SAMPLE SHAPE MEASURING METHOD AND SAMPLE SHAPE MEASURING APPARATUS

(71) Applicant: OLYMPUS CORPORATION, Tokyo (JP)

(72) Inventor: Yoshimasa Suzuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 633 days.

(21) Appl. No.: 16/150,339

(22) Filed: Oct. 3, 2018

(65) Prior Publication Data
US 2019/0041198 A1 Feb. 7, 2019

Related U.S. Application Data

(63) Continuation of application No. PCT/JP2017/006304, filed on Feb. 21, 2017.

(30) Foreign Application Priority Data

Apr. 5, 2016 (WO) .................. PCT/JP2016/061113

(51) Int. Cl.
*G01B 11/26* (2006.01)
*G01B 11/24* (2006.01)
(Continued)

(52) U.S. Cl.
CPC .............. *G01B 11/26* (2013.01); *G01B 11/24* (2013.01); *G01B 11/30* (2013.01); *G01N 21/17* (2013.01);
(Continued)

(58) Field of Classification Search
CPC ............ G02B 21/0032; G02B 21/0052; G02B 21/0056; G02B 21/06; G02B 21/086;
(Continued)

(56) References Cited

U.S. PATENT DOCUMENTS 5,606,174 A 2/1997 Yoshimura et al.
9,291,450 B2 3/2016 Takahashi
(Continued)

FOREIGN PATENT DOCUMENTS

JP H07-318325 A 12/1995
JP 2005-181282 A 7/2005
(Continued)

OTHER PUBLICATIONS

Suzuki, Yoshimasa et al., "Method for observing phase objects without halos or directional shadows," Mar. 1, 2015, Optics Letters, vol. 40, No. 5, pp. 812-815. (Year: 2015).*

(Continued)

*Primary Examiner* — Gordon J Stock, Jr.

(74) *Attorney, Agent, or Firm* — Scully, Scott, Murphy & Presser, P.C.

(57) ABSTRACT

A sample shape measuring method includes a step of preparing illumination light that is to be passed through a predetermined illumination region, a step of irradiating the illumination light to a sample, and a predetermined processing step. The predetermined illumination region is set such that an area of a region of the illumination light passing through a pupil of an observation optical system is smaller than an area of the pupil of the observation optical system. The predetermined processing step includes a step of receiving light emerged from the observation optical system, a step of computing a position of an image of the predetermined illumination region from light received, a step of computing a difference between the position of the image of the predetermined illumination region and a reference position, and a step of calculating an amount of inclination at a surface of the sample, from the difference calculated.

19 Claims, 38 Drawing Sheets

(51) Int. Cl.
    *G01B 11/30*     (2006.01)
    *G02B 21/06*     (2006.01)
    *G01N 21/17*     (2006.01)
    *G02B 21/00*     (2006.01)
    *G02B 21/08*     (2006.01)

(52) U.S. Cl.
    CPC ......... *G02B 21/0032* (2013.01); *G02B 21/06* (2013.01); *G02B 21/086* (2013.01)

(58) Field of Classification Search
    CPC ...... G02B 21/12; G02B 21/14; G02B 21/244; G02B 21/36; G02B 21/361; G02B 21/367; G02B 27/0018; G01B 9/02043; G01B 9/04; G01B 11/24; G01B 11/25; G01B 11/2518; G01B 11/26; G01B 11/30; G01B 11/303; G01B 11/306
    See application file for complete search history.

(56) References Cited

U.S. PATENT DOCUMENTS

| | | | | |
|---|---|---|---|---|
| 10,133,050 | B2* | 11/2018 | Suzuki | G02B 5/005 |
| 10,302,928 | B2* | 5/2019 | Suzuki | G02B 21/365 |
| 10,310,247 | B2* | 6/2019 | Suzuki | G02B 21/12 |
| 10,458,781 | B2* | 10/2019 | Odaira | G01B 11/26 |
| 10,458,785 | B2* | 10/2019 | Suzuki | G01B 11/26 |
| 10,539,411 | B2* | 1/2020 | Odaira | G01B 11/26 |
| 10,697,764 | B2* | 6/2020 | Odaira | G01B 11/24 |
| 10,705,325 | B2* | 7/2020 | Suzuki | G02B 21/24 |
| 10,754,139 | B2* | 8/2020 | Ishiwata | H04N 13/254 |
| 10,983,055 | B2* | 4/2021 | Suzuki | G01N 21/6458 |
| 2013/0293698 | A1 | 11/2013 | Yoshida | |
| 2014/0152794 | A1 | 6/2014 | Takahashi | |
| 2016/0357002 | A1 | 12/2016 | Suzuki et al. | |

FOREIGN PATENT DOCUMENTS

| | | |
|---|---|---|
| JP | 2006-337113 A | 12/2006 |
| JP | 2008-020498 A | 1/2008 |
| JP | 2009-008643 A | 1/2009 |
| JP | 2009-168582 A | 7/2009 |
| JP | 2012-093225 A | 5/2012 |
| JP | 2014-109492 A | 6/2014 |
| JP | 2015-158570 A | 9/2015 |
| WO | 2012/096153 A1 | 7/2012 |

OTHER PUBLICATIONS

International Preliminary Report on Patentability together with the Written Opinion from related International Application No. PCT/JP2017/006304 dated Oct. 18, 2018.

International Search Report dated May 16, 2017 issued in PCT/JP2017/006304.

* cited by examiner

SAMPLE SHAPE MEASURING METHOD AND SAMPLE SHAPE MEASURING APPARATUS

CROSS-REFERENCE TO RELATED APPLICATION

The present application is a continuation application of International Application No. PCT/JP2017/006304 filed on Feb. 21, 2017, which is based upon and claims the benefit of priority from International Application No. PCT/JP2016/061113 filed on Apr. 5, 2016; the entire contents of which are incorporated herein by reference.

BACKGROUND OF THE INVENTION

Field of the Invention

The present invention relates to a method and an apparatus for measuring an inclination and a shape at a surface of a sample.

Description of the Related Art

As an apparatus for measuring a three-dimensional shape of a sample, an apparatus disclosed in Japanese Patent Application Laid-open Publication No. 2014-109492 and an apparatus disclosed in Japanese Patent Application Laid-open Publication No. 2008-20498 are available.

In the apparatus disclosed in Japanese Patent Application Laid-open Publication No. 2014-109492, the three-dimensional shape of a sample is measured by a fringe projection method. In the apparatus disclosed in Japanese Patent Application Laid-open Publication No. 2014-109492, an image pickup mean includes a light-projecting portion, a light receiving portion, an illumination light output portion, a stage, and a measurement control section. The light-projecting portion included a pattern generating portion, and a pattern generated in the pattern generating portion is irradiated to a sample. The pattern irradiated to the sample is captured by the light receiving portion, and accordingly, a fringe image is achieved. In the apparatus disclosed in Japanese Patent Application Laid-open Publication No. 2014-109492, the three-dimensional shape of a sample is measured by using the fringe image.

In the apparatus disclosed in Japanese Patent Application Laid-open Publication No. 2008-20498, a phenomenon in which a contrast of an image becomes high at the defocused position of a focal position than at the position of the focused focal point. This phenomenon occurs due to interference of non-diffracted light and diffracted light. In the apparatus disclosed in Japanese Patent Application Laid-open Publication No. 2008-20498, a difference image is achieved from images in front and at back of the position of the focused focal point. Thereafter, a contrast value of the difference image is calculated, and a position at which the contract value becomes the maximum is let to be the position of the focused focal point. In the apparatus disclosed in Japanese Patent Application Laid-open Publication No. 2008-20498, by detecting the position of the focused focal point for each position on a sample surface, it is possible to measure the three-dimensional shape of the sample.

SUMMARY OF THE INVENTION

To solve the abovementioned problems and to achieve the object, a sample shape measuring method comprises:

a step of preparing illumination light that is to be passed through a predetermined illumination region,
a step of irradiating the illumination light to a sample, and
a predetermined processing step, wherein
the predetermined illumination region is set such that an area of a region of the illumination light passing through a pupil of an observation optical system is smaller than an area of the pupil of the observation optical system, and
the illumination light is transmitted through the sample, and
light emerged from the sample is incident on the observation optical system, and
the predetermined processing step includes
a step of receiving light emerged from the observation optical system,
a step of computing a position of an image of the predetermined illumination region from light received,
a step of computing a difference between the position of the image of the predetermined illumination region and a reference position, and
a step of calculating an amount of inclination at a surface of the sample, from the difference computed.

Moreover, a sample shape measuring apparatus of the present invention comprises:
an illuminating optical system,
an observation optical system,
a holding member,
a detection element, and
a processing unit, wherein
the illuminating optical system includes a light source, a condenser lens, and an optical member which forms a predetermined illumination region, and
the observation optical system includes an objective lens, and
the holding member holds a sample and is disposed between the illuminating optical system and the observation optical system, and
the optical member is disposed on a light source side of the condenser lens, and
the predetermined illumination region is set such that an area of a region of the illumination light passing through a pupil of the observation optical system is smaller than an area of the pupil of the observation optical system, and
illumination light irradiated to the sample by the illuminating optical system is transmitted through the sample, and
light emerged from the sample is incident on the observation optical system, and
the detection element receives light emerged from the observation optical system, and
the processing unit
computes a position of an image of the predetermined illumination region from light received, and
computes a difference between the position of the image of the predetermined illumination region and a reference position, and
calculates an amount of inclination at a surface of the sample, from the difference computed.

Moreover, another sample shape measuring apparatus of the present invention comprises:
an illuminating optical system,
an observation optical system,
a holding member,
a detection element, and
a processing unit, wherein
the illuminating optical system includes a light source, a condenser lens, and an optical member which forms a predetermined illumination region, and the observation optical system includes an objective lens, and the holding member holds a sample and is disposed between the illuminating optical system and the observation optical system, and the detection element is disposed at one of a pupil position of the observation optical system and a position conjugate with the pupil position of the observation optical system, and the optical member is disposed on a light source side of the condenser lens, and the predetermined illumination region is set not to include an optical axis at a pupil position of the illuminating optical system and is set such that illumination light is irradiated to a portion at an inner side of a pupil of the observation optical system and to an outer edge of the pupil of the observation optical system, at the pupil position of the observation optical system, and the illumination light irradiated to the sample by the illuminating optical system is transmitted through the sample, and light emerged from the sample is incident on the observation optical system, and the detection element receives light emerged from the observation optical system, and the processing unit calculates a quantity of light based on light received, and computes one of a difference between the quantity of light and a reference light quantity and a ratio of the quantity of light and the reference light quantity, and calculates an amount of inclination at a surface of the sample, from one of the difference and the ratio.

Moreover, still another sample shape measuring apparatus of the present invention comprises:

an illuminating optical system, an observation optical system, a holding member, a detection element, and a processing unit, wherein the illuminating optical system includes a planar light source, a condenser lens, and an optical member which forms a predetermined illumination region, and the observation optical system includes an objective lens, a collecting lens, and a micro lens array, and the holding member holds a sample and is disposed between the illuminating optical system and the observation optical system, and the optical member is disposed on a planar light source side of the condenser lens, and the predetermined illumination region is set such that an area of a region of the illumination light passing through a pupil of the observation optical system is smaller than an area of the pupil of the observation optical system, and the micro lens array is disposed at a position conjugate with the sample, and the detection element is disposed at a position conjugate with the pupil of the observation optical system, and illumination light irradiated to the sample by the illuminating optical system is transmitted through the sample, and light emerged from the sample is incident on the observation optical system, and a plurality of optical regions is formed on the detection element by the micro lens array, and the detection element receives light of the overall optical region for each optical region, and the processing unit computes a position of the optical region for each optical region, and computes a difference between the position of the optical region and a reference position, for each optical region, and calculates an amount of inclination at a surface of the sample from the difference calculated.

DETAILED DESCRIPTION OF THE INVENTION

Embodiments and examples of a sample shape measuring method and sample shape measuring apparatus will be described below in detail by referring to the accompanying diagrams. However, the present invention is not restricted to the embodiments and the examples described below.

Figure 1:
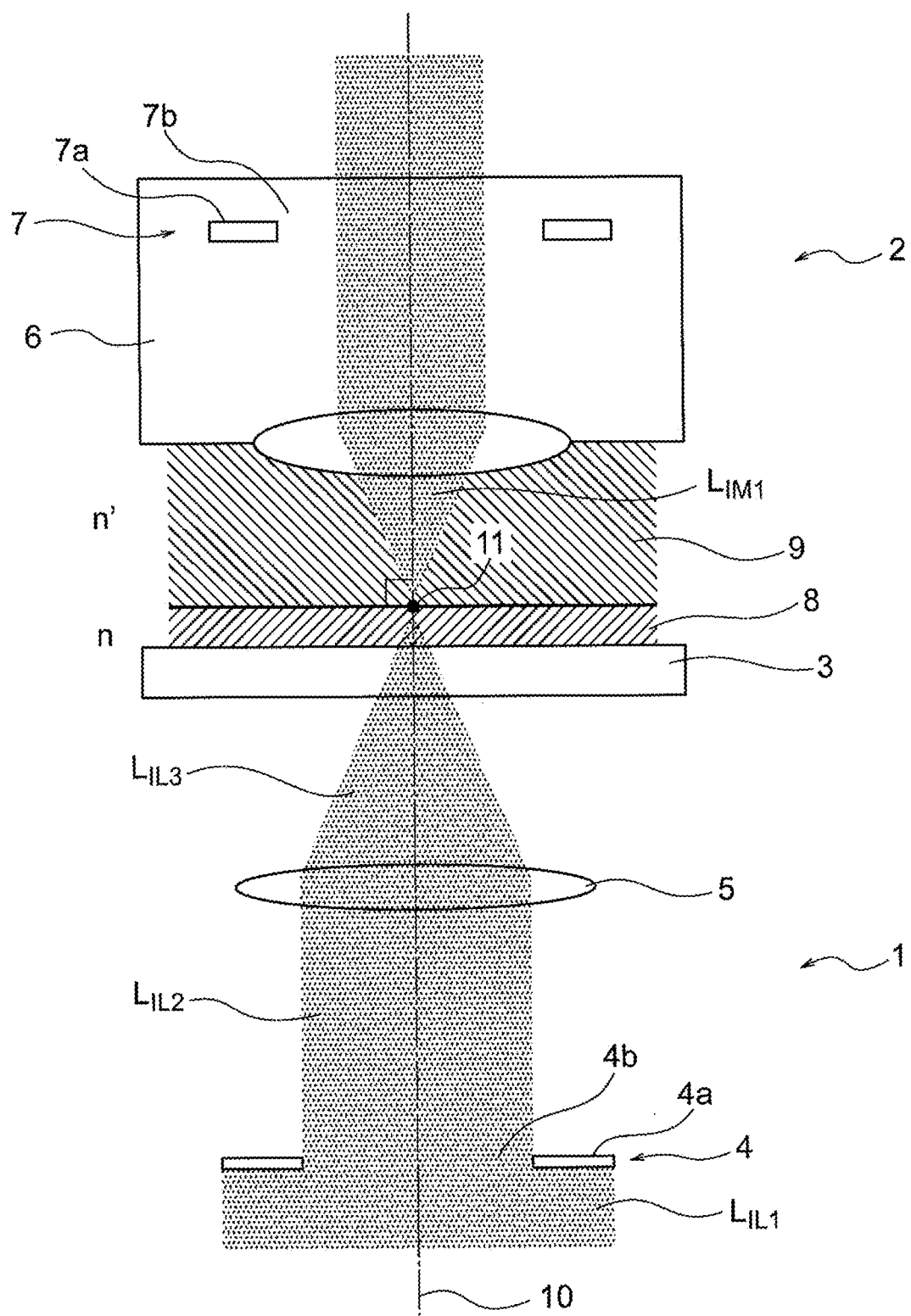
FIG. 1 is a diagram showing an appearance of illumination light and an appearance of image forming light in a first state.

A measurement principle in a sample shape measuring method of the present embodiment will be described below. Firstly, a relationship of illumination light and image forming light in a first state will be described below. FIG. 1 is a diagram showing an appearance of the illumination light and an appearance of the image forming light in the first state. In the first state, a surface of a sample is flat, and a normal of the surface of the sample (hereinafter, referred to as 'normal of the surface') is parallel to an optical axis.

As shown in FIG. 1, an illuminating optical system 1 and an observation optical system 2 are disposed so as to face each other across a stage 3. The illuminating optical system 1 includes a light shielding member 4 and a condenser lens 5. The observation optical system 2 includes an objective lens 6. The objective lens 6 has a stop 7.

A rectangular metallic plate is used for the light shielding member 4. The light shielding member 4 includes a light shielding region 4a and a transmitting region 4b. The light shielding region 4a is formed by a metallic plate, and nothing exists in the transmitting region 4b.

The transmitting region 4b is formed at a central portion of the light shielding member 4. The light shielding member 4 is disposed such that the central portion includes an optical axis 10. Accordingly, the optical axis 10 is not included in the light shielding region 4a but is included in the transmitting region 4b.

By the light shielding member 4 being disposed in an optical path, illumination light $L_{IL1}$ is divided into light shielded by the light shielding region 4a and light passing through the transmitting region 4b. In the illumination light $L_{IL1}$, distribution of light intensity in a plane orthogonal to the optical axis is assumed to be uniform.

A transparent plate may be used for the light shielding member 4. In this case, the light shielding region 4a is formed by applying a light shielding paint or by affixing a light shielding member. Whereas, no light shielding paint is applied and no light shielding member is affixed to the transmitting region 4b. Therefore, only a transparent plate exists in the transmitting region 4b.

The stop 7 includes a light shielding portion 7a and a transmitting portion 7b. A circular metallic plate or a transparent plate is used for the stop 7. In a case in which a metallic plate is used for the stop 7, the light shielding portion 7a is a metallic plate and the transmitting portion 7b is a hole cut in the metallic plate. In a case in which a transparent plate is used for the stop 7, the light shielding portion 7a is formed by applying a light shielding paint or by affixing a light shielding member. Only a transparent plate exists in the transmitting portion 7b.

The stop 7 is optically equivalent to a pupil of the objective lens 6. Therefore, a member such as the above-mentioned metallic plate or transparent plate which restricts passing of a light beam may not exist at a position of the stop 7.

A sample 8 is placed on the stage 3. A space between the sample 8 and the objective lens 6 is filled with a liquid immersion medium (hereinafter, referred to as 'liquid immersion 9'). Here, the sample 8 is let to be a liquid of a refractive index n and the liquid immersion 9 is let to be a liquid of a refractive index n'. Moreover, n is greater than n' (n>n').

The illumination light $L_{IL1}$ is a parallel light beam and is formed such that the optical axis 10 is included in the light beam. The illumination light $L_{IL1}$ travels toward the sample 8 following an optical path of the illuminating optical system 1. The light shielding member 4 and the condenser lens 5 are disposed in the optical path of the illuminating optical system 1.

Figure 2A:
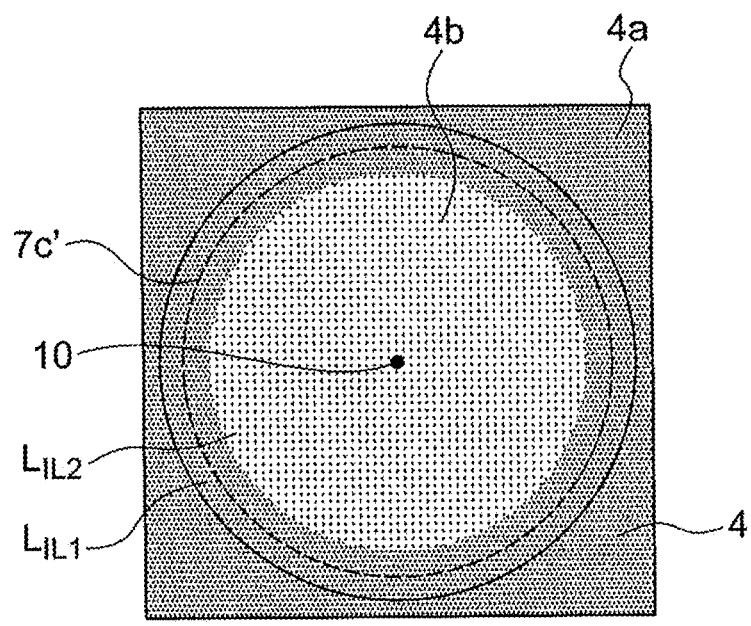
FIG. 2A is a diagram showing an appearance of the illumination light in the first state.

FIG. 2A is a diagram showing an appearance of the illumination light in the first state. In FIG. 2A, a region of the illumination light $L_{IL1}$ is indicated by a circle depicted by solid line. The illumination light $L_{IL1}$ is divided into light shielded by the light shielding region 4a and light passing through the transmitting region 4b. The light shielding member 4 is disposed such that the transmitting region 4b includes the optical axis 10. Therefore, the optical axis 10 is not included in the light shielding region 4a. When illumination light $L_{IL2}$ passes through the transmitting region 4b, a shape of the region of the illumination light $L_{IL2}$ becomes circular.

A position of the light shielding member 4 is conjugate with a position of the stop 7 due to the condenser lens 5 and the objective lens 6. Therefore, an image of the stop 7 is formed at the position of the light shielding member 4. In FIG. 2A, a boundary line image 7c' formed at the position of the light shielding member 4 is shown by a dashed line. The boundary line image 7c' is an image of a boundary line 7c between the light shielding portion 7a and the transmitting portion 7b. The boundary line image 7c' is a circular image depicted by the dashed line. The boundary line image 7c' is also an image of an outer edge of the pupil of the objective lens 6.

As shown in FIG. 2A, the circle depicting the region of the illumination light $L_{IL2}$ is smaller than the circle depicting the boundary line image 7c'. This signifies that a light beam diameter of the illumination light $L_{IL2}$ is set to illuminate a region narrower than a region of an image of the transmitting portion 7b.

The description will be continued by returning to FIG. 1. The illumination light $L_{IL2}$ passed through the transmitting region 4b is incident on the condenser lens 5. The illumination light $L_{IL2}$ incident on the condenser lens 5 is collected by the condenser lens 5. Illumination light $L_{IL3}$ is emerged from the condenser lens 5. The illumination light $L_{IL3}$ is incident on an observation point 11 on the sample 8. Accordingly, the observation point 11 is illuminated.

The illumination light $L_{IL3}$ passes through the sample 8. As mentioned above, in the first state, the normal of the plane is parallel to the optical axis. In a state of the normal of the plane parallel to the optical axis, the surface of the sample is not inclined. In a case in which the surface of the sample is not inclined, a light ray (hereinafter, referred to as 'central light ray $L_{ILC}$') travelling on the optical axis 10 of the illumination light $L_{IL3}$ is not refracted at the surface of the sample 8.

Light emerged from the sample 8 (hereinafter, referred to as 'image forming light $L_{IM1}$') reaches the objective lens 6. As shown in FIG. 2A, the region of the illumination light $L_{IL2}$ is narrower than the region of the image of the transmitting portion 7b. In this case, all of the image forming light $L_{IL2}$ which has reached the objective lens 6 is incident on the objective lens 6. The image forming light $L_{IM1}$ incident on the objective lens 6 passes through the stop 7 without being shielded by the light shielding portion 7b.

Figure 2B:
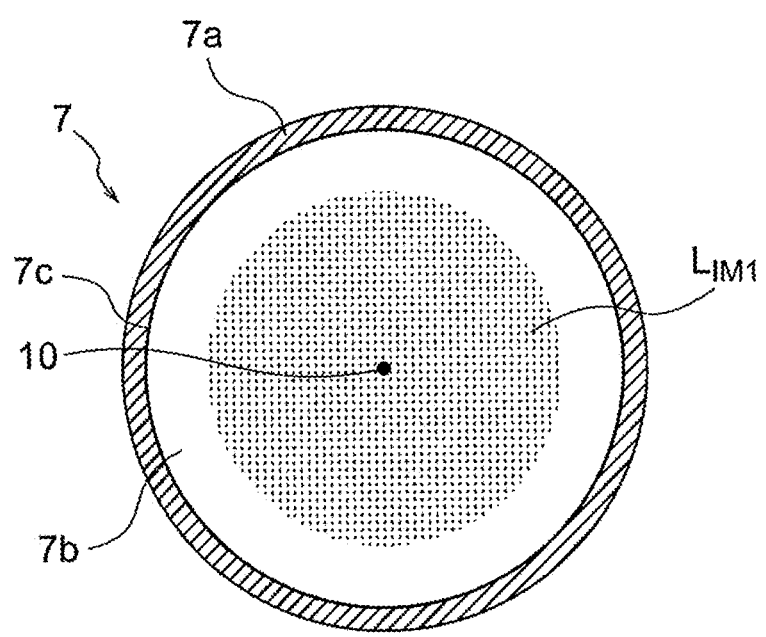
FIG. 2B is a diagram showing an appearance of the image forming light in the first state.

FIG. 2B is a diagram showing an appearance of the image forming light in the first state. As shown in FIG. 2B, an area of the image forming light $L_{IM1}$ is smaller than an area of the transmitting portion 7b. The image forming light $L_{IM1}$ is positioned at an inner side of the transmitting portion 7b.

Moreover, in the first state, the surface of the sample 8 is not inclined. In this case, the central light ray $L_{ILC}$ is not refracted at the surface of the sample 8. Therefore, a light ray corresponding to the central light ray $L_{ILC}$ (hereinafter, referred to as 'central light ray $L_{IMC}$') in the image forming light $L_{IM1}$ travels on the optical axis 10. When the central light ray $L_{IMC}$ is deemed as a center of the image forming light $L_{IM1}$, in the first state, a center of the image forming light $L_{IM1}$ coincides with the optical axis 10.

Figure 3:
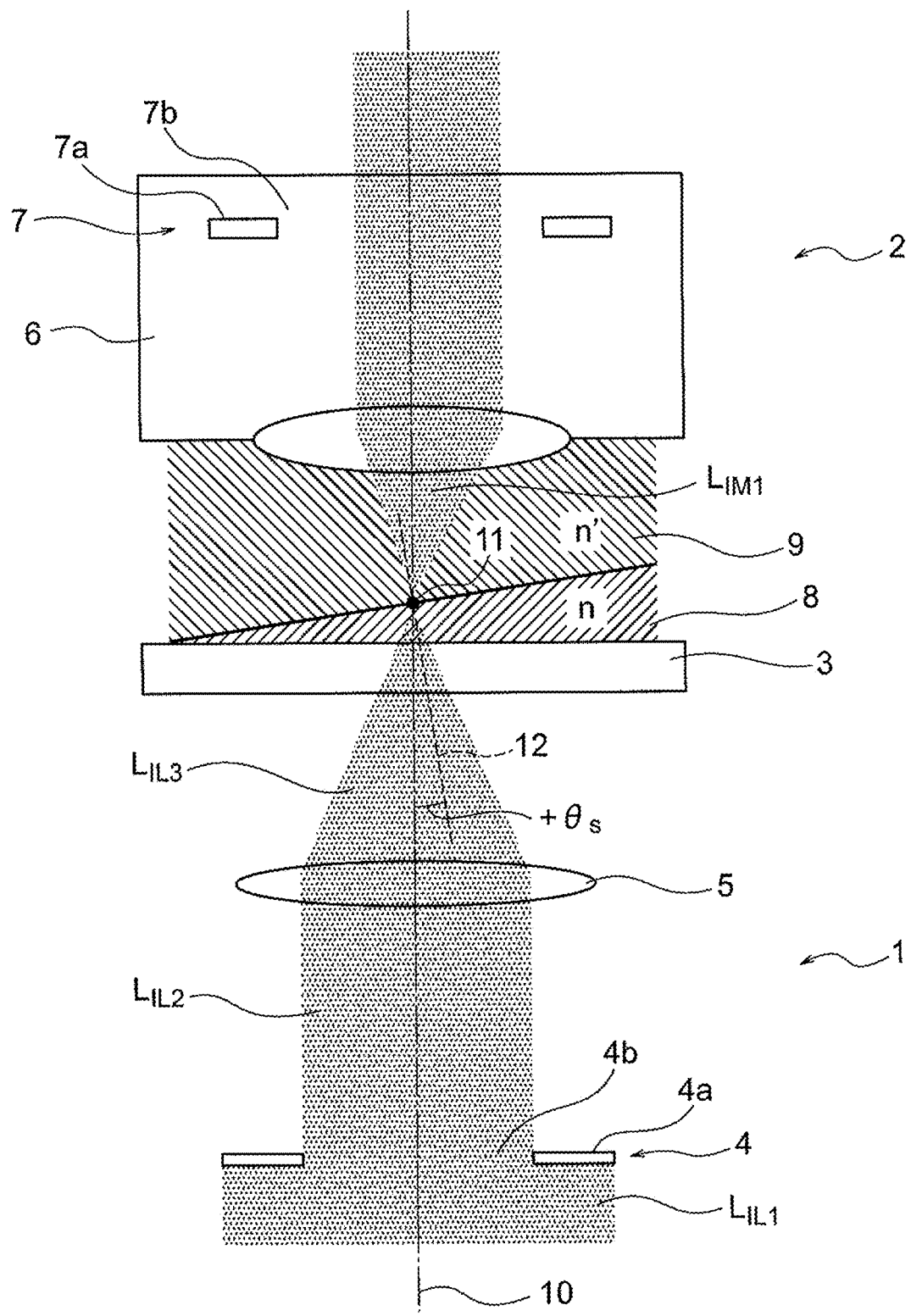
FIG. 3 is a diagram showing an appearance of illumination light and an appearance of image forming light in a second state.

Next, a relationship of illumination light and image forming light in a second state will be described below. FIG. 3 is a diagram showing an appearance of the illumination light and an appearance of the image forming light in the second state. In the second state, the surface of the sample is flat, but a normal of the plane is nonparallel to the optical axis.

As shown in FIG. 3, since an angle made by a normal 12 of the plane and the optical axis 10 is $\theta_s$, the surface of the sample 8 is inclined by an angle of inclination $\theta_s$. Regarding the sign of the angle, with reference to the optical axis 10, when the normal 12 of the plane is positioned in a counterclockwise direction, the angle is let to be positive, and when the normal 12 of the plane is positioned in a clockwise direction, the angle is let to be negative. In the second state, $\theta_s$ is a positive value.

Even in the second state, the illumination is carried out similarly as in the first state. The illumination light $L_{IL3}$ is incident on the observation point 11 on the sample 8. Accordingly, the observation point 11 is illuminated.

The illumination light $L_{IL3}$ is transmitted through the sample 8. As mentioned above, in the second state, the normal of the plane is nonparallel to the optical axis. In a state of the normal of the plane nonparallel to the optical axis, the surface of the sample is inclined. When the surface of the sample is inclined, the central light ray $L_{ILC}$ is refracted at the surface of the sample 8.

The image forming light $L_{IM1}$ emerged from the sample 8 reaches the objective lens 6. As shown in FIG. 2A, the region of the illumination light $L_{IL2}$ is narrower than the region of the image of the transmitting portion 7b. In this case, all of the image forming light $L_{IM1}$ that has reached the objective lens 6 is incident on the objective lens 6. The image forming light $L_{IM1}$ incident on the objective lens 6 passes through the stop 7 without being shielded at the light shielding portion 7b.

Figure 4A:
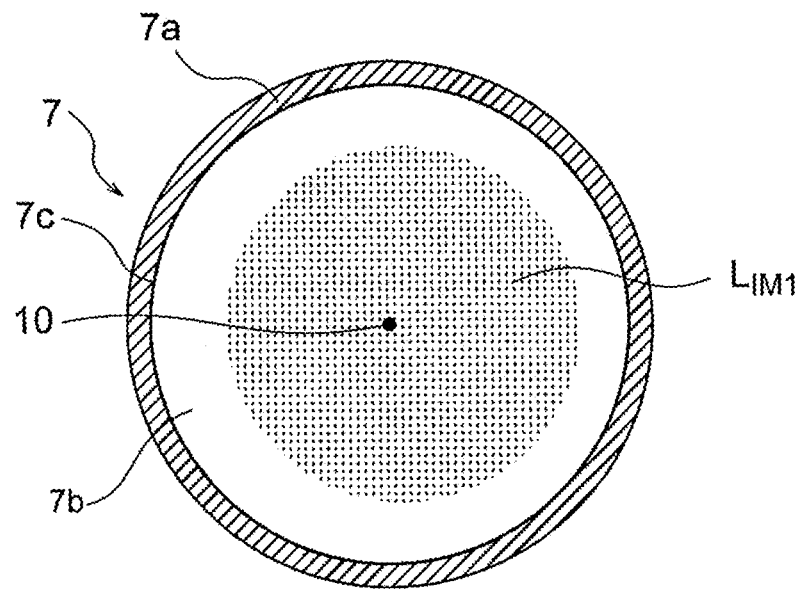
FIG. 4A is a diagram showing an appearance of the image forming light in the second state.
Figure 4B:
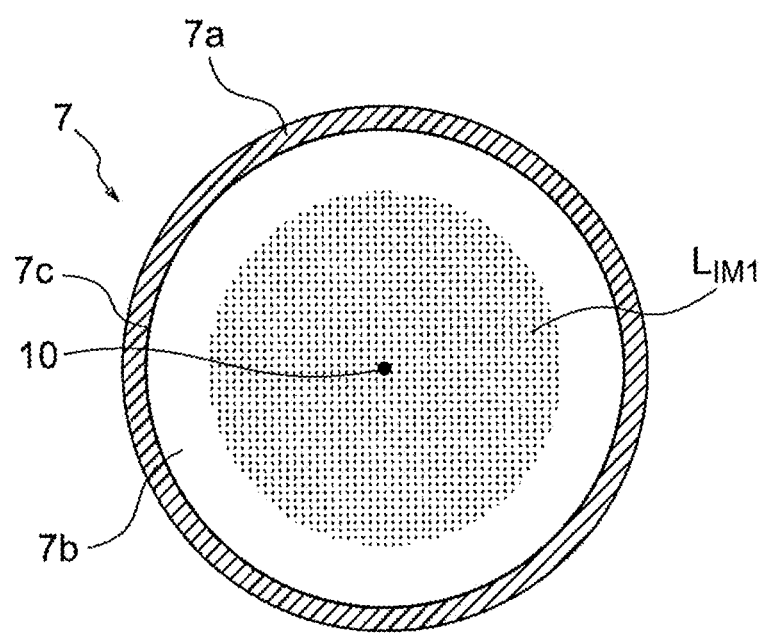
FIG. 4B is a diagram showing an appearance of the image forming light in the first state.

FIG. 4A is a diagram showing an appearance of the image forming light in the second state. For comparison, the appearance of the image forming light in the first state is shown in FIG. 4B. As shown in FIG. 4A, the area of the image forming light $L_{IM1}$ is smaller than the area of the transmitting portion 7b. The image forming light $L_{IM1}$ is positioned at the inner side of the transmitting portion 7b.

Moreover, in the second state, the surface of the sample 8 is inclined at an angle of inclination $+\theta_s$. In this case, the central light ray $L_{ILC}$ is refracted at the surface of the sample 8. Therefore, the central light ray $L_{IMC}$ travels in a direction away from the optical axis 10. As a result, in the second state, the center of the image forming light $L_{IM1}$ does not coincide with the optical axis 10.

As it is evident from the comparison of FIG. 4A and FIG. 4B, the center of the image forming light $L_{IM1}$ in the second state is shifted in the direction away from the optical axis 10 than the center of the image forming light $L_{IM1}$ in the first state. Moreover, in the second state, the direction of shifting is a rightward direction on a paper surface.

Figure 5:
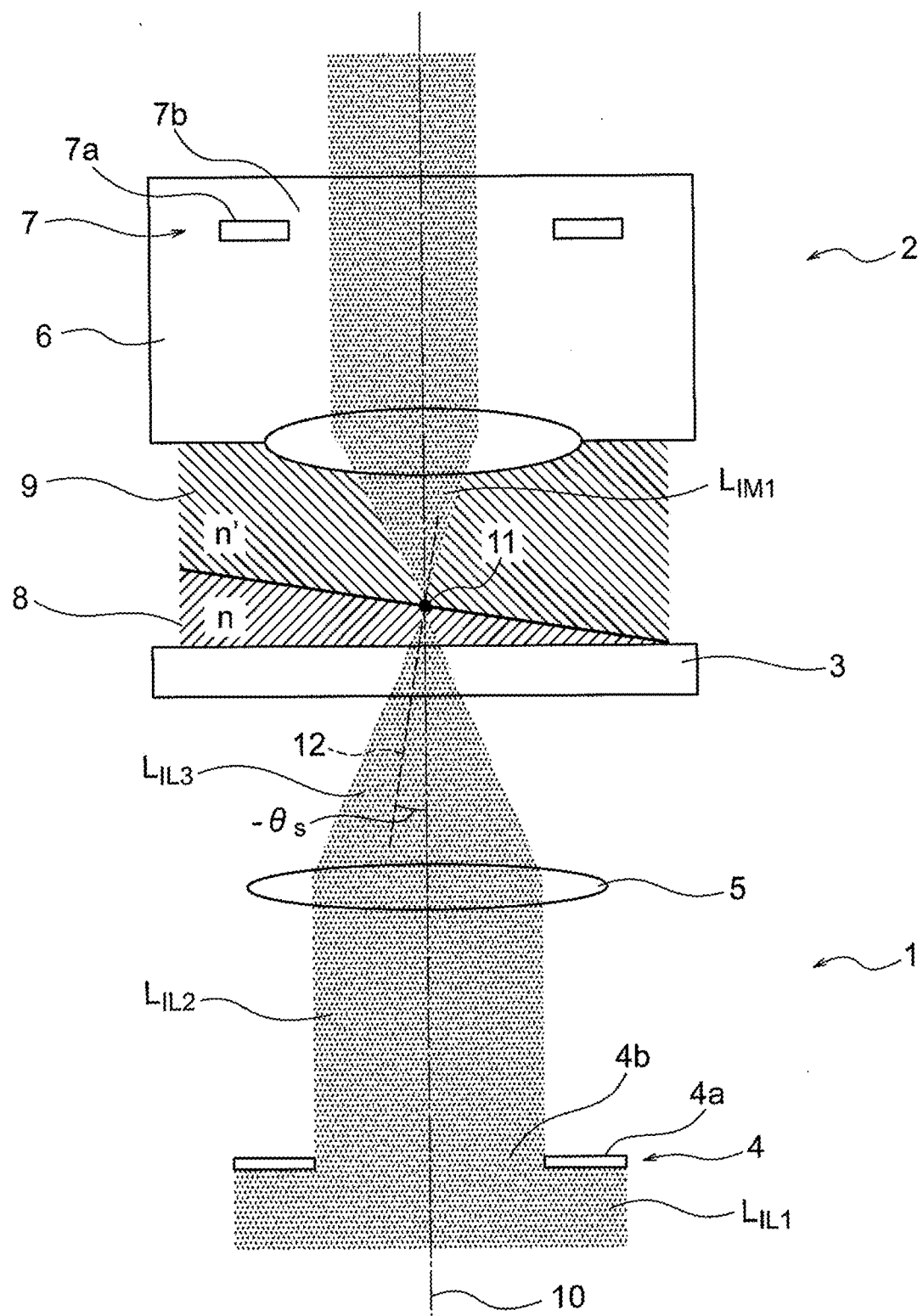
FIG. 5 is a diagram showing an appearance of illumination light and an appearance of image forming light in a third state.

Next, a relationship of illumination light and image forming light in a third state will be described below. FIG. 5 is a diagram showing an appearance of the illumination light and an appearance of the image forming light in the third state. In the third state, the surface of the sample is flat, but a normal of the plane is nonparallel to the optical axis.

As shown in FIG. 5, since the angle made by the normal 12 of the plane and the optical axis 10 is $\theta_s$, the surface of the sample 8 is inclined by the angle of inclination $\theta_s$. Unlike in the second state, in the third state, $\theta_s$ is a negative value.

Even in the third state, the illumination is carried out similarly as in the first state. The illumination light $L_{IL3}$ is incident on the observation point 11 on the sample 8. Accordingly, the observation point 11 is illuminated.

The illumination light $L_{IL3}$ is transmitted through the sample 8. As mentioned above, in the third state, the normal of the plane is nonparallel to the optical axis. In a state of the normal of the plane nonparallel to the optical axis, the surface of the sample is inclined. When the surface of the sample is inclined, the central light ray $L_{ILC}$ is refracted at the surface of the sample 8.

The image forming light $L_{IM1}$ emerged from the sample 8 reaches the objective lens 6. As shown in FIG. 2A, the region of the illumination light $L_{IL2}$ is narrower than the region of the image of the transmitting portion 7b. In this case, all of the image forming light $L_{IM1}$ that has reached the objective lens 6 is incident on the objective lens 6. The image forming light $L_{IM1}$ incident on the objective lens 6 passes through the stop 7 without being shielded by the light shielding portion 7b.

Figure 6A:
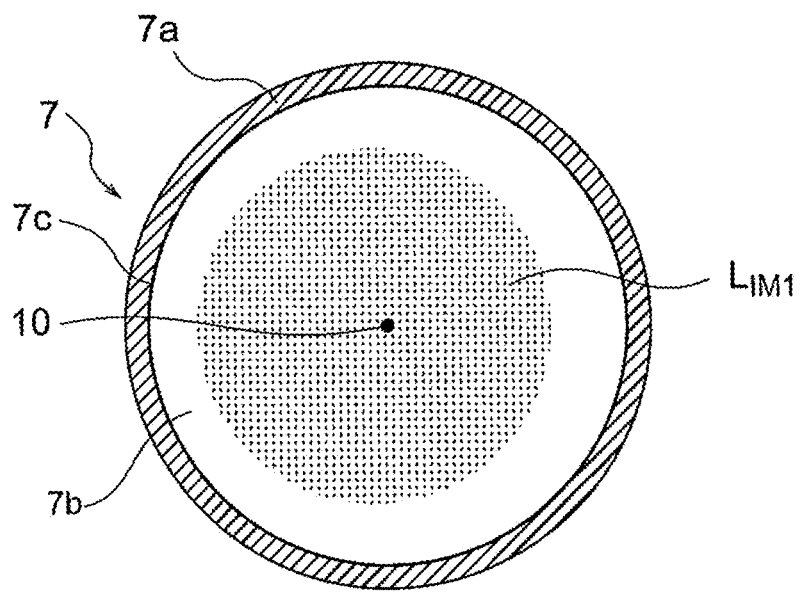
FIG. 6A is a diagram showing an appearance of the image forming light in the third state.
Figure 6B:
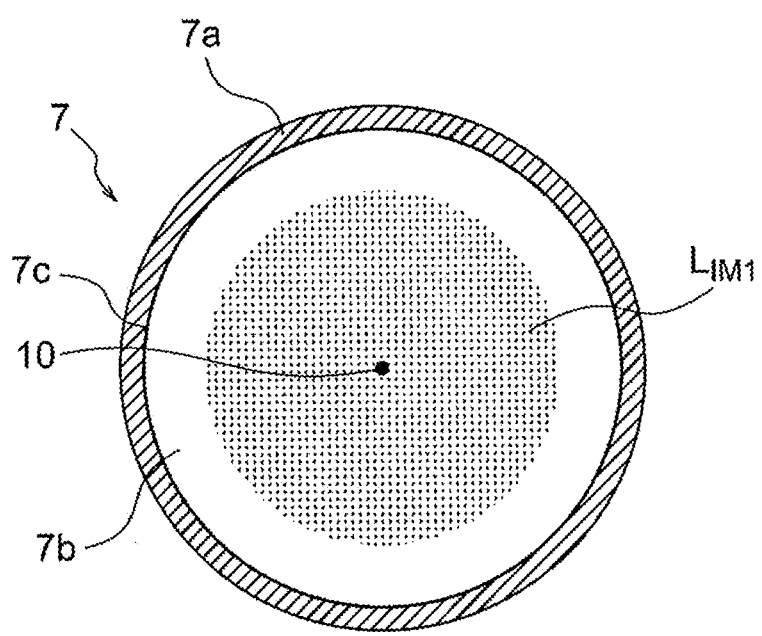
FIG. 6B is a diagram showing an appearance of the image forming light in the first state.

FIG. 6A is a diagram showing an appearance of the image forming light in the third state. For comparison, the appearance of the image forming light in the first state is shown in FIG. 6B. As shown in FIG. 6A, the area of the image forming light $L_{IM1}$ is smaller than the area of the transmitting portion 7b. The image forming light $L_{IM1}$ is positioned at the inner side of the transmitting portion 7b.

Moreover, in the third state, the surface of the sample 8 is inclined at an angle of inclination $-\theta_s$. In this case, the central light ray $L_{ILC}$ is refracted at the surface of the sample 8. Therefore, the central light ray $L_{IMC}$ travels in a direction away from the optical axis 10. As a result, in the third state, the center of the image forming light $L_{IM1}$ does not coincide with the optical axis 10.

As it is evident from the comparison of FIG. 6A and FIG. 6B, the center of the image forming light $L_{IM1}$ in the third state is shifted in a direction away from the optical axis 10 than the center of the image forming light $L_{IM1}$ in the first state. Moreover, in the third state, the direction of shifting is a leftward direction on a paper surface.

In each of the first state, the second state, and the third state, when emerged from the observation optical system 2, the image forming light $L_{IM1}$ is a parallel light beam. Moreover, in the second state and the third state, the image forming light $L_{IM1}$ moves parallel in a direction away from the optical axis.

In such manner, in the measurement principle in the sample shape measuring method of the present embodiment, the following (I) and (II) are used.

(I) The center position of the image forming light $L_{IM1}$ with respect to the optical axis 10 differs for the case in which there is no inclination of the surface of the sample and the case in which there is an inclination of the surface of the sample.

(II) An amount of shift (hereinafter, referred to as 'shift amount Δ') in the center position of the image forming light $L_{IM1}$ with respect to the optical axis 10 varies according to an amount of inclination.

Moreover, the measurement principle of the sample shape measuring method of the present embodiment is characterized by a point that the area of the region of the image forming light $L_{IM1}$ is smaller than the area of the transmitting portion 7b.

Here, a case in which the area of the region of the image forming light $L_{IM1}$ is same as the area of the transmitting portion 7b will be described below. In a sample in which the surface is not inclined, the transmitting portion 7b is filled with the image forming light $L_{IM1}$. Therefore, the shape of the region of the image forming light $L_{IM1}$ that passes through the transmitting portion 7b becomes a circular shape.

Whereas, in a sample in which the surface is inclined, the image forming light $L_{IM1}$ shifts in a direction away from the optical axis 10. In this case, a portion of the image forming light $L_{IM1}$ runs over the transmitting portion 7b. Therefore, the shape of the region of the image forming light $L_{IM1}$ passing through the transmitting portion 7b is a shape with a portion of the circle missing (hereinafter, referred to as 'non-circular shape')

In the image forming light $L_{IM1}$ having a non-circular shape, the center of the image forming light $L_{IM1}$ does not coincide with the optical axis 10. Therefore, even in a case in which the shape of the region of the image forming light $L_{IM1}$ is a non-circular shape, information of the amount of inclination is included in the shift amount Δ. However, the amount of inclination is determined by the shift amount Δ when the shape of the region of the image forming light $L_{IM1}$ is circular. Therefore, it is not possible to calculate the accurate amount of inclination from the shift amount Δ when the shape of the region of the image forming light $L_{IM1}$ is a non-circular shape.

In such manner, when the area of the region of the image forming light $L_{IM1}$ and the area of the transmitting portion 7b are same, the shape of the region of the image forming light $L_{IM1}$ differs for the case in which there is no inclination of the surface of the sample and the case in which there is an inclination of the surface of the sample. Therefore, in a case in which the area of the region of the image forming light $L_{IM1}$ is same as the area of the transmitting portion 7b, it is difficult to measure the amount of inclination accurately.

Next, a case in which the area of the region of the image forming light $L_{IM1}$ is larger than the area of the transmitting portion 7b will be described below. In a sample in which the surface is not inclined, the transmitting portion 7b is filled with the image forming light $L_{IM1}$. Therefore, the shape of the region of the image forming light $L_{IM1}$ passing through the transmitting portion 7b becomes a circular shape.

Whereas, in a sample in which the surface is inclined, the image forming light $L_{IM1}$ shifts in a direction away from the optical axis 10. In this case, a portion of the image forming light $L_{IM1}$ runs over the transmitting portion 7b. However, in the case in which the area of the region of the image forming light $L_{IM1}$ is larger than the area of the transmitting portion 7b, the image forming light $L_{IM1}$ is also there at an outer side of the transmitting portion 7b. Therefore, the image forming light $L_{IM1}$ at the outer side of the transmitting portion 7b shifts to an inner side of the transmitting portion 7b with the shift of the image forming light $L_{IM1}$. As a result, a state in which the transmitting portion 7b is filled with the image forming light $L_{IM1}$ continuous for some time.

The state in which the transmitting portion 7b is filled with the image forming light $L_{IM1}$ is same as a state of measuring a sample in which the surface is not inclined. Therefore, even for a sample with a surface inclined, it is not possible to measure the amount of inclination at the surface of the sample while the state of the transmitting portion 7b filled with the image forming light $L_{IM1}$ continues.

Moreover, as the state in which the transmitting portion 7b is filled with the image forming light $L_{IM1}$ comes to an end, a portion of the image forming light $L_{IM1}$ runs over the transmitting portion 7b. Therefore, as mentioned above, it is not possible to calculate the accurate amount of inclination.

In such manner, even in the case in which the area of the region of the image forming light $L_{IM1}$ is larger than the area of the transmitting portion 7b, it is difficult to measure the amount of inclination accurately.

Whereas, in a case in which the area of the region of the image forming light $L_{IM1}$ is smaller than the area of the transmitting portion 7b, the shape of the region of the image forming light $L_{IM1}$ is same for the case in which there is no inclination of the surface of the sample and the case in which there is an inclination of the surface of the sample. Therefore, it is possible to measure the amount of inclination accurately. Moreover, the state in which the transmitting portion 7b is filled with the image forming light $L_{IM1}$ is not assumed. Therefore, it is possible to reduce a state in which the amount of inclination at the surface of the sample cannot be measured.

As mentioned above, the measurement principle of the sample shape measuring method of the present embodiment is characterized by a point that the area of the region of the image forming light $L_{IM1}$ is smaller than the area of the transmitting portion 7b. This feature can be achieved by setting appropriately a size of the transmitting region 4b.

The transmitting portion 7b can be deemed as a pupil of the observation optical system 2. Therefore, the area of the region of the image forming light $L_{IM1}$ is smaller than the area of the pupil of the observation optical system 2.

The area of the region of the image forming light $L_{IM1}$ can be deemed as an area when the illumination light passes through the transmitting portion 7b. As mentioned above, the transmitting portion 7b being the pupil of the observation optical system 2, the area of the region of the image forming light $L_{IM1}$ becomes an area when the illumination light passes through the pupil of the observation optical system 2. When there is no sample 8, the image forming light $L_{IM1}$ is the illumination light. Therefore, the area of the region of the image forming light $L_{IM1}$ can be said to be an area of the illumination light that passes through the pupil of the observation optical system 2.

In that case, the feature of the measurement principle of the sample shape measuring method of the present embodiment is that the area of the illumination light passing through the pupil of the observation optical system 2 is smaller than the area of the pupil of the observation optical system 2.

The region of the image forming light $L_{IM1}$ is determined by the size of the transmitting region 4b. In this case, the area of the illumination light passing through the pupil of the observation optical system 2 is also determined by the size of the transmitting region 4b. Therefore, the size of the transmitting region 4b is set such that the area of the illumination light passing through the pupil of the observation optical system 2 becomes smaller than the area of the pupil of the observation optical system 2.

When the transmitting region 4b is let to be a predetermined illumination region, according to the measurement principle of the sample shape measuring method of the present embodiment, the predetermined illumination region has been set such that the area of the illumination light passing through the pupil of the observation optical system 2 becomes smaller than the area of the pupil of the observation optical system 2.

According to the measurement principle of the sample shape measuring method of the present embodiment, it is possible to measure with high accuracy, the amount of inclination at the surface of a sample. Moreover, by using the amount of inclination measured, it is possible to measure a surface shape of the sample with high accuracy.

The area of the illumination light passing through the pupil of the observation optical system 2 changes not only in accordance with the size of the transmitting region 4b but also in accordance with a pupil projection magnification. Therefore, it is also necessary to set the pupil projection magnification appropriately. The pupil projection magnification is determined by a focal length of the objective lens 6 and a focal length of the condenser lens 5.

The sample shape measuring method of the present embodiment and the sample shape measuring apparatus of the present embodiment will be described below. In the following description, a pupil of an objective lens is used instead of the stop 7.

The sample shape measuring method of the present embodiment includes a step of preparing illumination light that is to be passed through a predetermined illumination region, a step of irradiating the illumination light to a sample, and a predetermined processing step, and the predetermined illumination region is set such that an area of a region of the illumination light passing through a pupil of an observation optical system is smaller than an area of the pupil of the observation optical system, and the illumination light is transmitted through the sample, and light emerged from the sample is incident on the observation optical system, and the predetermined processing step includes a step of receiving light emerged from the observation optical system, a step of computing a position of an image of the predetermined illumination region from light received, a step of computing a difference between the position of the image of the predetermined illumination region and a reference position, and a step of calculating an amount of inclination at a surface of the sample, from the difference calculated.

Figure 7:
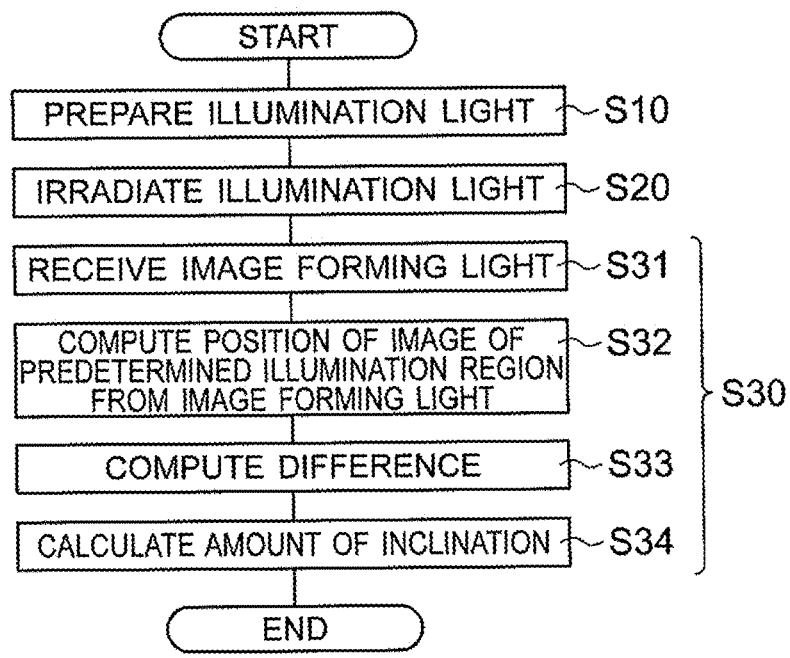
FIG. 7 is a flowchart of a sample shape measuring method of the present embodiment.

FIG. 7 is a flowchart of the sample shape measuring method of the present embodiment. The sample shape measuring method of the present embodiment includes step S10 of preparing illumination light, step S20 of irradiating the illumination light, and predetermined processing step S30, and the predetermined processing step S30 includes step S31 of receiving image forming light, step S32 of computing a position of an image of a predetermined illumination region, step S33 of computing a difference, and step S34 of computing an amount of inclination.

In the sample shape measuring method of the present embodiment, firstly, step S10 is executed. Step S10 is a step of preparing the illumination light. At step S10, the predetermined illumination region is set in an illuminating optical system. The predetermined illumination region is a region through which the illumination light passes. The predetermined illumination region is set such that the area of the region of the illumination light passing through the pupil of the observation optical system is smaller than the area of the pupil of the observation optical system.

The transmitting region 4b shown in FIG. 1 is an example of the predetermined illumination region. The setting of the predetermined illumination region is carried out by disposing the light shielding member 4 in the optical path of the illuminating optical system 1.

As step S10 is terminated, step S20 is executed. Step S20 is a step of irradiating the illumination light. At step S20, the illumination light is irradiated to the sample. By irradiating the sample, image forming light is emerged from the sample. The light emerged from the sample is incident on the observation optical system.

As step S20 is terminated, step S30 is executed. Step S30 is a step of carrying out the predetermined processing. At step S30, step S31, step S32, step S33, and step S34 are executed.

At step S30, firstly, step S31 is executed. Step S31 is a step of receiving the image forming light. The image forming light is light emerged from the observation optical system.

As step S31 is terminated, step S32 is executed. Step S32 is a step of computing the position of the image of the predetermined illumination region from the image forming light. The image forming light is light received at step S31.

The image forming light received at step S31 can be deemed as the illumination light passing through the pupil of the observation optical system. The illumination light passing through the pupil of the observation optical system is light that has passed through the predetermined illumination region. Therefore, the region of the image forming light can be deemed as the image of the predetermined illumination region.

When the region of the image forming light is circular-shaped, the image of the predetermined illumination region also becomes circular-shaped. In this case, it is preferable to let a center position of the image forming light to be a position of the image of the predetermined illumination region. Moreover, when the region of the image forming light is not circular-shaped, a position of a center of gravity is to be computed from the shape of the region of the image forming light. Furthermore, the position of the center of gravity that has been computed may be let to be the position of the image of the predetermined illumination region.

Moreover, in the image forming light, a distribution of light intensity in a plane orthogonal to the optical axis is sometimes uniform and sometimes non-uniform. Therefore, the position of the image of the predetermined illumination region may be computed upon taking into consideration the distribution of the light intensity.

As step S32 is terminated, step S33 is executed. Step S33 is a step of computing the difference. At step S33, the difference between the position of the image of the predetermined illumination region computed at step S32 and the reference position, is computed.

As step S33 is terminated, step S34 is executed. Step S34 is a step of calculating the amount of inclination. At step S34, the amount of inclination at the surface of the sample is calculated from the result of computing at step S33.

In such manner, the sample shape measuring method of the present embodiment is provided with the above-mentioned measurement principle. Therefore, in the sample shape measuring method of the present embodiment, it is possible to measure the amount of inclination at the surface of a sample with high accuracy. Moreover, as it will be described later, by using the amount of inclination that has been measured, it is possible to measure a surface shape of a sample with high accuracy.

In the sample shape measuring method of the present embodiment, it is preferable to receive the light emerged from the observation optical system in a state in which there is no sample, and to compute the position of the image of the predetermined illumination region from the light received, and to let the position computed to be the reference position.

By doing so, it is possible to set the reference position easily.

It is preferable that the sample shape measuring method of the present embodiment include a step of setting the reference position prior to the step of irradiating the illumination light to the sample.

Figure 8:
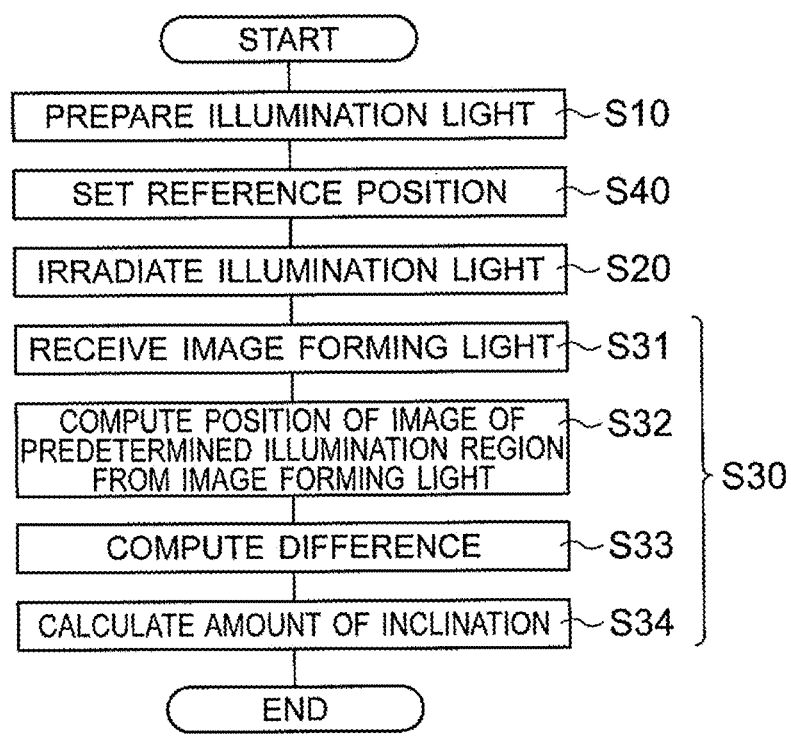
FIG. 8 is a flowchart of the sample shape measuring method of the present embodiment.

FIG. 8 is a flowchart of the sample shape measuring method of the present embodiment. Same reference numerals are assigned to steps that are same as in the flowchart in FIG. 7, and the description thereof is omitted. The sample shape measuring method of the present embodiment includes step S40 of setting the reference position, between step S10 of preparing the illumination light and step S20 of irradiating the illumination light.

As step S10 is terminated, step S40 is executed. At step S40, the reference position is set. The reference position is a position of the image of the illumination region in the state in which there is no sample.

As step S40 is terminated, a sample is placed on the stage. Thereafter, step S20 is executed.

In the flowchart in FIG. 8, step S40 is executed after step S10. However, step S40 may be executed prior to step S10.

In the sample shape measuring method of the present embodiment, it is preferable to execute the step of setting the reference position before carrying out a first-time sample measurement.

When such an arrangement is made, the reference position is measured immediately before measuring the sample shape. Therefore, it is possible to improve the accuracy of the difference computed at step S33. As a result, it is possible to calculate the amount of inclination accurately.

In the sample shape measuring method of the present embodiment, illumination light for measuring the reference position becomes necessary. Therefore, step S40 is executed after step S10.

In the sample shape measuring method of the present embodiment, it is preferable to store the reference position in advance, and to set the reference position by reading out the reference position that has been stored, before carrying out the measurement of the first sample.

When such an arrangement is made, it is no longer necessary to compute the reference position, every time the sample shape is measured. Accordingly, it is possible to shorten the time for measurement.

In the sample shape measuring method of the present embodiment, illumination light is not necessary, as the reference position is not to be measured. Step S40 is to be executed prior to step S10 or after step S10.

The sample shape measuring apparatus of the present embodiment will be described below. The sample shape measuring apparatus of the present embodiment includes an illuminating optical system, an observation optical system, a holding member, a detection element, and a processing unit. The illuminating optical system includes a light source, a condenser lens, and an optical member which forms the predetermined illumination region. The observation optical system includes an objective lens. The holding member holds a sample and is disposed between the illuminating optical system and the observation optical system. The optical member is disposed on a light source side of the condenser lens. The predetermined illumination region is set such that an area of a region of the illumination light passing through a pupil of the observation optical system becomes smaller than an area of the pupil of the observation optical system. Illumination light irradiated to the sample by the illuminating optical system is transmitted through the sample, and light emerged from the sample is incident on the observation optical system. The detection element receives light emerged from the observation optical system. The processing unit computes a position of an image of the predetermined illumination region from light received, and computes a difference between the position of the image of the predetermined illumination region and the reference position, and calculates an amount of inclination at a surface of the sample from the difference computed.

Figure 9:
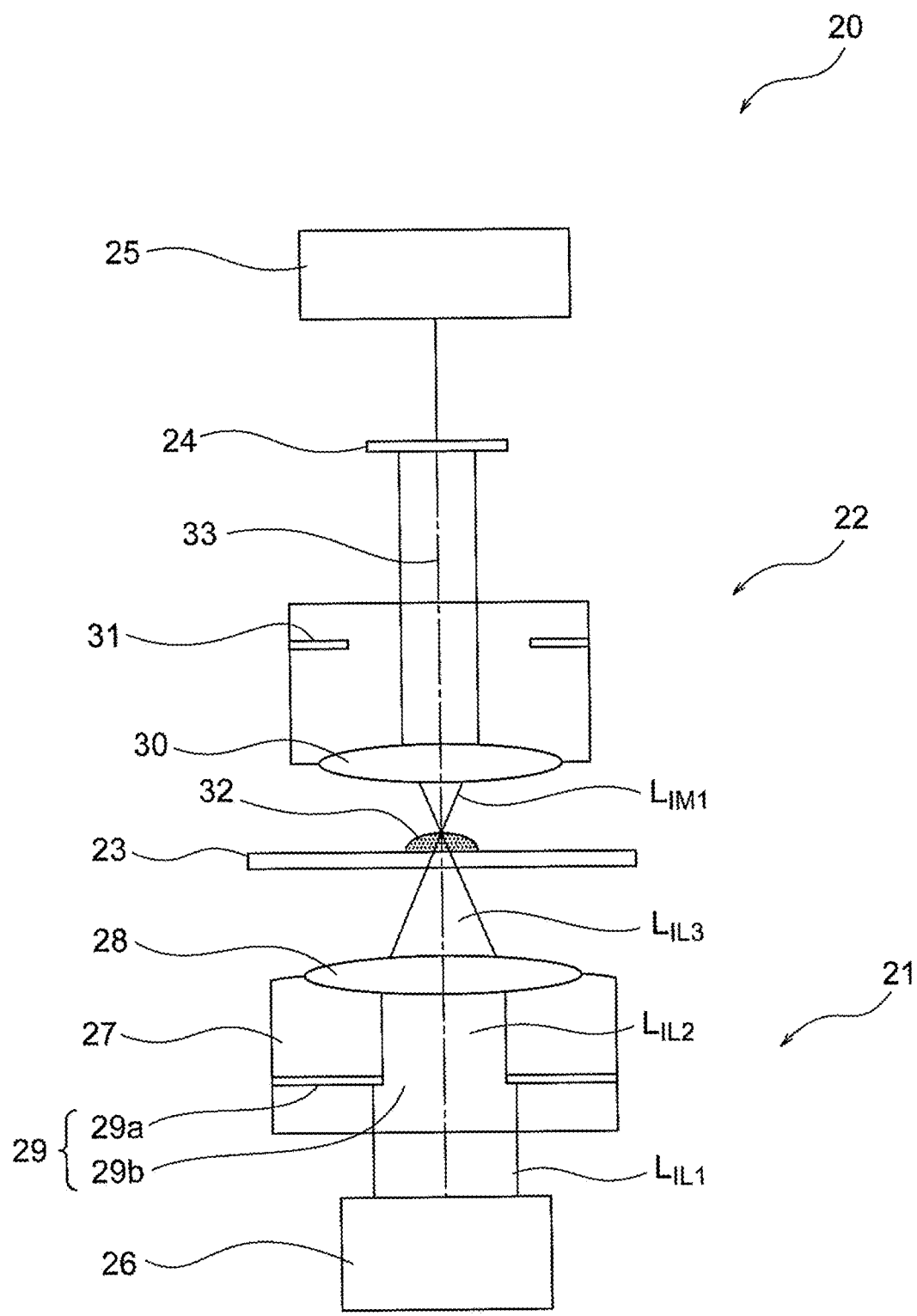
FIG. 9 is a diagram showing an arrangement of a sample shape measuring apparatus of the present embodiment.

FIG. 9 is a diagram showing an arrangement of the sample shape measuring apparatus of the present embodiment. A sample shape measuring apparatus 20 is an upright microscope for example, and includes an illuminating optical system 21, an observation optical system 22, a holding member 23, a detection element 24, and a processing unit 25. The illuminating optical system 21 includes a light source 26 and a condenser 27. The observation optical system 22 includes an objective lens 30. A pupil 31 of the objective lens is positioned at an interior of the objective lens 30.

The condenser 27 is provided with a condenser lens 28 and an opening member 29. Here, the condenser lens 28 and the opening member 29 are integrated and held by the condenser 27. However, each of the condenser lens 28 and the opening member 29 may be held separately. A metallic plate is used for the opening member 29.

The illumination light $L_{IL1}$ is emerged from the light source 26. The illumination light $L_{IL1}$ is a parallel light beam, and may be a substantially parallel light beam. The illumination light $L_{IL1}$ emerged from the light source 26 is incident on the condenser 27. The illumination light $L_{IL1}$ is incident on the opening member 29.

The opening member 29 includes a light shielding portion 29a and a transmitting portion 29b. A size of the transmitting portion 29b is smaller than a light beam diameter of the illumination light $L_{IL1}$. Therefore, a portion of a light beam of the illumination light $L_{IL1}$ is shielded by the light shielding portion 29a, and the remaining light beam passes through the transmitting portion 29b. The illumination light $L_{IL2}$ is emerged from the transmitting portion 29b. The size of the transmitting portion 29b may be same as the light beam diameter of the illumination light $L_{IL1}$.

The opening member 29 is positioned on a light source 26 side of the condenser lens 28. Moreover, the light transmitting portion 29b is set such that an area of the region of the illumination light passing through a pupil of the observation optical system 22 becomes smaller than an area of the pupil of the observation optical system 22. In such manner, in the sample shape measuring apparatus 20, the predetermined illumination region is formed by the transmitting portion 29b. Therefore, the opening member 29 corresponds to the optical member which forms the predetermined illumination region.

The illumination light $L_{IL2}$ is incident on the condenser lens 28. The illumination light $L_{IL2}$ is collected by the condenser lens 2. The illumination light $L_{IL3}$ is emerged from the condenser lens 28. The illumination light $L_{IL3}$ reaches the holding member 23.

The holding member 23 is disposed between the illuminating optical system 21 and the observation optical system 22. A sample 32 is placed on the holding member 23. The sample 32 is held by the holding member 23.

The illumination light $L_{IL3}$ emerged from the illuminating optical system 21 is irradiated to the sample 32. The illumination light $L_{IL3}$ irradiated to the sample 32 is transmitted through the sample 32. The image forming light $L_{IM1}$ emerges from the sample 32.

The image forming light $L_{IM1}$ emerged from the sample 32 is incident on the observation optical system 22. The image forming light $L_{IM1}$ is incident on the objective lens 30 and passes through the pupil 31 of the objective lens.

The image forming light $L_{IM1}$ that has passed through the pupil 31 of the objective lens emerges from the observation optical system 22. The image forming light $L_{IM1}$ emerged from the observation optical system 22 is received by the detection element 24. A signal from the detection element 24 is transmitted to the processing unit 25.

In the processing unit 25, abovementioned predetermined processing step S30 is executed. Accordingly, it is possible to measure the amount of inclination at the surface of the sample.

A method for computing the position of the predetermined illumination region will be described below. Here, the center of gravity position is let to be the position of the image of the predetermined illumination region. Moreover, it is assumed that the opening member 29 is used for the optical member forming the predetermined illumination region. When the image of the opening member 29 is let to be S (x, y), it is possible to calculate a center of gravity Rg (Xg, Yg) of the image of the opening member 29 from the following expression.

$$Xg = \frac{\int\int S(x, y)x dx dy}{\int\int S(x, y) dx dy}$$

$$Yg = \frac{\int\int S(x, y)y dx dy}{\int\int S(x, y) dx dy}$$

where,

S (x, y)=1 when (x, y) is at an inner side of the image of the opening member 29, and S (x, y)=0 when (x, y) is at an outer side of the image of the opening member 29.

A method for finding the position of the center of gravity of the image of the opening member 29 was described above. In a case in which a shape of the image of the transmitting portion 29b is a circular shape, a center of the circle may be let to be the center of gravity.

In the sample shape measuring apparatus 20, regardless of whether or not there is an inclination of a surface of the sample 32, the image forming light $L_{IM1}$ is a parallel light beam when emerged from the observation optical system 22. Moreover, in a case in which there is an inclination of the surface of the sample 32, the image forming light $L_{IM1}$ moves parallel in a direction away from an optical axis 33.

Therefore, the detection element 24 may be disposed at any position, provided that the image forming light $L_{IM1}$ has become a parallel light beam at that position. In other words, the detection element 24 may not be disposed at a pupil position of the observation optical system 22 or a position conjugate with the pupil position of the observation optical system 22.

In the sample shape measuring apparatus 20, the area of the region of the image forming light $L_{IM1}$ is smaller than an area of the pupil 31 of the objective lens. Therefore, even when the image forming light $L_{IM1}$ shifts in a direction away from the optical axis 10, the shape of the region of the image forming light $L_{IM1}$ does not change. In other words, in a case in which there is no inclination of the surface of the sample 32 and in a case in which there is an inclination of the surface of the sample 32, the shape of the region of the image forming light $L_{IM1}$ is same. Therefore, it is possible to measure the amount of inclination accurately. Moreover, an inner side of the pupil 31 of the objective lens does not assume a state of being filled with the image forming light $L_{IM1}$. Accordingly, it is possible to reduce a state in which the amount of inclination cannot be measured.

In such manner, the sample shape measuring apparatus of the present embodiment is provided with a feature of the measurement principle. Therefore, in the sample shape measuring apparatus of the present embodiment, it is possible to measure the amount of inclination at the surface of a sample with high accuracy. Moreover, as it will be described later, by using the amount of inclination measured, it is possible to measure the surface shape of the sample with high accuracy.

In the sample shape measuring apparatus of the present embodiment, it is preferable that the detection element include a plurality of light receiving surfaces.

By making such arrangement, it is possible to compute the position of the predetermined illumination region. A CCD (charge coupled device) image sensor and a CMOS (complementary metal-oxide semiconductor) image sensor may be used as the detection sensor 24.

In the sample shape measuring apparatus of the present embodiment, it is preferable that the detection element include a single light receiving surface and a plurality of output terminals.

By making such arrangement, it is possible to compute the position of the predetermined illumination region. A PDS (semiconductor position detection element) may be used as the detection element 24.

In the sample shape measuring method of the present embodiment, it is preferable that the light be received at a pupil position of the observation optical system.

In the sample shape measuring apparatus of the present embodiment, it is preferable that the detection element be disposed at the pupil position of the observation optical system.

Figure 10:
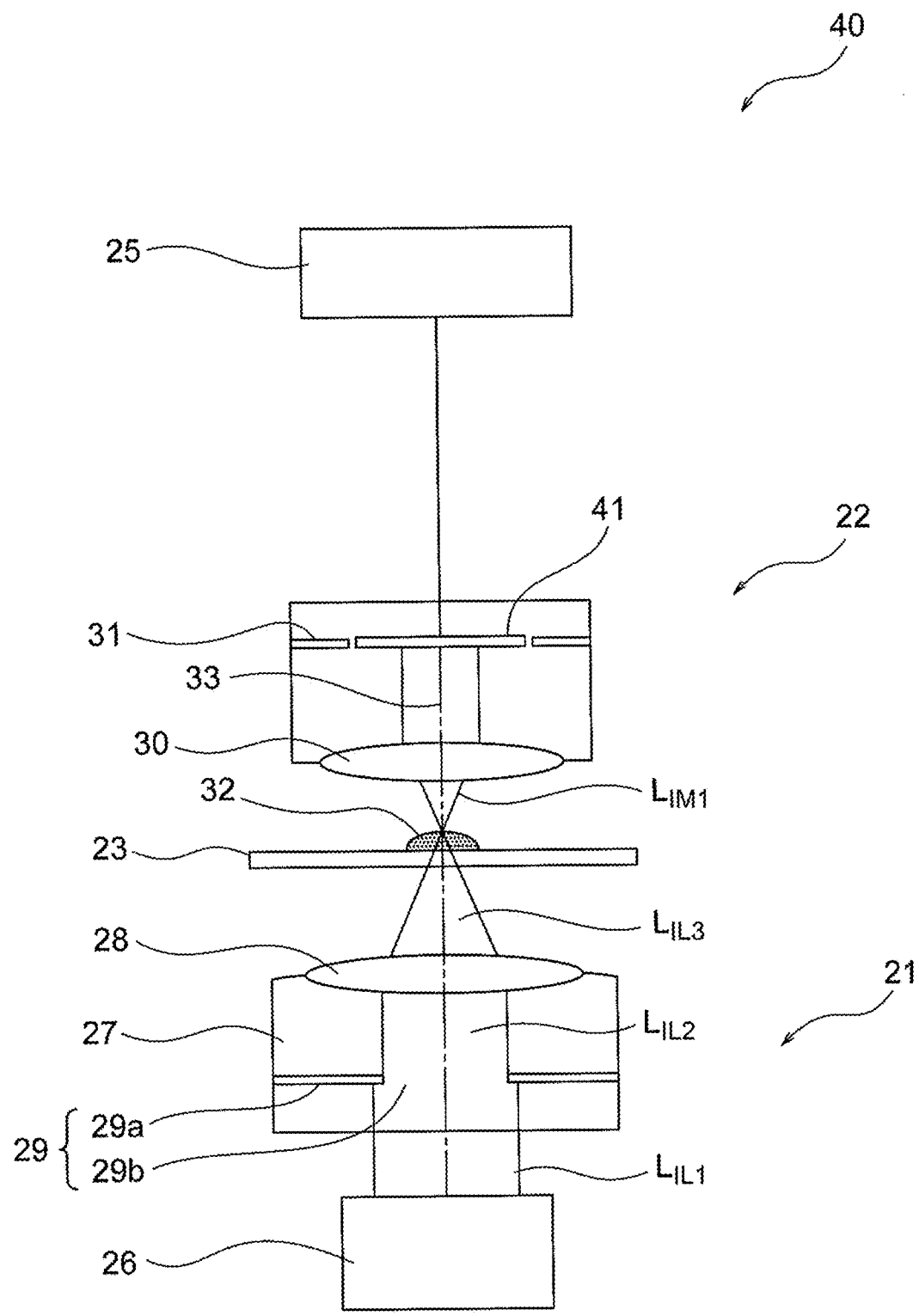
FIG. 10 is a diagram showing an arrangement of a sample shape measuring apparatus of the present embodiment.

FIG. 10 is a diagram showing an arrangement of a sample shape measuring apparatus of the present embodiment. Same reference numerals are assigned to components that are same as in the arrangement in FIG. 9, and the description thereof is omitted.

A sample shape measuring apparatus 40 includes a detection element 41. The detection element 41 is disposed at the position of the pupil 31 of the objective lens. The pupil 31 of the objective lens is also the pupil of the observation optical system 22. Therefore, in the sample shape measuring apparatus 40, the detection element 41 is disposed at the pupil position of the observation optical system 22. Accordingly, it is possible to receive the image forming light $L_{IM1}$ at the pupil position of the observation optical system.

In the sample shape measuring method of the present embodiment, it is preferable that the light be received at a position conjugate with the pupil of the observation optical system.

In the sample shape measuring apparatus of the present embodiment, it is preferable that the detection element be disposed at a position conjugate with the pupil of the observation optical system.

Figure 11:
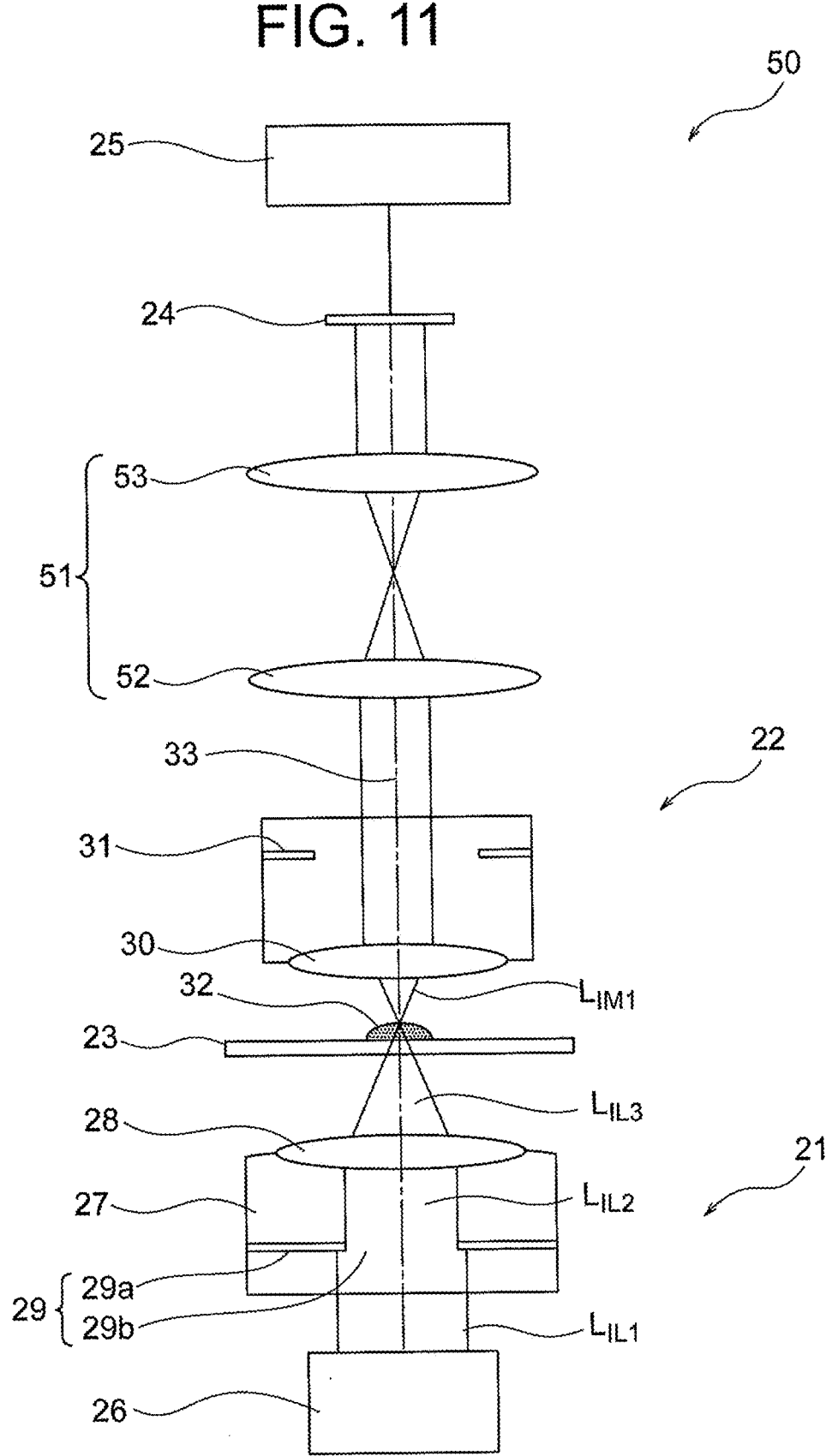
FIG. 11 is a diagram showing an arrangement of a sample shape measuring apparatus of the present embodiment.

FIG. 11 is a diagram showing an arrangement of a sample shape measuring apparatus of the present embodiment. Same reference numerals are assigned to components that are same as in the arrangement in FIG. 9, and the description thereof is omitted.

A sample shape measuring apparatus 50 includes a relay optical system 51. The relay optical system 51 includes a lens 52 and a lens 53. An image of the pupil 31 of the objective lens is formed between the lens 52 and the processing unit 25 by the lens 52 and the lens 53. The detection element 24 is disposed at an image position of the pupil 31 of the objective lens.

The image of the pupil 31 of the objective lens is also an image of the pupil of the observation optical system 22. Therefore, in the sample shape measuring apparatus 50, the detection element 24 is disposed at a position conjugate with the pupil of the observation optical system 22. Accordingly, it is possible to receive the image forming light $L_{IM1}$ at the position conjugate with the pupil of the observation optical system.

In the sample shape measuring method of the present embodiment, it is preferable to include a step of moving the illumination light and the sample relatively in a plane orthogonal to the optical axis.

It is preferable that the sample shape measuring apparatus of the present embodiment includes a scanning mechanism which moves the illumination light and the holding member relatively in a plane orthogonal to the optical axis.

By making such arrangement, it is possible to calculate the amount of inclination at a plurality of positions of the sample.

Figure 12:
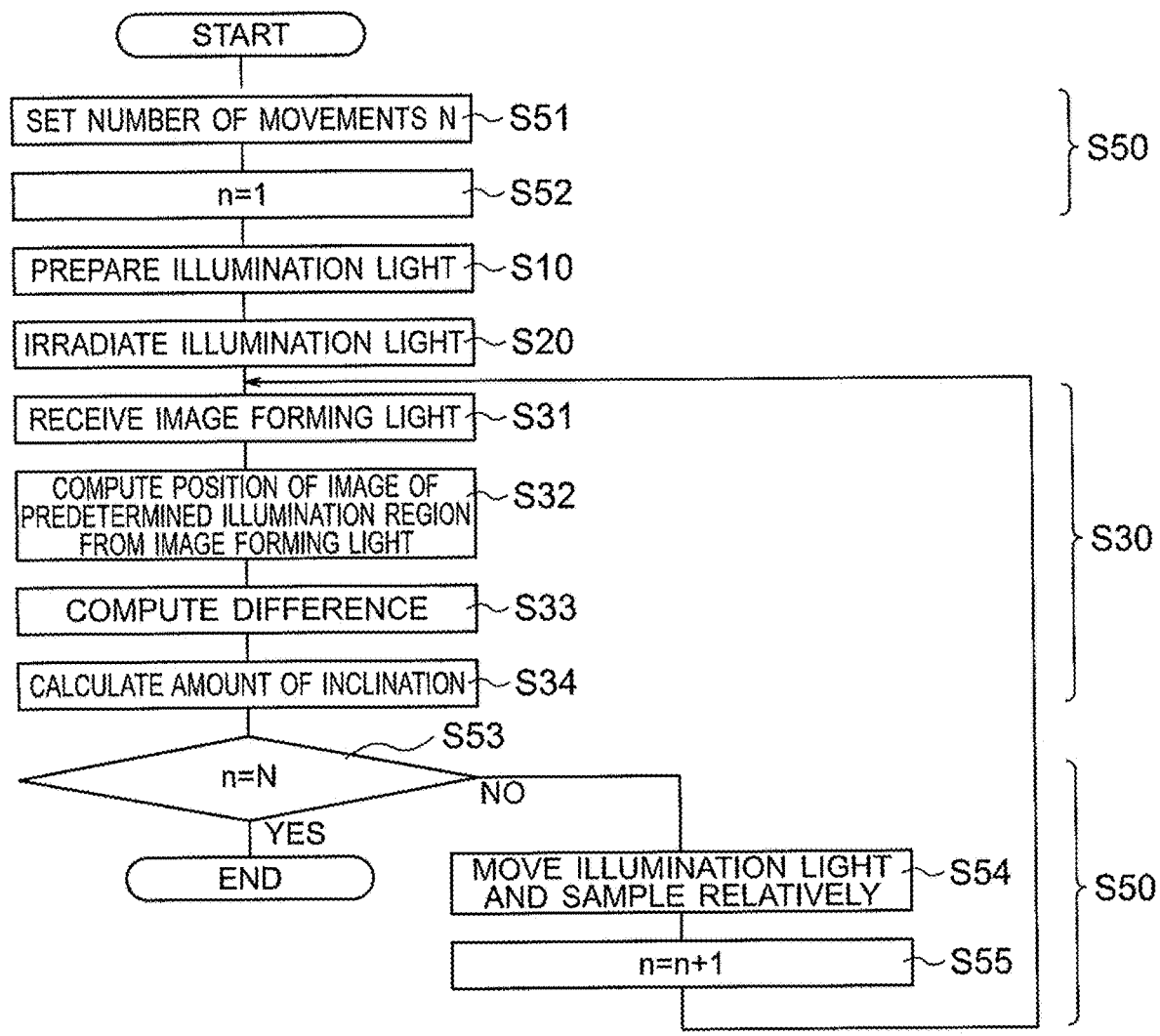
FIG. 12 is a flowchart of a sample shape measuring method of the present embodiment.

FIG. 12 is a flowchart of a sample shape measuring method of the present embodiment. Same reference numerals are assigned to steps that are same as in the flowchart in FIG. 7, and the description thereof is omitted. The sample shape measuring method of the present embodiment includes step S50 of moving the illumination light and the sample relatively, prior to step S10 of preparing the illumination light and after step S34 of calculating the amount of inclination.

In the sample shape measuring method of the present embodiment, step S51 and step S52 are executed prior to step S10. Step S51 is a step of setting the total number of movements N. The total number of movements N is the number of locations at which the measurement of the amount of inclination is carried out. Step S52 is a step of initializing the number of movements. Here, the number of movements is counted by using a variable n. At step S52, 1 is set as a value of the variable n.

As step S52 is terminated, step S30 is executed. Accordingly, a first measurement is concluded. As step S30 is terminated, step S53 is executed.

Step S53 is a step of confirming an end of movement. In a case in which the value of the variable n is not identical to the total number of movements N, at step S53, a judgement is made that all the movements that were planned have not been completed. In this case, step S54 and step S55 are executed.

Step S54 is a step of moving the illumination light and the sample relatively. By executing step S54, a measurement at a new location becomes possible. The new location is a location different from a location at which the first measurement was carried out.

As step S54 is terminated, step S55 is executed. At step S55, counting of the number of movements is carried out. Here, 1 is added to the value of variable n. As step S55 is terminated, step S30 is executed once again.

The value of variable n increases every time step S30 is executed, and finally, the value of variable n is identical to the total number of movements N. In this case, at step S53, a judgment is made that all the movements that were planned have been completed. Accordingly, the relative movement of the illumination light and the sample is completed.

In such manner, in the sample shape measuring method of the present embodiment, the illumination light and the sample are moved relatively in the plane orthogonal to the optical axis. As a result, it is possible to calculate the amount of inclination at the plurality of positions of the sample.

In the flowchart in FIG. 12, step S53 is executed after the execution of step S30. However, step S53 may be executed after the execution of step S32.

In this case, the position of the image of the predetermined illumination region is computed for all locations at which the measurement of the amount of inclination is carried out. Therefore, all the positions of the image of the predetermined illumination region that have been computed are to be stored. Moreover, after all the relative movements of the illumination light and the sample are completed, the amount of inclination is to be calculated for all the locations at which the measurement of the amount of inclination is to be carried out.

In the sample shape measuring method of the present embodiment, it is preferable that the relative movement of the illumination light and the sample be carried out by the movement of the sample.

In the sample shape measuring apparatus of the present embodiment, it is preferable that the scanning mechanism include a drive unit which moves the holding member.

Figure 13:
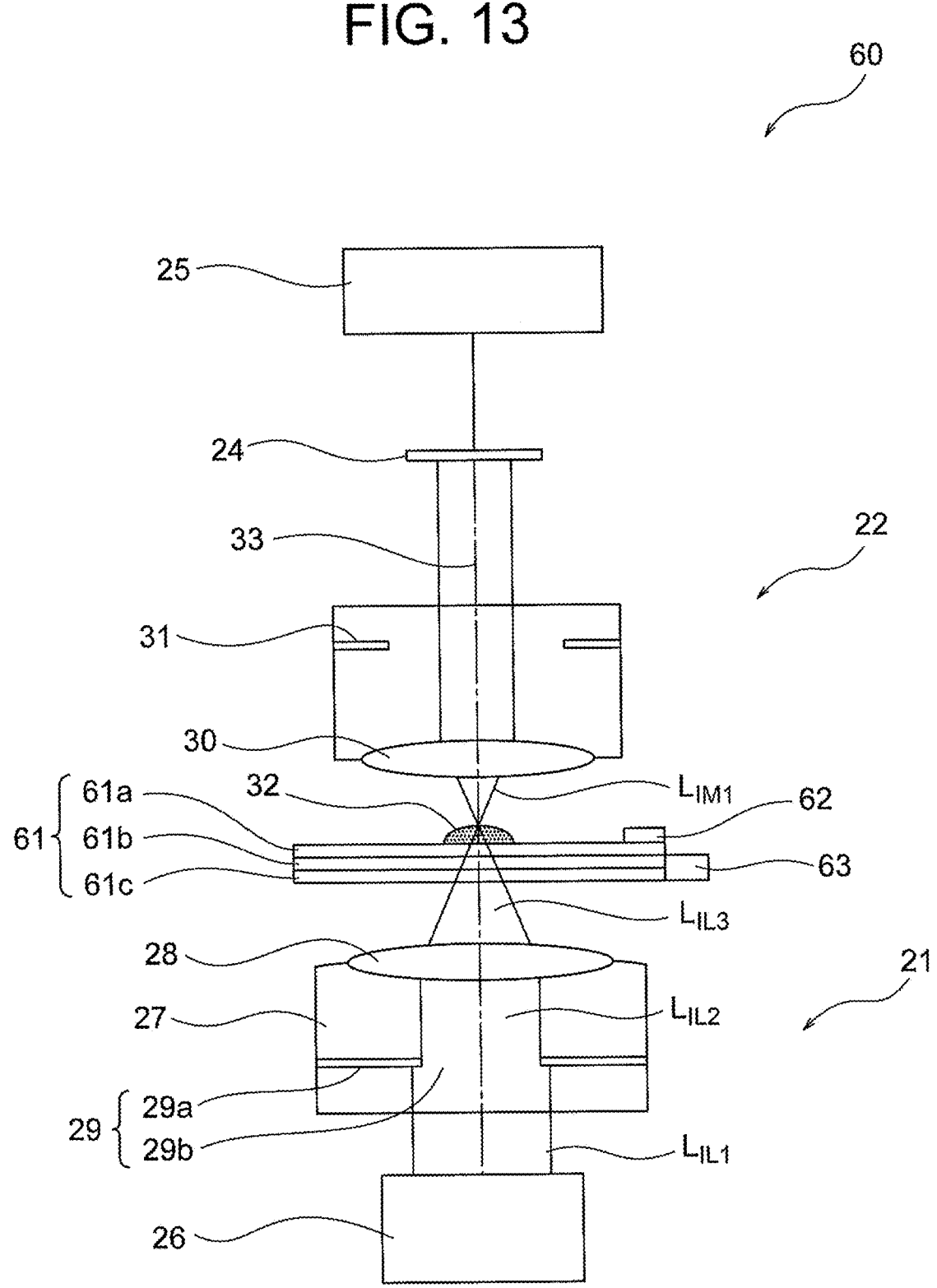
FIG. 13 is a diagram showing an arrangement of a sample shape measuring apparatus of the present embodiment.

FIG. 13 is a diagram showing an arrangement of a sample shape measuring apparatus of the present embodiment. Same reference numerals are assigned to components that are same as in the arrangement in FIG. 9, and the description thereof is omitted.

A sample shape measuring apparatus 60 includes a scanning mechanism 61. The scanning mechanism 61 includes a first stage 61a, a second stage 61b, and a base 61c. The second stage 61b is positioned on the base 61c. The base 61c is provided with a mechanism which moves the second stage 61b. The first stage 61a is positioned on the second stage 61b. The second stage 61b is provided with a mechanism which moves the first stage 61a.

The first stage 61a and the second stage 61b move in mutually orthogonal directions. For instance, the first stage 61a moves in a leftward-rightward direction on a paper surface and the second stage 61b moves in a direction orthogonal to the paper surface. By making such arrangement, it is possible to carry out the relative movement of the illumination light and the sample by the movement of the sample.

In the sample shape measuring apparatus 40, the illumination light $L_{IL3}$ is collected on the optical axis 10 all the time. Therefore, the sample 32 is placed on the first stage 61a, and the first stage 61a and the second stage 61b are moved. When such an arrangement is made, various locations of the surface of the sample 32 intersect a collecting point of the illumination light $L_{IL3}$. As a result, it is possible to calculate the amount of inclination at a plurality of positions of the sample 32.

Although it is possible to carry out the movement of the first stage 61a and the movement of the second stage 61b manually, it is preferable to carry out the movement by an electrical operation. By carrying out the movement of each stage by an electrical operation, it is possible to carry out the movement and positioning of each stage at high speed and with accuracy. For such reason, in the sample shape measuring apparatus 60, a first drive element 62 and a second drive element 63 are provided to the scanning mechanism 61. A stepping motor may be used as the first drive element 62 and the second drive element 63.

The first drive motor 62 is provided to the second stage 61b. It is possible to move the first stage 61a by the first drive element 62. The second drive element 63 is provided to the base 61c. It is possible to move the second stage 61b by the second drive element 63.

Even in the sample shape measuring apparatus 60, regardless of whether or not there is an inclination of the surface of the sample 32, the image forming light $L_{IM1}$ is a parallel light beam when emerged from the observation optical system 22. Moreover, in a case in which there is an inclination at the surface of the sample 32, the image forming light $L_{IM1}$ moves parallel in a direction away from the optical axis 33.

Therefore, the detection element 24 may be disposed at any position, provided that the image forming light $L_{IM1}$ has become a parallel light beam at that position. In other words, the detection element 24 may not be disposed at the pupil position of the observation optical system 22 or the position conjugate with the pupil position of the observation optical system 22.

In the sample shape measuring method of the present embodiment, it is preferable that the relative movement of the illumination light and the sample be carried out by the movement of the illumination light.

In the sample shape measuring apparatus of the present embodiment, it is preferable that the scanning mechanism include a drive unit which moves the illumination light.

Figure 14:
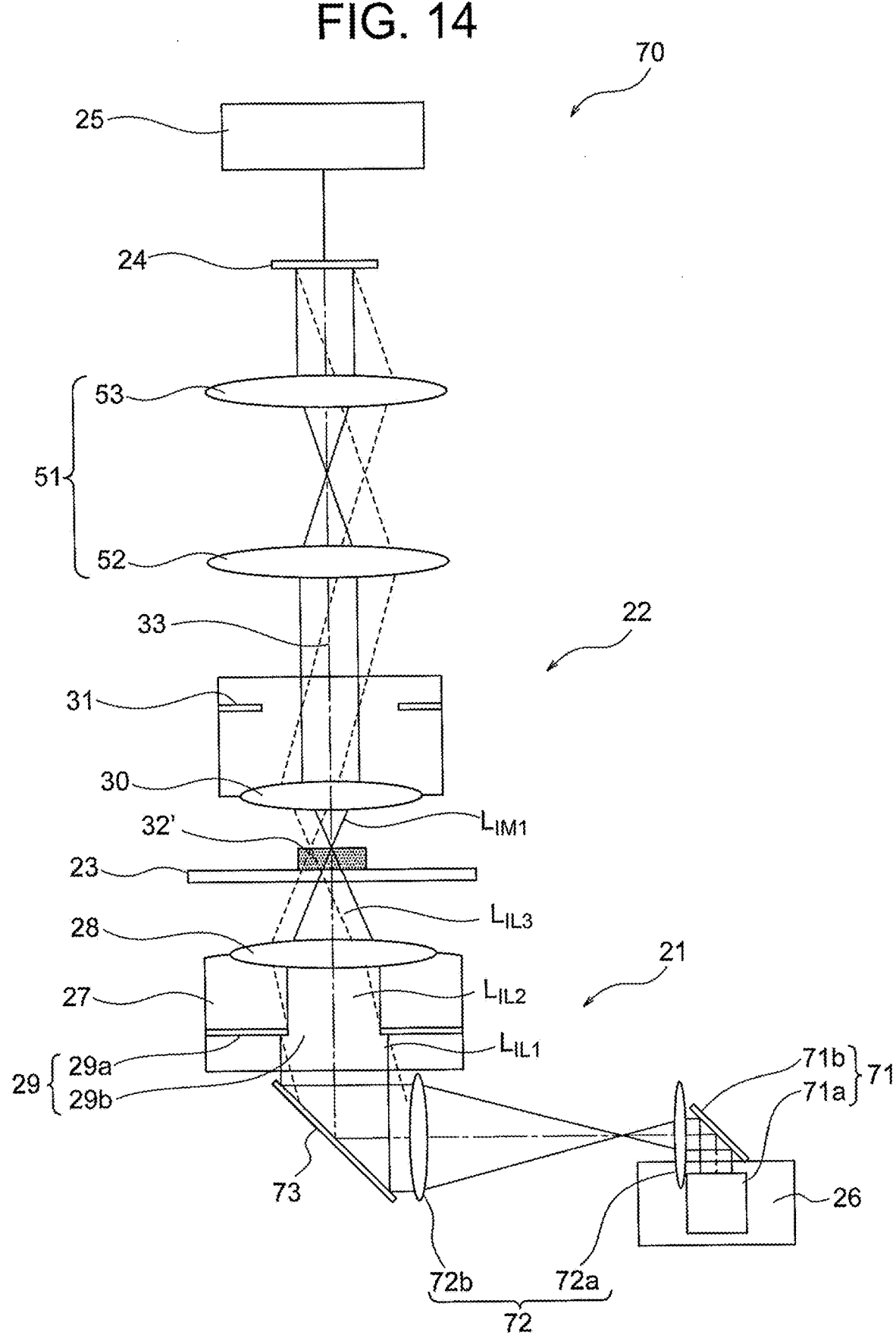
FIG. 14 is a diagram showing an arrangement of a sample shape measuring apparatus of the present embodiment.

FIG. 14 is a diagram showing an arrangement of a sample shape measuring apparatus of the present embodiment. Same reference numerals are assigned to components that are same as in the arrangement in FIG. 11, and the description thereof is omitted.

A sample shape measuring apparatus 70 includes a scanning mechanism 71. The scanning mechanism 71 includes a first light deflecting element and a second light deflecting element. As the first deflecting element and the second deflecting element, a galvano scanner, a polygon mirror, or an acousto optical deflecting element (AOD) may be used.

In the sample shape measuring apparatus 70, a galvano scanner is used for each of the first light deflecting element and the second light deflecting element. In FIG. 14, a mirror of a first galvano scanner (hereinafter, referred to as 'first mirror 71a') and a mirror of a second galvano scanner (hereinafter, referred to as 'second mirror 71b') are shown.

The illumination light $L_{IL1}$ emerged from the light source 26 is incident on the first mirror 71a. The illumination light $L_{IL1}$ is reflected at the first mirror 71a. Next, the illumination light $L_{IL1}$ is incident on the second mirror 71b. The illumination light $L_{IL1}$ is reflected at the second mirror 71b.

In the first light deflecting element, the illumination light $L_{IL1}$ is deflected by changing a direction of the first mirror 71a. In the second light deflecting element, the illumination light $L_{IL1}$ is deflected by changing a direction of the second mirror 71b.

The first light deflecting element is disposed such that an axis of rotation becomes parallel to the paper surface. The second light deflecting element is disposed such that an axis of rotation becomes orthogonal to the paper surface. Therefore, by changing the direction of the first mirror 71a and the direction of the second mirror 71b, the illumination light $L_{IL1}$ is deflected in two orthogonal directions. By making such arrangement, it is possible to carry out the relative movement of the illumination light and the sample by moving the illumination light.

The illumination light $L_{IL1}$ emerged from the second light deflecting element is incident on a relay optical system 72. The relay optical system 72 is an afocal optical system. The relay optical system 72 includes a lens 72a and a lens 72b. The illumination light $L_{IL1}$ emerged from the relay optical system 72, after being reflected at the mirror 73, is incident on the condenser 27.

The first mirror 71a and the second mirror 71b are disposed in proximity. Therefore, the illumination light $L_{IL1}$ can be assumed to be deflected at an intermediate position (hereinafter, referred to as 'intermediate position M') of the first mirror 71a and the second mirror 71b.

The intermediate position M is conjugate with the position of the pupil of the illuminating optical system 21 by the relay optical system 72. More specifically, the position of the transmitting portion 29b is conjugate with the intermediate position M. Therefore, the illumination light $L_{IL1}$ can be assumed to be deflected at the position of the transmitting portion 29b. In FIG. 14, the illumination light $L_{IL1}$ that is deflected is depicted by a dashed line.

In the sample shape measuring apparatus 70, a position of a sample 32' is fixed. Therefore, the direction of the first mirror 71a and the direction of the second mirror 71b are to be changed. By making such arrangement, a collecting point of the illumination light $L_{IL3}$ intersects various locations of a surface of the sample 32'. As a result, it is possible to calculate the amount of inclination at a plurality of positions of the sample 32'.

In the sample shape measuring apparatus 70, the illumination light $L_{IL3}$ is irradiated to the optical axis 33 or to a position away from the optical axis 33 (hereinafter, referred to as 'off-axis position').

In a case in which the illumination light $L_{IL3}$ is irradiated to the optical axis 33, as shown by a solid line, the image forming light $L_{IM1}$ emerges from the optical axis 33. In a case in which there is no inclination on the surface of the sample 32, the image forming light $L_{IM1}$ does not intersect the optical axis 33. Therefore, on a detection element 24 side of the objective lens 30, at any position on the optical axis 33, the center of the image forming light $L_{IM1}$ coincides with the optical axis 33 of the objective lens 30.

Whereas, in a case in which the illumination light $L_{IL3}$ is irradiated to an off-axis position, the image forming light $L_{IM1}$ emerges from the off-axis position as shown by a dashed line. Even in a case in which there is no inclination on the surface of the sample 32, the image forming light $L_{IM1}$ intersects the optical axis 33. Therefore, on the detection element 24 side of the objective lens 30, the center of the image forming light $L_{IM1}$ does not coincide with the optical axis 33 depending on the position on the optical axis 33. When the detection element 24 is disposed at such position, the amount of inclination calculated becomes a wrong value.

For such reason, in the sample shape measuring apparatus 70, it is preferable to dispose the detection element 24 at the pupil position of the observation optical system 22 or a position conjugate with the pupil position of the observation optical system 22. At the pupil position or the position conjugate with the pupil position, even in a case in which there is no inclination on the surface of the sample 32, the center of the image forming light $L_{IM1}$ emerged from the off-axis position and the optical axis 33 coincide. Therefore, it is possible to calculate an accurate amount of inclination.

It is preferable that the sample shape measuring method of the present embodiment include a step of computing the shape of the sample from the plurality of amounts of inclination acquired at the step of moving relatively, and imaging the shape of the sample from the calculated shape.

In the sample shape measuring apparatus of the present embodiment, it is preferable that the processing unit include an imaging circuit which computes the shape of the sample from the plurality of amounts of inclination acquired by the relative movement, and converts the shape of the sample to an image from the shape computed.

Figure 15:
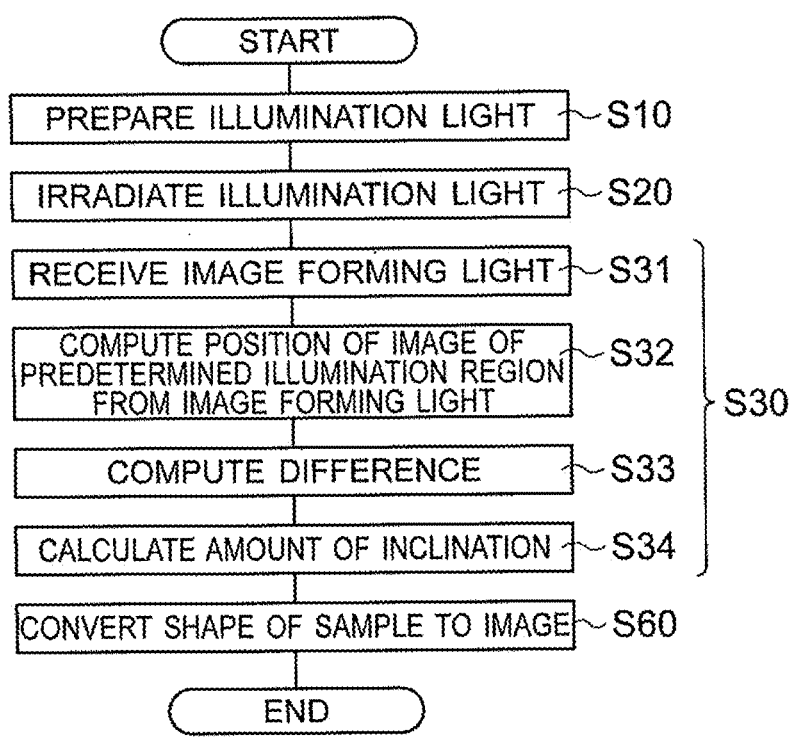
FIG. 15 is a flowchart of the sample shape measuring method of the present embodiment.

A sample shape measuring method of the present embodiment will be described below. FIG. 15 is a flowchart of the sample shape measuring method of the present embodiment. Same reference numerals are assigned to steps that are same as in the flowchart in FIG. 7, and the description thereof is omitted. The sample shape measuring method of the present embodiment includes a step S60 of converting the shape of the sample to an image.

In the sample shape measuring method of the present embodiment, as step S34 is terminated, step S60 is executed. At step S60, the shape of the sample is computed from the amount of inclination, and the shape of the sample is converted to an image from the shape computed. By making such arrangement, it is possible to figure out visually the shape of the sample. Step S30 may include step S60.

In the sample shape measuring method of the present embodiment and the sample shape measuring apparatus of the present embodiment, it is preferable to calculate the amount of inclination based on a correspondence relationship obtained in advance.

As mentioned above, in the sample shape measuring method of the present embodiment and the sample shape measuring apparatus of the present embodiment, the amount of inclination is calculated based on the position of the image of the predetermined illumination region. Therefore, a correspondence relationship between the position of the image of the predetermined illumination region and the amount of inclination is to be obtained in advance. When such an arrangement is made in advance, it is possible to calculate the amount of inclination promptly from the position of the image of the predetermined illumination region, based on the correspondence relationship.

In the sample shape measuring method of the present embodiment, it is preferable that the correspondence relationship be expressed in a lookup table having the position of the image of the predetermined illumination region and the amount of inclination as parameters.

In the sample shape measuring apparatus of the present embodiment, it is preferable that the processing unit have a lookup table having the position of the image of the predetermined illumination region and the amount of inclination as parameters, and calculate the amount of inclination by using the lookup table.

At step S33, a difference between the position of the image of the predetermined illumination region and the reference position is computed. With that, a value identical to the value computed is searched from the lookup table. When there is a value that is identical to the value computed, an angle of inclination corresponding to that value is obtained from the lookup table. Accordingly, it is possible to calculate promptly the amount of inclination at the surface of the sample.

On the other hand, there are also cases in which a value identical to the value computed does not exist in the lookup table. In this case, two values nearest to the value computed are extracted from the lookup table. Moreover, the angle of inclination may be obtained by using the two values that have been extracted. Accordingly, it is possible to calculate the amount of inclination at the surface of the sample.

In the sample shape measuring method of the present embodiment and the sample shape measuring apparatus of the present embodiment, it is preferable to calculate a correction coefficient from a ratio of a size of the image of the predetermined illumination region in a state in which the sample is not there and a size of the image of the predetermined illumination region in a state in which the sample is there, and to correct data of the lookup table by using the correction coefficient.

The pupil position of the observation optical system and the pupil position of the illuminating optical system are conjugate. Therefore, the pupil of the illuminating optical system is projected on the pupil position of the observation optical system. For instance, in the sample shape measuring apparatus 20 shown in FIG. 9, the opening member 29 is disposed on a pupil side of the condenser lens 28. Therefore, the transmitting portion 29b is projected on a position of the pupil 31 of the objective lens.

In a case in which the sample 32 is not placed on the holding member 23, the transmitting portion 29b is projected by the condenser lens 28 and the objective lens 30. A pupil projection magnification at this time is let to be $\beta_p$.

The sample 32, depending on the shape thereof, acts as a lens. A case in which the sample 32 having a lens action (hereinafter, referred to as 'sample $S_L$') is placed on the holding member 23 will be described below.

When the sample $S_L$ is placed on the holding member 23, it is assumed that a principal point of the sample $S_L$ (principal point of lens) coincides with a collecting position of the illumination light $L_{IL3}$. In this case, the sample $S_L$ does not act as a lens. Therefore, the transmitting portion 29b is projected by the condenser lens 28 and the objective lens 30. Therefore, the pupil projection magnification at this time becomes $\beta_P$.

However, it is difficult to figure out the principal point of the sample $S_L$. Therefore, when the sample $S_L$ is placed on the holding member 23, a state in which the principal point of the sample $S_L$ and the collecting position of the illumination light $L_{IL3}$ do not coincide is developed. In this case, since the sample $S_L$ acts as a lens, the transmitting portion 29b is projected by the condenser lens 28, the sample $S_L$, and the objective lens 30. The pupil projection magnification at this time is let to be $\beta'_P$.

A value of $\beta'_P$ and a value of $\beta_P$ differ. When the pupil projection magnification differs, the size of the region of the image forming light $L_{IM1}$ differs. In a case in which there is no inclination on a surface of the sample $S_L$, the center of the image forming light $L_{IM1}$ coincides with the optical axis 33 even when the size of the region of the illumination light $L_{IM1}$ differs. In other words, in a case in which there is no inclination at the surface of the sample $S_L$, the position of the image of the predetermined illumination region does not change even when the pupil projection magnification differs.

Whereas, in a case in which there is an inclination on the surface of the sample $S_L$, since the size of the region of the image forming light $L_{IM1}$ differs, the center of the image forming light $L_{IM1}$ also differs. In other words, shift amount Δ differs. Therefore, in the case in which there is an inclination on the surface of the sample $S_L$, when the pupil projection magnification differs, the position of the image of the predetermined illumination region changes.

For instance, let the data of the lookup table be data at the pupil projection magnification $\beta_P$. The data in this case becomes data prepared in a state when there is no sample $S_L$. When the sample $S_L$ is measured by using this lookup table, in spite of the calculation of the position of the image of the predetermined illumination region being carried out by the pupil projection magnification $\beta'_P$, calculation of the amount of inclination is carried out by using the data at the pupil projection magnification $\beta_P$. Consequently, the amount of inclination that has been calculated becomes a wrong value.

Therefore, a size of the image of the predetermined illumination region (hereinafter, referred to as 'region image A') in the state in which the sample $S_L$ is not there and a size of the image of the predetermined illumination region (hereinafter, referred to as 'region image B') in the state in which the sample $S_L$ is there, are obtained. Thereafter, the correction coefficient is calculated from a ratio of the size of the region image A and the size of the region image B, and the data of the lookup table is corrected by using the correction coefficient. By making such arrangement, it is possible to calculate the accurate amount of inclination without worrying about the collecting position of the illumination light $L_{IL3}$ on the sample $S_L$.

In the sample shape measuring method of the present embodiment, it is preferable that the correspondence relationship be expressed by an expression having the position of the image of the predetermined illumination region and the amount of inclination as parameters.

In the sample shape measuring apparatus of the present embodiment, it is preferable that the processing unit have an expression having the position of the image of the predetermined illumination region and the amount of inclination as parameters.

As described in the measurement principle, the shift amount Δ varies according to the amount of inclination. Therefore, it is possible to express the amount of inclination by an expression having the shift amount Δ as a parameter. The shift amount Δ is an amount of shift in the center position of the image forming light with respect to the optical axis. Moreover, the center position of the image forming light indicates the position of the image of the predetermined illumination region. Therefore, it is possible to express the amount of inclination by an expression (hereinafter, referred to as 'relational expression') having the position of the image of the predetermined illumination region as a parameter.

It is possible to obtain the relational expression theoretically or practically. Therefore, the relational expression is to be obtained in advance. Moreover, in the measurement, an angle of inclination corresponding to the position of the image of the predetermined illumination region is calculated from the relational expression. Accordingly, it is possible to calculate promptly the amount of inclination at the surface of the sample.

In the sample shape measuring method of the present embodiment and the sample shape measuring apparatus of the present embodiment, it is preferable to calculate the correction coefficient from the ratio of the size of the image of the predetermined illumination region in the state in which the sample is not there and the size of the image of the predetermined illumination region in the state in which the sample is there, and to correct the expression having the position of the image of the predetermined illumination region and the amount of inclination as parameters, by using the correction coefficient.

Since the technical significance of finding the correction coefficient has already been described, the description thereof is omitted here.

In the sample shape measuring method of the present embodiment, it is preferable to adjust the position of the sample along the optical axis such that the size of the image of the predetermined illumination region in the state in which the sample is there, coincides with the size of the image of the predetermined illumination region in the state in which the sample is not there.

In the sample shape measuring apparatus of the present embodiment, it is preferable to adjust a position of the holding member along the optical axis such that the size of the image of the predetermined illumination region in the state in which the sample is there, coincides with the size of the image of the predetermined illumination region in the state in which the sample is not there.

As mentioned above, when the sample $S_L$ is placed on the holding member 23, a state in which the principal point of the sample $S_L$ does not coincide with the collecting position of the illumination light $L_{IL3}$ is developed. Therefore, when the correction coefficient is not used, depending on the circumstances, the amount of inclination that has been calculated becomes a wrong value.

For calculating the accurate amount of inclination, the principal point of the sample $S_L$ is to be let to coincide with the collecting position of the illumination light $L_{IL3}$. When such an arrangement is made, the sample $S_L$ ceases to act as a lens. In other words, a state without the sample $S_L$ is developed.

It is possible to find the size of the region image A in advance. With that, the size of the region image B and the size of the region image A are compared. Thereafter, the sample 32 is moved along the optical axis till the size of the region image B matches with the size of the region image A. For moving the sample $S_L$, the holding member 23 is to be moved.

As the size of the region image B matches with the size of the region image A, the movement of the sample $S_L$ is to be stopped. By doing so, it is possible to make the principal point of the sample $S_L$ coincide with the collecting position of the illumination light $L_{IL3}$. In this state, even when the sample $S_L$ is measured, computing of the position of the image of the predetermined illumination region is carried out by the pupil projection magnification $\beta_P$.

Therefore, even in a case in which the data of the lookup table is data prepared in the state in which the sample $S_L$ is not there, this data can be used without correcting. Even in a case in which the relational expression is an expression prepared in the state in which the sample $S_L$ is not there, this relational expression can be used without correcting.

In the sample shape measuring method of the present embodiment and the sample shape measuring apparatus of the present embodiment, it is preferable that a boundary of the predetermined illumination region have either a convex portion or a concave portion, and the convex portion or the concave portion have a boundary which is formed by two straight lines intersecting at an angle not more than 90 degrees.

As mentioned above, by moving the sample 32 along the optical axis till the size of the region image B matches with the size of the region image A, it is possible to make the principal point of the sample $S_L$ coincide with the collecting potion of the illumination light $L_{IL3}$.

Therefore, either the convex portion or the concave portion is provided to the boundary of the predetermined illumination region, and the convex portion or the concave portion is let to have a boundary formed by two straight lines intersecting at an angle not more than 90 degrees. By making such arrangement, it is possible to compare the size of the region image B and the size of the region image A easily.

In the sample shape measuring apparatus 20 shown in FIG. 9, the predetermined illumination region is formed by the transmitting portion 29b. The boundary of the predetermined illumination region is a boundary between the light shielding portion 29a and the transmitting portion 29b. Therefore, either the convex portion or the convex portion is to be provided to the opening member 29.

In the sample shape measuring method of the present embodiment and the sample shape measuring apparatus of the present embodiment, it is preferable that the following conditional expression (1) be satisfied:

$$0<\sigma<0.9 \tag{1}$$

where, $\sigma$ is expressed by $\sigma=NA_{ill}/NA_{ob}$, and here $NA_{ill}$ denotes a numerical aperture of illumination light passed through the predetermined illumination region, and $NA_{ob}$ denotes a numerical aperture on a sample side of the observation optical system.

Figure 16A:
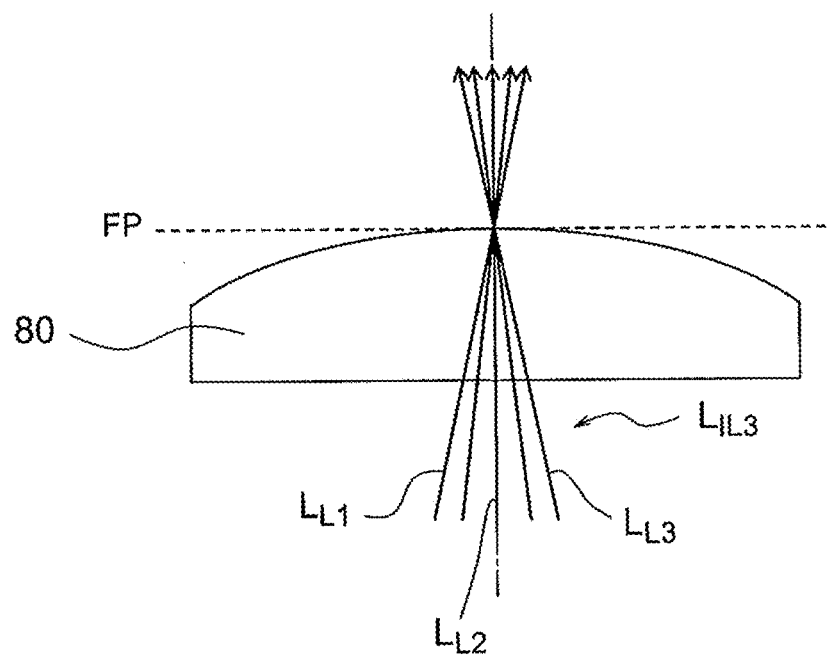
FIG. 16A is a diagram showing an appearance of illumination light passing through a sample.
Figure 16B:
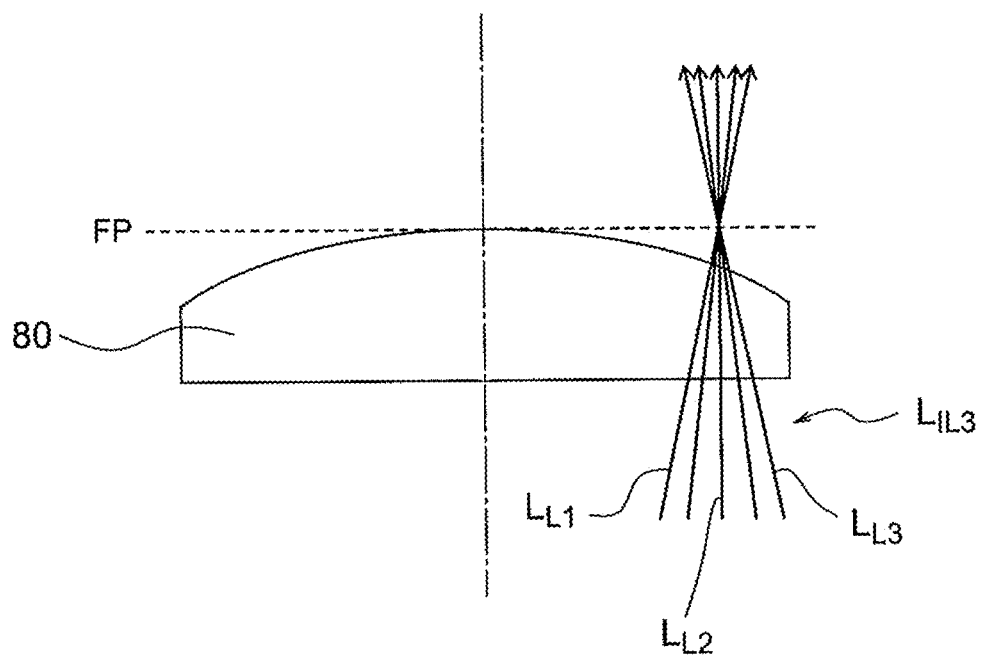
FIG. 16B is a diagram showing an appearance of illumination light passing through the sample.

FIG. 16A and FIG. 16B are diagrams showing an appearance of the illumination light passing through the sample. In FIG. 16A, the illumination light $L_{IL3}$ passes through a middle of a surface of a sample 80. Moreover, the surface of the sample 80 and the collecting position of the illumination light $L_{IL3}$ coincide with a focusing position FP. In this case, a light ray $L_{L1}$, a light ray $L_{L2}$, and a light ray $L_{L3}$ pass through a same point on the surface of the sample 80.

When the illumination light $L_{IL3}$ and the sample 80 are moved relatively in a plane orthogonal to the optical axis, the position of the illumination light $L_{IL3}$ passing through the sample 80 changes as shown in FIG. 16B. In FIG. 16B, the illumination light $L_{IL3}$ passes through a peripheral portion of the surface of the sample 80. In this case, the surface of the sample 80 does not coincide with the focusing position FP at a position through which the illumination light $L_{IL3}$ passes. Therefore, the light ray $L_{L1}$, the light ray $L_{L2}$, and the light ray $L_{L3}$ cease to pass through the same point on the surface of the sample 80.

In a case of exceeding an upper limit value of conditional expression (1), a numerical aperture of the illumination light passed through a predetermined illumination region becomes large. In this case, on the sample surface shifted from the focusing positioned, a position of passing through the sample differs for each of the light ray $L_{L1}$, the light ray $L_{L2}$, and the light ray $L_{L3}$.

When the angle of inclination of the surface of the sample differs for each of the position through which the light ray $L_{L1}$ passes, the position through which the light ray $L_{L2}$ passes, and the position through which the light ray $L_{L3}$ passes, an angle of refraction at each position differs. In this case, the shape of the image of the predetermined illumination region is deformed. As a result, the position of the image of the predetermined illumination region cannot be computed accurately. Consequently, an accuracy of measurement is degraded.

As the numerical aperture of the illumination light passed through the predetermined illumination region becomes larger, the shift in the position through which the light ray $L_{L1}$ passes with respect to the position through which the light ray $L_{L2}$ passes and the shift in the position through which the light ray $L_{L3}$ passes with respect to the position through which the light ray $L_{L2}$ passes (hereinafter, referred to as 'shift in the position of passage') becomes larger. Moreover, as the shift from the focusing position of the sample surface becomes larger, the shift in the position of passage becomes larger.

In a case of falling below a lower limit value of conditional expression (1), the numerical aperture on a sample side of the illuminating optical system becomes small, and an inadequacy of an amount of the illumination light occurs. Moreover, when there is dirt on the sample or in the optical path, the accuracy of measurement is degraded due to an effect of the dirt.

It is more preferable that the following conditional expression (1') be satisfied instead of conditional expression (1).

$$0.02<\sigma<0.7 \tag{1'}$$

It is even more preferable that the following conditional expression (1") be satisfied instead of conditional expression (1).

$$0.05<\sigma<0.5 \tag{1"}$$

In the sample shape measuring method of the present embodiment and the sample shape measuring apparatus of the present embodiment, it is preferable that at least one of the shape of the predetermined illumination region and the area of the predetermined illumination region be variable.

As mentioned above, as the numerical aperture of the illumination light passed through the predetermined illumination region becomes large, in the sample surface shifted from the focusing position, the shift in the position of passage becomes large for each light ray of the illumination light. Therefore, at least one of the shape of the predetermined illumination region and the area of the predetermined illumination region is to be variable. By doing so, it is possible make small the numerical aperture of the illumination light passed through the predetermined illumination region. As a result, it is possible to make the shift in the position of passage small even at the sample surface shifted from the focusing position.

In the sample shape measuring apparatus 20 shown in FIG. 9, the predetermined illumination region is formed by the transmitting portion 29b. Therefore, in the transmitting portion 29b, an arrangement is to be made such that at least one of the shape and the area can be variable.

In the sample shape measuring method of the present embodiment and the sample shape measuring apparatus of the present embodiment, it is preferable that the shape of the predetermined illumination region be axisymmetric with respect to the optical axis.

When the shape of the predetermined illumination region is let to be axisymmetric with respect to the optical axis, the image of the predetermined illumination region becomes circular-shaped. Therefore, it is possible to compute easily the position of the image of the predetermined illumination region.

In the sample shape measuring apparatus 20 shown in FIG. 9, the predetermined illumination region is formed by the transmitting portion 29b. Therefore, the shape of the transmitting portion is to be made axisymmetric with respect to the optical axis 33.

In the sample shape measuring method of the present embodiment and the sample shape measuring apparatus of the present embodiment, it is preferable that a light quantity distribution of the illumination light be axisymmetric with respect to the optical axis.

By making such arrangement, an unevenness of the illumination light need not be taken into consideration. Therefore, it is possible to compute easily the position of the image of the predetermined illumination region. The light quantity distribution signifies distribution of light intensity in a plane orthogonal to the optical axis.

In the sample shape measuring method of the present embodiment and the sample shape measuring apparatus of the present embodiment, it is preferable that the light quantity distribution of the illumination light is such that a quantity of light become gradually smaller in a direction away from the optical axis.

By making such arrangement, it is possible to narrow a range of the illumination light irradiated to the sample surface. As a result, it is possible to make small the shift in the passage position on the sample surface shifted from the focusing position. The light quantity distribution signifies the distribution of light intensity on a plane orthogonal to the optical axis.

In the sample shape measuring method of the present embodiment and the sample shape measuring apparatus of the present embodiment, it is preferable that the illumination light is monochromatic light or light having a wavelength region narrower than a wavelength region of white light.

By making such arrangement, it is possible to narrow the wavelength region of the illumination light. Consequently, it is possible to suppress an occurrence of a chromatic aberration in an image of the pupil of the illuminating optical system. In this case, it is possible to improve a contrast of the image of the predetermined illumination region. As a result, since the accuracy of computing the position of the image of the predetermined illumination region is improved, it is possible to calculate the accurate amount of inclination.

Moreover, by changing a wavelength of the illumination light, wavelength characteristic information of the sample is achieved.

In the sample shape measuring apparatus 20 shown in FIG. 9, a light source which generates monochromatic light is to be used as the light source 26. Or, a light source which generates white light may be used as the light source 26. In this case, an optical filter is disposed in a space between the light source 26 and the holding member 23. Moreover, spectral transmission characteristic of the optical filter is to be made such that light having a wavelength region narrower than a wavelength region of the white light is transmitted.

In the sample shape measuring method of the present embodiment and the sample shape measuring apparatus of the present embodiment, it is preferable to receive only light from within a focal depth of the observation optical system.

Figure 17:
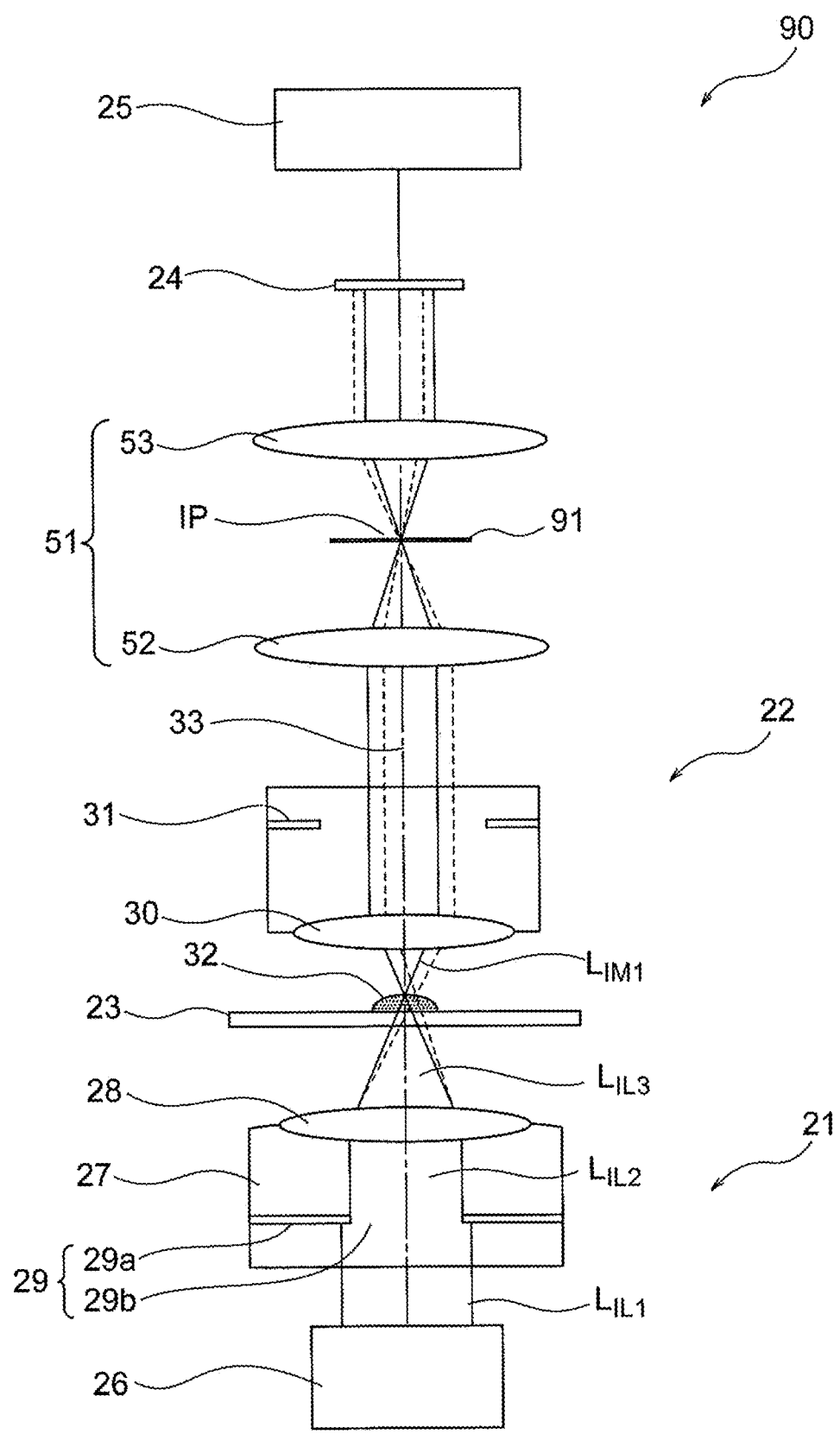
FIG. 17 is a diagram showing an arrangement of a sample shape measuring apparatus of the present embodiment.

FIG. 17 is a diagram showing an arrangement of a sample shape measuring apparatus of the present embodiment. Same reference numerals are assigned to components that are same as in the arrangement in FIG. 11, and the description thereof is omitted. In FIG. 17, the image forming light $L_{IM1}$ in the case in which there is no inclination on the surface of the sample is depicted by solid lines, and the image forming light $L_{IM1}$ in the case in which there is an inclination on the surface of the sample is depicted by dashed lines.

The image forming light $L_{IM1}$ emerged from the sample 32 passes through the objective lens 30, and is collected at the lens 52. The collecting position IP is conjugate with the focusing position of the observation optical system 22. In a case in which the sample 32 is disposed at the focusing position of the observation optical system 22, an image of the sample 32 is formed at the collecting position IP. Therefore, both the image forming light $L_{IM1}$ in the case in which there is no inclination on the surface of the sample 32 and the image forming light $L_{IM1}$ in the case in which there is an inclination on the surface of the sample 32 are collected at the collecting position IP.

In a case in which the sample 32 is a transmitting sample, the image forming light is emerged also from an interior of the sample 32. The image forming light emerged from a position other than a focal depth of the observation optical system is image forming light which has no effect on the inclination of the surface of the sample 32 (hereinafter, referred to as 'noise light'). When the noise light is received together with the image forming light $L_{IM1}$ from the surface of the sample 32, it becomes difficult to calculate the accurate amount of inclination.

An arrangement is to be made such that only light from within the focal depth of the observation optical system is received. For this, in a sample shape measuring apparatus 90, a stop 91 is disposed at the collecting position IP.

The noise light emerges from a position other than the focal depth of the observation optical system 22. Therefore, the noise light is collected in the vicinity of the collecting position IP. In other words, at the collecting position, the noise light is spread to certain extent. On the other hand, the image forming light $L_{IM1}$ from the surface of the sample 32 emerges from a position in the focal depth. The image forming light $L_{IM1}$ being collected at the collecting position IP, the image forming light $L_{IM1}$ is almost not spread. Therefore, a size of the opening portion of the stop 91 is to be made a size that allows the image forming light $L_{IM1}$ from the surface of the sample to pass through.

By making such arrangement, it is possible to eliminate the noise light. Consequently, it is possible to calculate the accurate amount of inclination. As a result, it is possible to improve the accuracy of measurement.

As shown in FIG. 14, in an arrangement in which the illumination light $L_{IL1}$ is moved, the image forming light $L_{IM1}$ moves at the collecting position IP. Therefore, in a case of disposing the stop 91 at the collecting position IP, it is preferable to use an arrangement in which the sample is moved, as shown in FIG. 13.

In the sample shape measuring method of the present embodiment and the sample shape measuring apparatus of the present embodiment, it is preferable that a magnification of the observation optical system be variable.

By making such arrangement, it is possible to change detection sensitivity and detection range. For instance, in the sample shape measuring apparatus 50 shown in FIG. 11, for making the detection sensitivity high, a magnification of the relay optical system 51 is to be made large. Moreover, for widening the detection range, the magnification of the relay optical system 51 is to be made small. The detection sensitivity indicates the minimum amount of inclination that is detectable, and the detection range indicates the maximum amount of inclination that is detectable.

For changing the magnification of the relay optical system 51, at least one of the lens 52 and the lens 53 is to be replaced. When the lens 52 or the lens 53 is replaced, the focal position is changed. Therefore, it is necessary to adjust a position in the optical axial direction. The relay optical system 51 may be let to be an afocal zoom.

By replacing the objective lens 30 by another objective lens having different magnification, it is possible to change the detection sensitivity and the detection range.

In the sample shape measuring method of the present embodiment and the sample shape measuring method of the present embodiment, it is preferable to calculate a quantity of light in a peripheral portion, of light emerged from the observation optical system.

Figure 18A:
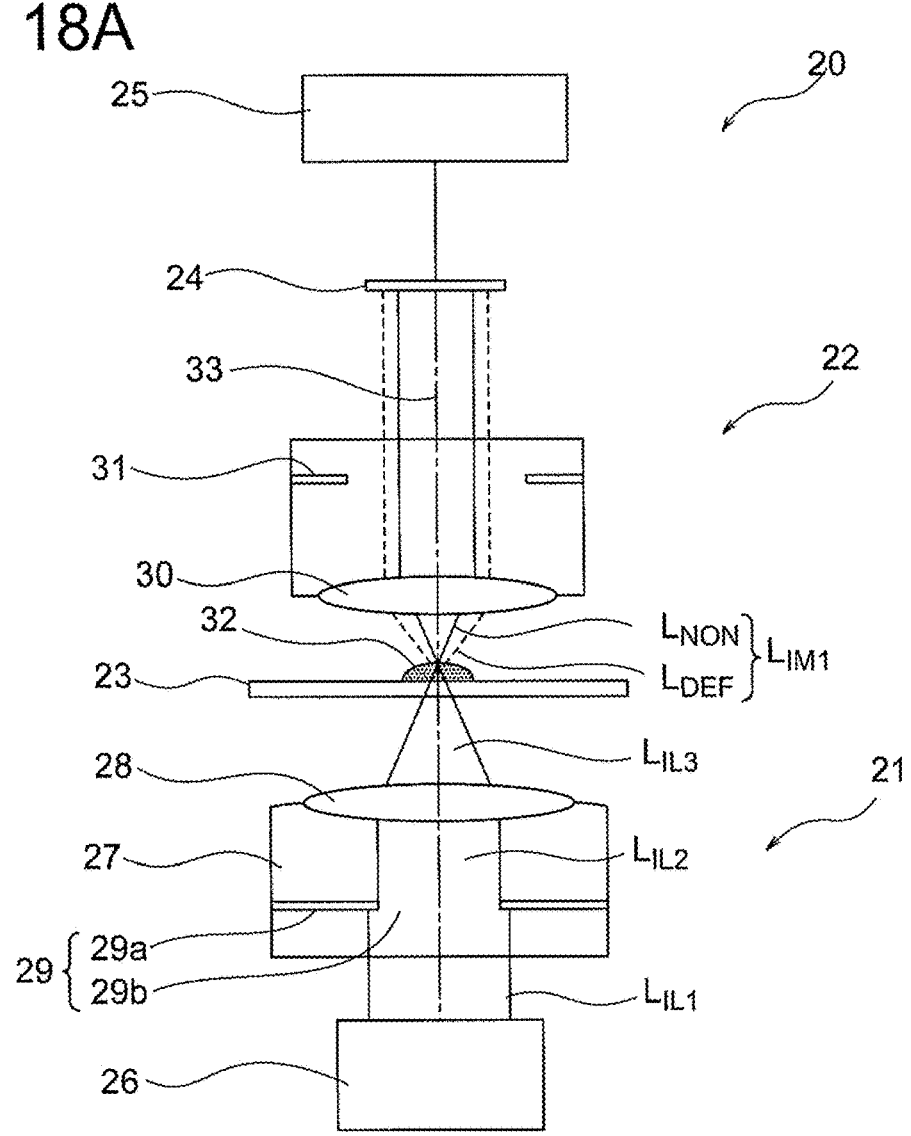
FIG. 18A is a diagram showing an arrangement of a sample shape measuring apparatus of the present embodiment.
Figure 18B:
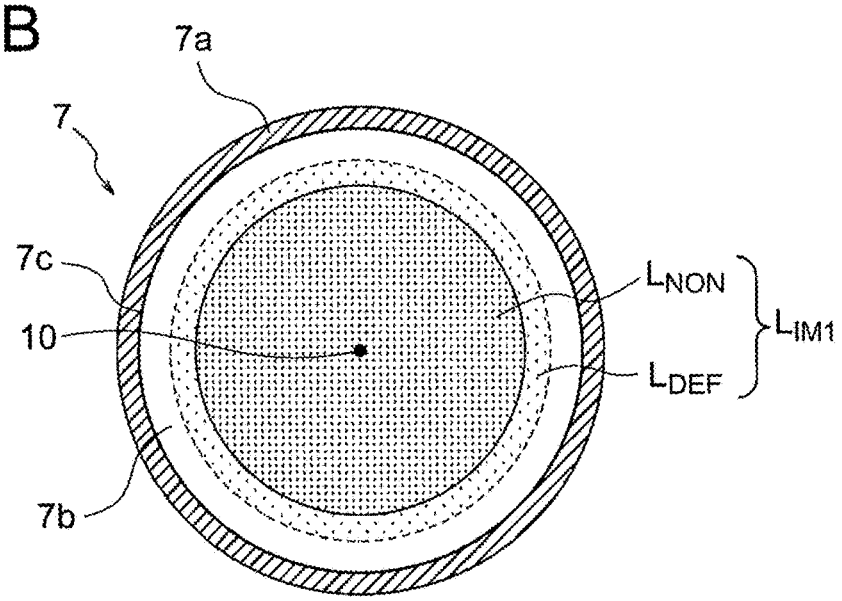
FIG. 18B is a diagram showing an appearance of image forming light.

FIG. 18A is a diagram showing an arrangement of a sample shape measuring apparatus of the present embodiment. FIG. 18B is a diagram showing an appearance of the image forming light.

In a case in which there are no asperities on the surface of the sample 32, diffracted light and scattered light are not included in the image forming light $L_{IM1}$. However, in a case in which there are regular asperities on the surface of the sample 32, diffracted light $L_{DEF}$ emerges from the sample 32. In this case, the image forming light $L_{IM1}$ includes non-diffracted light $L_{NON}$ and diffracted light $L_{DEF}$. Moreover, the diffracted light $L_{DEF}$ is distributed around the non-diffracted light $L_{NON}$.

A size of a region of the non-diffracted light $L_{NON}$ is a size of the image of the predetermined illumination region. An inner side of the image of the predetermined illumination region becomes the region of the non-diffracted light $L_{NON}$ and an outer side of the image of the predetermined illumination region becomes the region of the diffracted light $L_{DEF}$. It is possible to find the size of the image of the predetermined illumination region by calculation in advance. Therefore, it is possible to detect the non-diffracted light $L_{NON}$ and the diffracted light $L_{DEF}$ separately.

The predetermined illumination region is formed by the transmitting portion 29b. A range of the image of the transmitting portion 29b at a position of the detection element 24 is obtained from a range of the transmitting portion 29b and the pupil projection magnification of the optical system. It is possible to calculate the pupil projection magnification by the following expression.

pupil projection magnification=focal length of objective lens/focal length of condenser lens Sometimes, apart from the objective lens 30, a lens is disposed in the observation optical system 22. In such case, it is possible to calculate the pupil projection magnification by the following expression. Here, it is assumed that an image forming lens and a pupil projection lens are disposed in the observation optical system 22. In this case, it is possible to calculate the pupil projection magnification by the following expression.

pupil projection magnification=(focal length of objective lens×focal length of pupil projection lens)/(focal length of condenser lens×focal length of image forming lens)

The range of the image of the transmitting portion 29b depicts an image of the predetermined illumination region. Therefore, a sensor such as a CCD image sensor and a CMOS image sensor is to be used as the detection element 24. Then, out of information of pixels read out from the detection element 24, information of pixels corresponding to an outer side of the image of the predetermined illumination region is extracted. By doing so, it is possible to acquire information related to a region of the diffracted light $L_{DEF}$. From the information acquired, it is possible to achieve optical characteristics related to asperities of the surface of the sample 32, such as optical information including roughness information.

Information of pixels corresponding to an inner side of the image of the predetermined illumination region includes information of a region of the non-diffracted light $L_{NON}$. The information related to the region of the non-diffracted light $L_{NON}$ corresponds to information related to the amount of inclination. Therefore, by extracting only the information related to the region of the non-diffracted light $L_{NON}$, it is possible to measure the amount of inclination accurately.

An optical intensity of the non-diffracted light $L_{NON}$ is larger as compared to an optical intensity of the diffracted light $L_{DEF}$. Therefore, a threshold value related to the optical intensity is set and only information of pixels that have received light of optical intensity higher than the threshold value is extracted. By doing so, it is possible to extract only information related to the region of the non-diffracted light $L_{NON}$.

Moreover, an efficiency of diffraction differs according to a direction of polarization of incident light. Therefore, by disposing a polarizing element in an optical path of the observation optical system 22, it is possible to extract polarization information related to the region of the diffracted light $L_{DEF}$.

With respect to the scattered light, it is possible to eliminate by disposing the stop 91 at the collecting position IP as shown in FIG. 17. By eliminating the scattered light, it is possible to measure the amount of inclination accurately.

It is preferable that the sample shape measuring method of the present embodiment include a step of moving the observation optical system and the sample relatively, along the optical axis.

It is preferable that the sample shape measuring apparatus of the present embodiment includes a driving mechanism which moves the observation optical system and the holding member relatively, along the optical axis.

Figure 19:
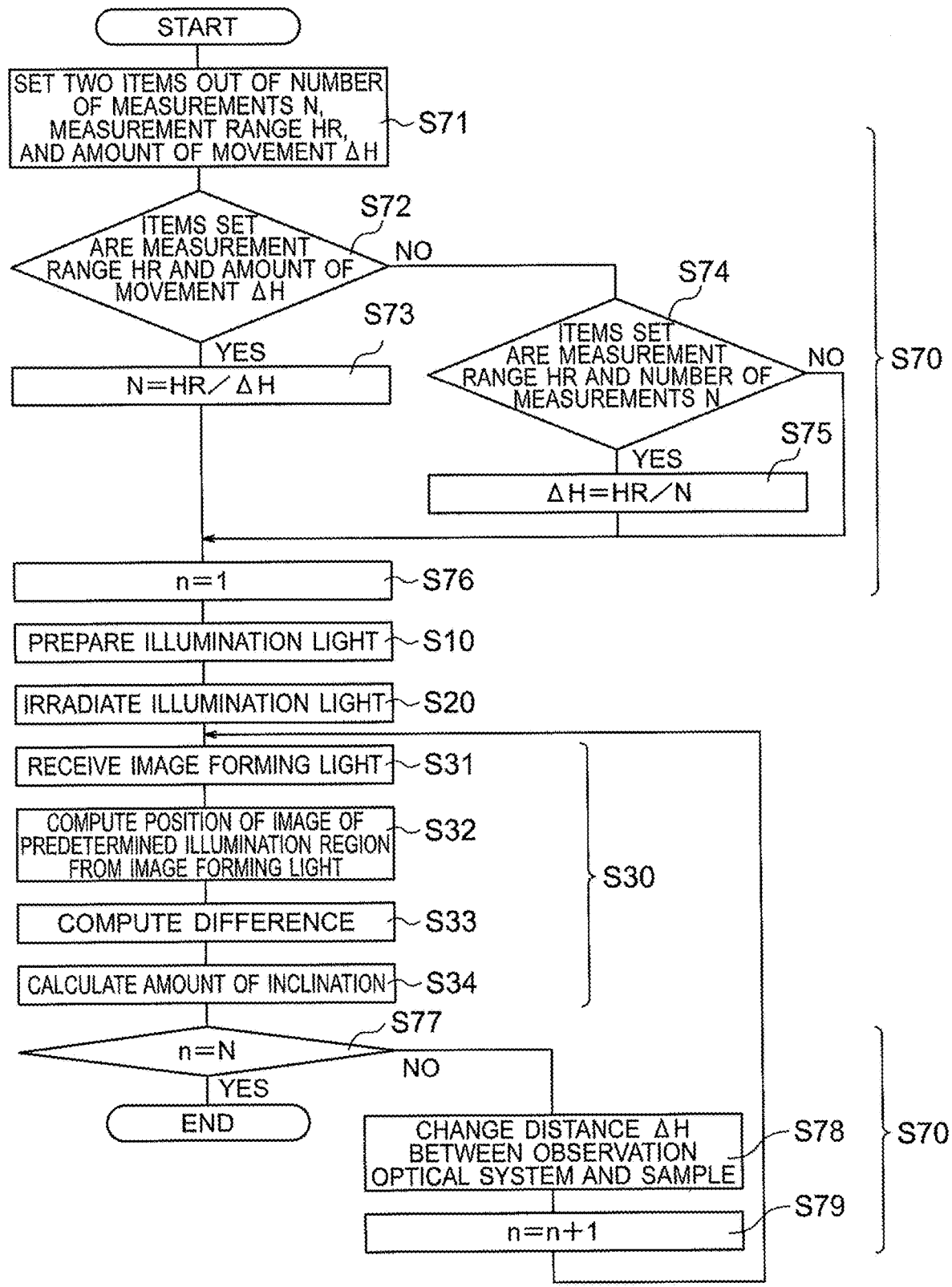
FIG. 19 is a flowchart of a sample shape measuring method of the present embodiment.

A sample shape measuring method of the present embodiment will be described below. FIG. 19 is a flowchart of the sample shape measuring method of the present embodiment. Same reference numerals are used for steps that are same as in the flowchart in FIG. 7, and the description thereof is omitted. The sample shape measuring method of the present embodiment includes step S70 of moving the observation optical system and the sample relatively.

In the basic measurement method, the amount of inclination at the surface of the sample is calculated based on the position of the image of the predetermined illumination region. The position of the image of the predetermined illumination region changes according to the amount of inclination at the surface of the sample, and also changes by the sample being shifted from a focal point of the observation optical system. In a state of the sample being shifted substantially from the focal point of the observation optical system, it is not possible to calculate accurately the amount of inclination at the surface of the sample. Furthermore, in this state, a spatial resolution at a plane orthogonal to the optical axis is degraded.

In such manner, in the sample shape measuring method of the present embodiment, in a direction along the optical axis, a range in which it is possible to calculate accurately the amount of inclination at the surface of the sample is restricted. This range is expressed by $\lambda/NA_{ob}^2$. Therefore, in a case in which a height of the sample surpasses this range, it is not possible to measure the shape of the sample by measuring once. For such reason, the sample shape measuring method of the present embodiment includes step S70 of moving the observation optical system and the sample relatively.

Step S70 includes step S71 of setting measurement items, step S72 of confirming the measurement items, step S73 of setting the number of measurements, step S74 of confirming the measurement items, step S75 of setting an amount of movement, step S76 of initializing the number of repetitions, step S77 of confirming the number of repetitions, step S78 of changing a distance between the observation optical system and the sample, and step S79 of increasing a value of the number of repetitions.

At step S70, step S71 is executed. Step S71 is a step of setting the measurement items. At step S71, two items out of the number of measurements N, a range of measurement HR, and an amount of movement ΔH are set.

As step S71 is terminated, step S72 is executed. Step S72 is a step of confirming the measurement items. In a case in which the range of measurement HR and the amount of movement ΔH are set, step S73 is executed. Step S73 is a step of setting the number of measurements. At step S73, the number of measurements N is set from the range of measurement HR and the amount of movement ΔH. As step S73 is terminated, step S76 is executed.

In a case in which the range of measurement HR and the amount of movement ΔH have not been set, step S74 is executed. Step S74 is a step of confirming the measurement items. In a case in which the range of measurement HR and the number of measurements N are set, step S75 is executed. Step S75 is a step of setting the amount of movement ΔH. At step S75, the amount of movement ΔH is set from the range of measurement HR and the number of measurements N. As step S75 is terminated, step S76 is executed.

In a case in which the number of measurements N and the range of measurement HR have not been set, the amount of movement ΔH and the number of measurements N have been set. Therefore, step S76 is executed.

Step S76 is a step of initializing the number of repetitions. At step S76, initialization of the number of repetitions is carried out. More specifically, a value of a variable n which indicates the number of repetitions is let to be 1.

As step S76 is terminated, steps from step S10 up to step S30 are executed, and accordingly, a first measurement is carried out.

As step S30 is terminated, step S77 is executed. At step S77, confirmation of the number of repetitions n is carried out. In a case in which the value of the number of repetitions n does not match with the number of measurements N, step S78 is executed. Step S78 is a step of changing the distance between the observation optical system and the sample. At step S78, either the sample is moved without changing the position of the observation optical system or the observation optical system is moved without changing the position of the sample.

As step S78 is terminated, step S79 is executed. At step S79, the value of the number of repetitions is changed. More specifically, 1 is added to the value of the variable n expressing the number of repetitions. As step S78 is terminated, processing returns to step S30. Thereafter, step S30 is re-executed.

By the execution of step S30, a second measurement is carried out. Here, a measurement position is moved to a position different from a first measurement position. Therefore, the second measurement is carried out at a different height on the sample.

The abovementioned processing is carried out till the value of the variable n expressing the number of repetitions matches with the number of measurements N. Accordingly, it is possible to measure a range wider than the measurement range.

Figure 20:
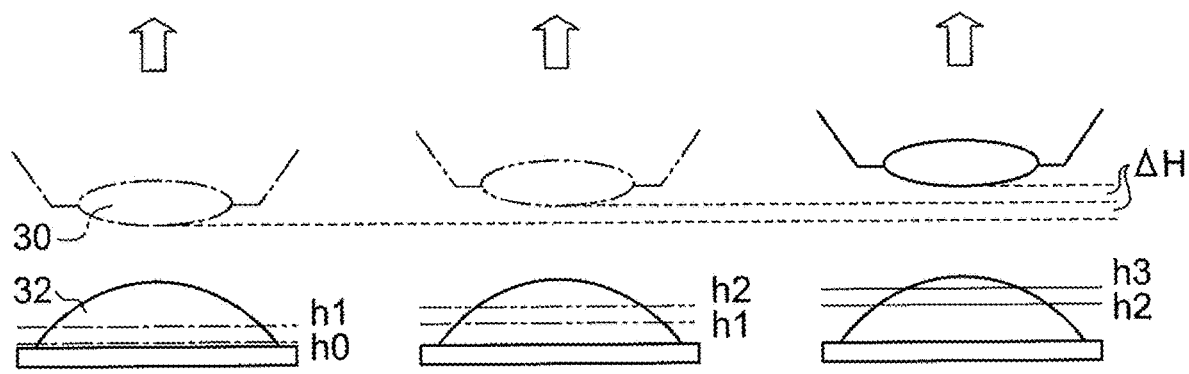
FIG. 20 is a diagram showing how the measurement is made by a sample shape measuring method of the present embodiment.

FIG. 20 is a diagram showing how the measurement is made by a sample shape measuring method of the present embodiment. Diagram on a left side shows how the first measurement is made, a diagram in the middle shows how the second measurement is made, and a diagram on a right side shows how a third measurement is made.

As the number of measurements goes on increasing, the objective lens 30 moves only by the amount of movement ΔH in a direction away from the sample 32. Moreover, with the movement of the objective lens 30, the measurement position on the sample 32 moves to positions h0, h1, and a position h2.

Moreover, the range in which the amount of inclination can be calculated accurately moves from bottom to top in order of a range from the position h0 up to the position h1, a range from the position h1 up to the position h2, and a range from the position h2 up to a position h3. By summing up three measurements, it is possible to calculate the amount of inclination on the surface of the sample accurately over a wide range from the position h0 up to the position h3.

In the sample shape measuring method of the present embodiment and the sample shape measuring apparatus of the present embodiment, it is preferable that the predetermined illumination regions be in plurality.

Figure 21:
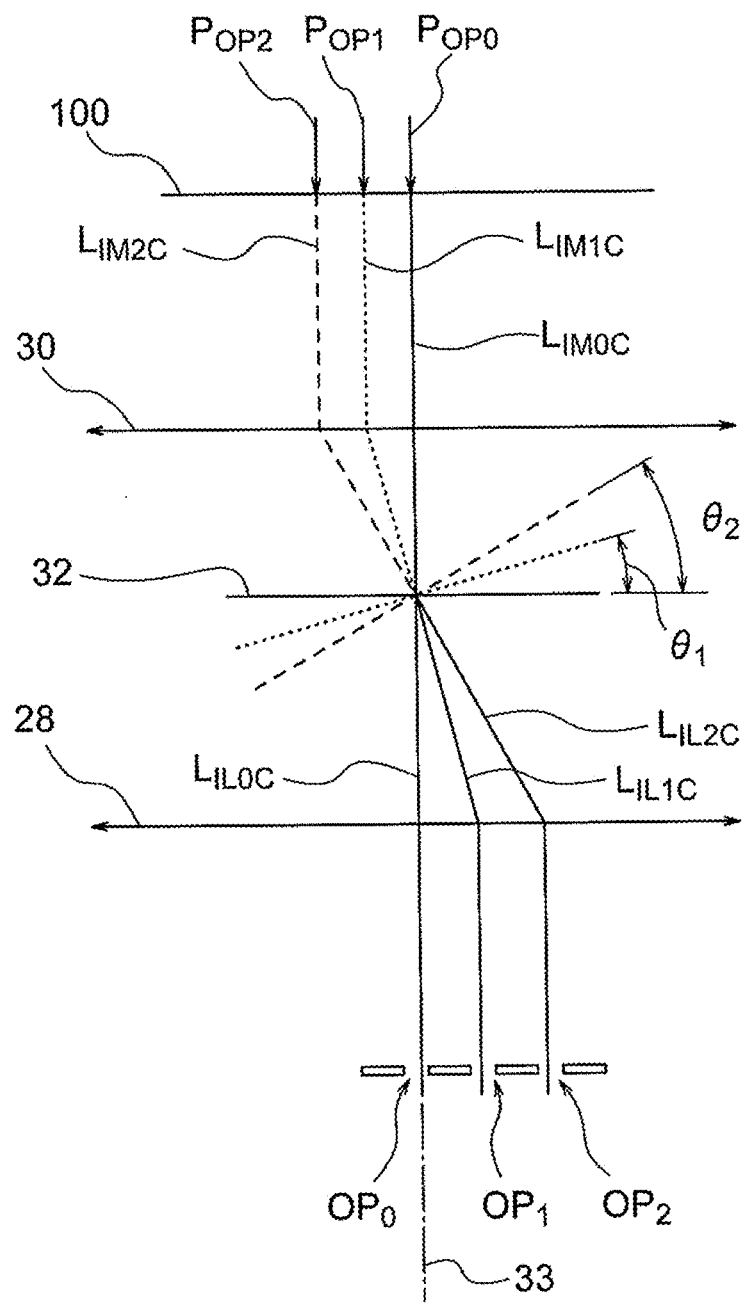
FIG. 21 is a diagram showing a relationship of an angle of inclination of a surface of a sample and a central ray of image forming light.

FIG. 21 is a diagram showing a relationship between the angle of inclination of the surface of the sample and the central light ray of the image forming light. In FIG. 21, the condenser lens 28 and the objective lens 30 are indicated by arrows. A plane 100 is a plane orthogonal to the optical axis 30. An opening $OP_0$, an opening $OP_1$, and an opening $OP_2$ are provided at a pupil position of the condenser lens 28.

In FIG. 21, for describing a refraction of light at the surface of the sample, only the surface of the sample is depicted. Therefore, a rear surface of the sample is omitted in the diagram. Similarly, an appearance of refraction of light at the rear surface is also omitted. Even in FIG. 22 to FIG. 24, only a front surface of the sample is depicted.

A central light ray $L_{IL0C}$ is a central light ray of the illumination light passing through a center of the opening $OP_0$. When the angle of inclination of the surface of the sample 32 is 0 degrees, a direction of travel of the central light ray $L_{IL0C}$ becomes parallel to a normal of a plane. Therefore, the central light ray $L_{IL0C}$ is not refracted at the surface of the sample 32. A central light ray $_{LIM0C}$ emerges from the sample 32. The central light ray $L_{IM0C}$ reaches a position $P_{OP0}$ on the plane 100.

A central light ray $L_{IL1C}$ is a central light ray of the illumination light passing through a center of the opening $OP_1$. When the angle of inclination of the surface of the sample 32 is $θ_1$ degrees, a direction of travel of the central light ray $L_{IL1C}$ becomes parallel to the normal of the plane. Therefore, the central light ray $L_{IL1C}$ is not refracted at the surface of the sample 32. A central light ray $L_{IM1C}$ emerges from the sample 32. The central light ray $L_{IM1C}$ reaches a position $P_{OP1}$ on the plane 100.

A central light ray $L_{IL2C}$ is a central light ray of illumination light passing through a center of the opening $OP_2$. When the angle of inclination of the surface of the sample 32 is $θ_2$ degrees, a direction of travel of the central light ray $L_{IL2C}$ becomes parallel to the normal of the plane. Therefore, the central light ray $L_{IL2C}$ is not refracted at the surface of the sample 32. A central light ray $L_{IM2C}$ emerges from the sample 32. The central light ray $L_{IM2C}$ reaches a position $P_{OP2}$ on the plane 100.

The description is made below with reference to the position $P_{OP0}$, the position $P_{OP1}$, and the position $P_{OP2}$.

Moreover, the central light ray $L_{IM0C}$ indicates a center of an image of the opening $OP_0$. The central light ray $L_{IM1C}$ indicates a center of an image of the opening $OP_1$. The central light ray $L_{IM2C}$ indicates a center of an image of the opening $OP_2$. Therefore, the description is made below by using 'center of the image of the opening'.

Figure 22:
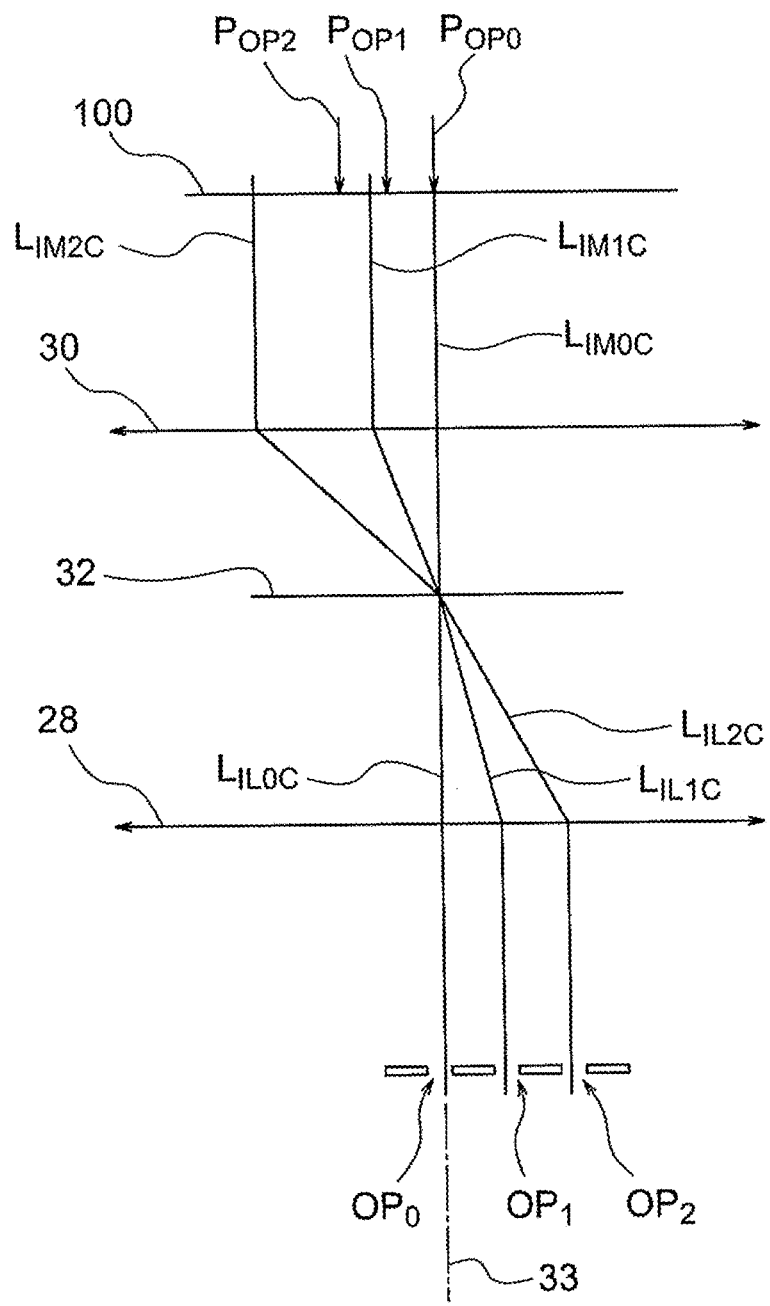
FIG. 22 is a diagram showing a center position of the image forming light when the inclination of the surface of the sample is 0 degrees.

FIG. 22 is a diagram showing a center position of the image forming light when the angle of inclination of the surface of the sample is 0 degrees. Same reference numerals are assigned to components that are same as in FIG. 21, and the description thereof is omitted.

When the angle of inclination of the surface of the sample 32 is 0 degrees, the center of the image of the opening $OP_0$ coincides with the position $P_{OP0}$. Whereas, the center of the image of the opening $OP_1$ does not coincide with the position $P_{OP1}$. Moreover, the center of the image of the opening $OP_2$ does not coincide with the position $P_{OP2}$.

Figure 23:
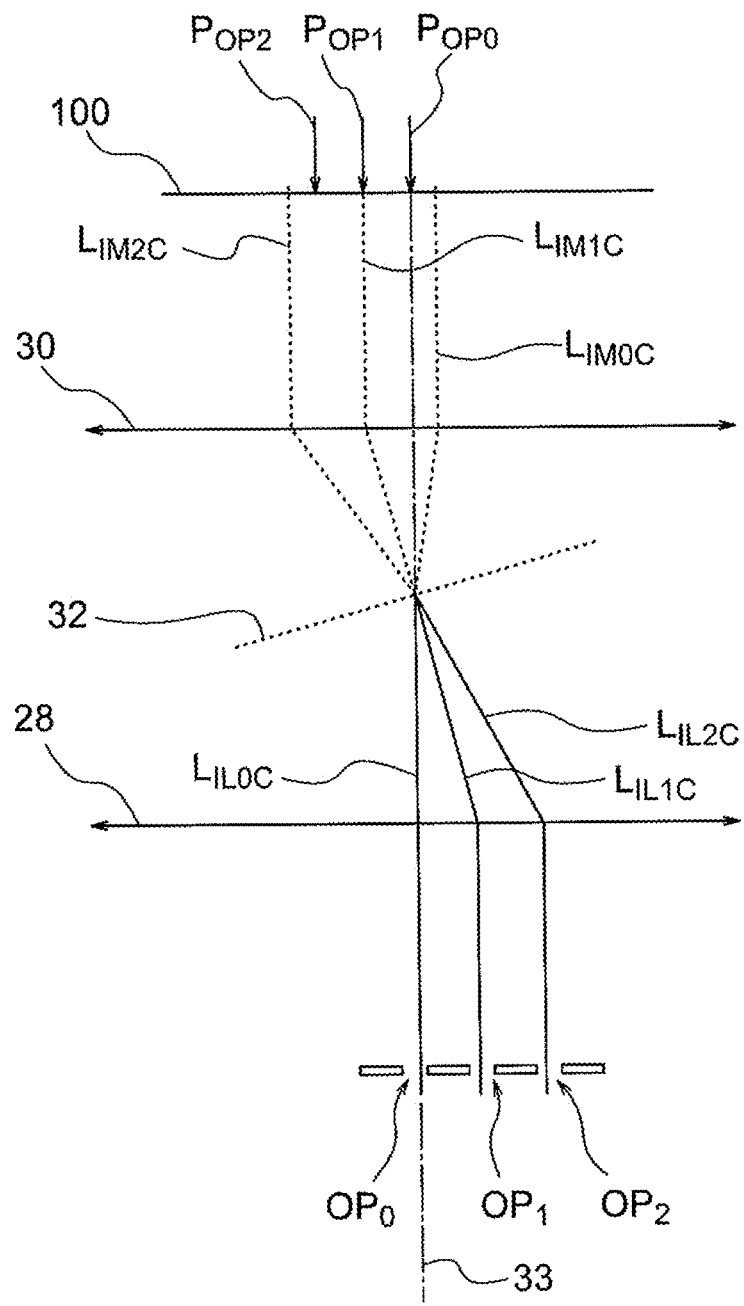
FIG. 23 is a diagram showing a center position of the image forming light when the inclination of the surface of the sample is θ1 degrees.

FIG. 23 is a diagram showing a center position of the image forming light when the angle of inclination of the surface of the sample is $θ_1$ degrees. Same reference numerals are assigned to components that are same as in FIG. 21, and the description thereof is omitted.

When the angle of inclination of the surface of the sample 32 is $θ_1$ degrees, the center of the image of the opening $OP_1$ coincides with the position $P_{OP1}$. Whereas, the center of the image of the opening $OP_0$ does not coincide with the position $P_{OP0}$. Moreover, the center of the image of the opening $OP_2$ does not coincide with the position $P_{OP2}$.

Figure 24:
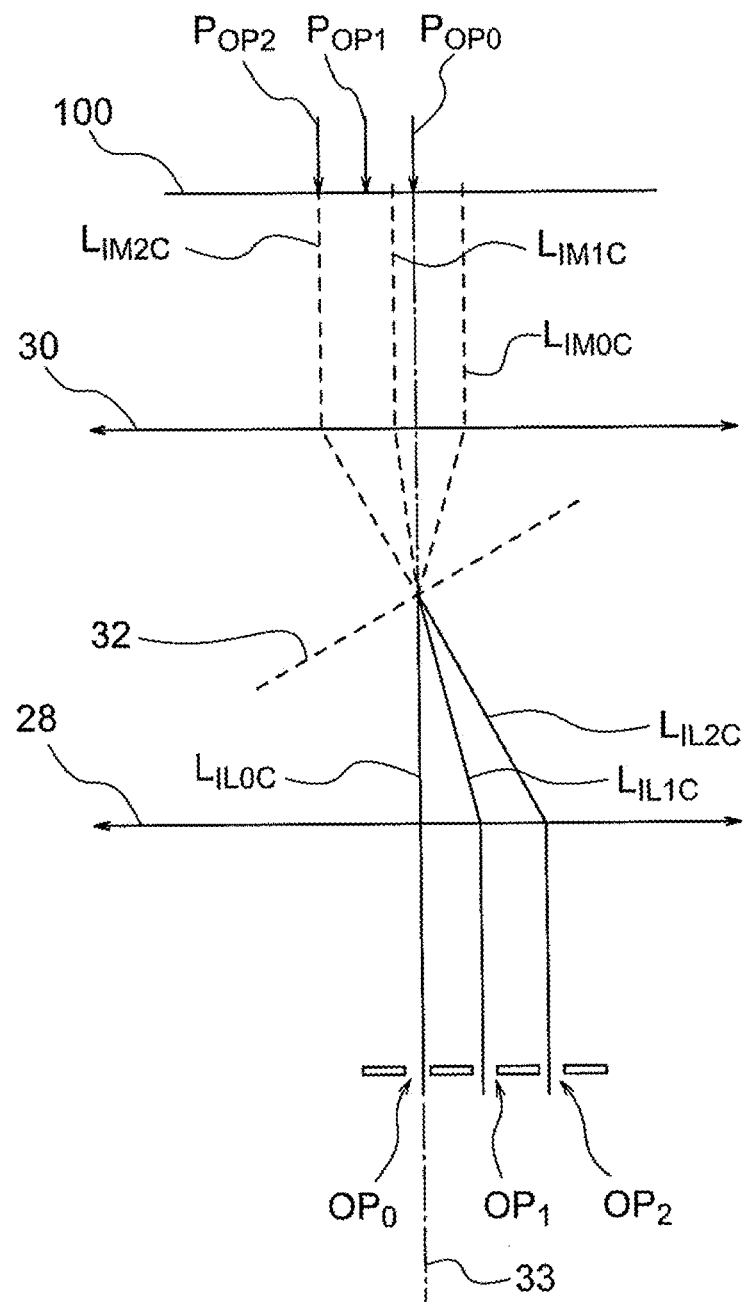
FIG. 24 is a diagram showing a center position of the image forming light when the inclination of the surface of the sample is θ2 degrees.

FIG. 24 is a diagram showing a center position of the image forming light when the angle of inclination of the surface of the sample is $θ_2$ degrees. Same reference numerals are assigned to components that are same as in FIG. 21, and the description thereof is omitted.

When the angle of inclination of the surface of the sample 32 is $θ_2$ degrees, the center of the image of the opening $OP_2$ coincides with the position $P_{OP2}$. Whereas, the center of the image of the opening $OP_0$ does not coincide with the position $P_{OP0}$. Moreover, the center of the image of the opening $OP_1$ does not coincide with the position $P_{OP1}$.

In such manner, when it is known that the center of the image of the opening $OP_0$ coincides with the position $P_{OP0}$, it is clear that the angle of inclination of the surface of the sample 32 is 0 degrees. Moreover, when it is known that the center of the image of the opening $OP_1$ coincides with the position $P_{OP1}$, it is clear that the angle of inclination of the surface of the sample is $θ_1$ degrees. Furthermore, when it is known that the center of the image of the opening $OP_2$ coincides with the position $P_{OP2}$, it is clear that the angle of inclination of the surface of the sample 32 is $θ_2$ degrees.

Therefore, the plurality of openings is arranged, and a reference position such as the position $P_{OP0}$ to position $P_{OP2}$ is found in advance for each opening. Then, in the measurement of the sample, an opening for which a center of an image coincides with the reference position is extracted from the plurality of openings. As mentioned above, the opening and the angle of inclination correspond one-to-one. Therefore, it is possible to find the angle of inclination of the surface of the sample from the opening that has been extracted.

Each of the opening $OP_0$, the opening $OP_1$, and the opening $OP_2$ forms a predetermined illumination region. Therefore, predetermined illumination regions may be arranged instead of arranging the plurality of openings.

Moreover, the predetermined illumination region may be formed by a plurality of light sources. For instance, an LED (light emitting diode) array may be disposed in the illuminating optical system, and an LED that emits light may be changed. By making such arrangement, it is possible to change a range and a shape of the predetermined illumination region.

In the sample shape measuring method of the present embodiment and the sample shape measuring apparatus of the present embodiment, it is preferable that the observation optical system be a telecentric optical system on an image side.

Since the focal length of the objective lens changes according to a wavelength, a focal position on a back side of the objective lens, or in other words, the pupil position, changes according to the wavelength. Accordingly, the image of the predetermined illumination region moves in the optical axial direction according to the wavelength. When the observation optical system is a telecentric optical system on the image side, even when the wavelength is changed, although a size of the image of the predetermined illumination region changes, the center position or the center of gravity position thereof do not change. Therefore, it is possible to compute accurately the position of the image of the predetermined illumination region without taking the wavelength of the illumination light into consideration.

In the sample shape measuring method of the present embodiment and the sample shape measuring apparatus of the present embodiment, it is preferable that the illuminating optical system be a telecentric optical system on an exit side.

When the illuminating optical system is a telecentric optical system on the exit side, it is possible to carry out a telecentric illumination. In the telecentric illumination, even when an amount of shift of the sample with respect to the focal position (hereinafter, referred to as 'defocus amount') changes, a lateral magnification of the image of the sample does not change. Therefore, it is possible to carry out the computing of the shape of the sample easily. In a non-telecentric illumination, the lateral magnification of the image of the sample changes according to an angle of a principal ray and the defocus amount. Therefore, the non-telecentric illumination cannot be said to be preferable.

Figure 25A:
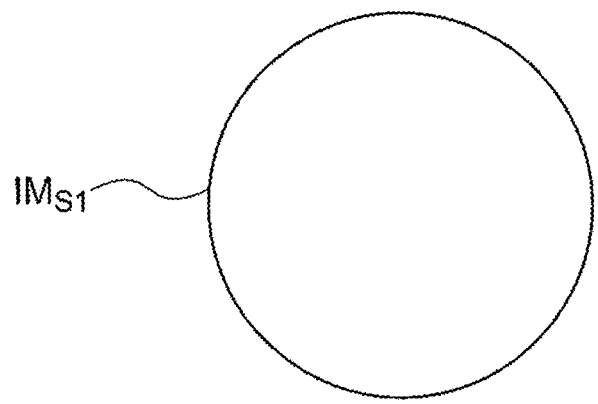
FIG. 25A is a diagram showing an image of a sample.
Figure 25B:
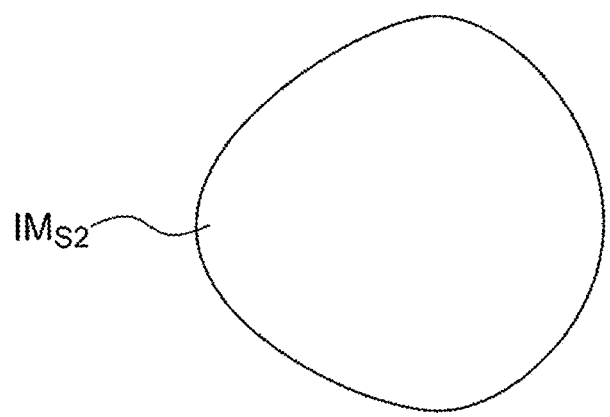
FIG. 25B is a diagram showing an image of a sample.

FIG. 25A and FIG. 25B are diagrams showing an image of a sample. FIG. 25A shows a case in which the telecentric illumination is carried out and FIG. 25B shows a case in which the telecentric illumination is not carried out. In both the cases, the shape of the sample is a circular shape.

In the case in which the telecentric illumination is carried out, a shape of an image $IM_{S1}$ of the sample is a circular shape. Whereas, in the case in which the telecentric illumination is not carried out, a shape of an image $IM_{S2}$ is a shape in which a circle is deformed.

In the sample shape measuring method of the present embodiment and the sample shape measuring apparatus of the present embodiment, it is preferable to calculate the total quantity of light emerged from the observation optical system.

By doing so, information of a bright field is achieved simultaneously. By computing a position of the image of the predetermined illumination region from the light received, it is possible to calculate the amount of inclination of the surface of the sample and to find the shape of the sample, and by finding the total quantity of light received, it is possible to achieve an image corresponding to an image when the sample is subjected to bright-field observation. It is possible to achieve this image by calculating the total quantity of the image forming light received at the detection element and converting the result of the calculation to an image.

In the sample shape measuring apparatus of the present embodiment, it is preferable that the illuminating optical system has the optical member between the light source and the condenser lens, and the optical member includes a lens.

Figure 26:
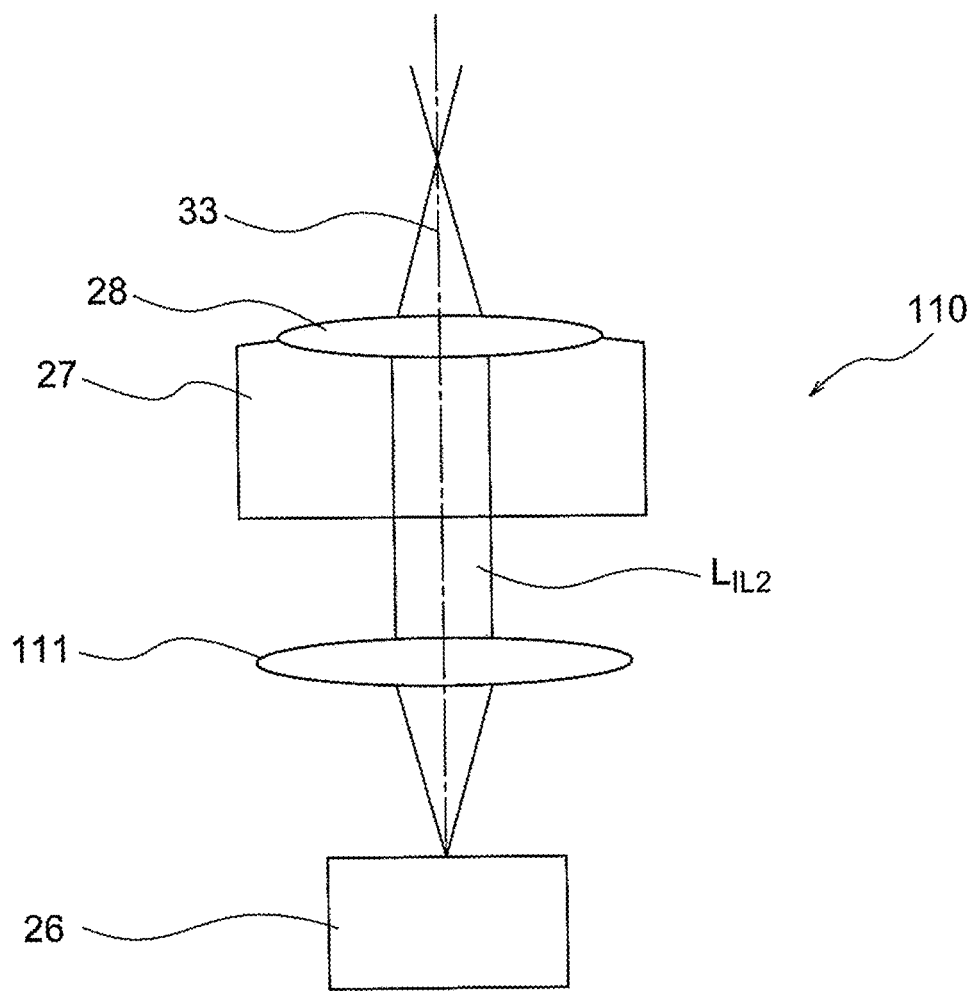
FIG. 26 is a diagram showing an example of an illuminating optical system.

FIG. 26 is a diagram showing an example of the illuminating optical system. Same reference numerals are assigned to components that are same as in the arrangement in FIG. 9, and the description of such elements is omitted.

An illuminating optical system 110 has an optical member between the light source 26 and the condenser lens 28. The optical member includes a lens 111. The light source 26 is a point light source. The light source 26 and the lens 111 are positioned such that a focal position of the lens 11 and a light emitting point of the light source 26 coincide.

In the sample shape measuring apparatus 20 shown in FIG. 9, the opening member 29 is disposed between the light source 26 and the condenser lens 28. Moreover, the illumination light $L_{IL1}$ is irradiated to the opening member 29. At this time, an area irradiated by the illumination light $L_{IL1}$ has become wider than the area of the transmitting portion 29b. Therefore, there is a loss of quantity of the illumination light.

By making the area irradiated by the illumination light $L_{IL1}$ substantially equal to the area of the transmitting portion 29b, it is possible to prevent the loss of quantity of the illumination light. Moreover, it is possible to omit the opening member 29.

In the illuminating optical system 110, the focal position of the lens 111 is set to coincide with a diameter of the illumination light $L_{IL2}$. Therefore, there is no loss of quantity of the illumination light, and furthermore, the opening member is not necessary. Moreover, by changing the focal position of the lens 111, it is possible to change the diameter of the illumination light $L_{IL2}$.

In the illuminating optical system 110, still another lens may be disposed between the light source 26 and the lens 111. In this case, an image of the point light source is formed by the still another lens. Moreover, light emerged from the image of the point light source is to be converted to a parallel light beam by the lens 111.

Furthermore, an afocal zooming optical system may be disposed between the lens 111 and the condenser 27. By doing so, it is possible to change the diameter of the illumination light $L_{IL2}$.

In the sample shape measuring apparatus of the present embodiment, it is preferable that the light source is a laser light source, and the illuminating optical system has an optical fiber between the light source and the optical member.

Figure 27:
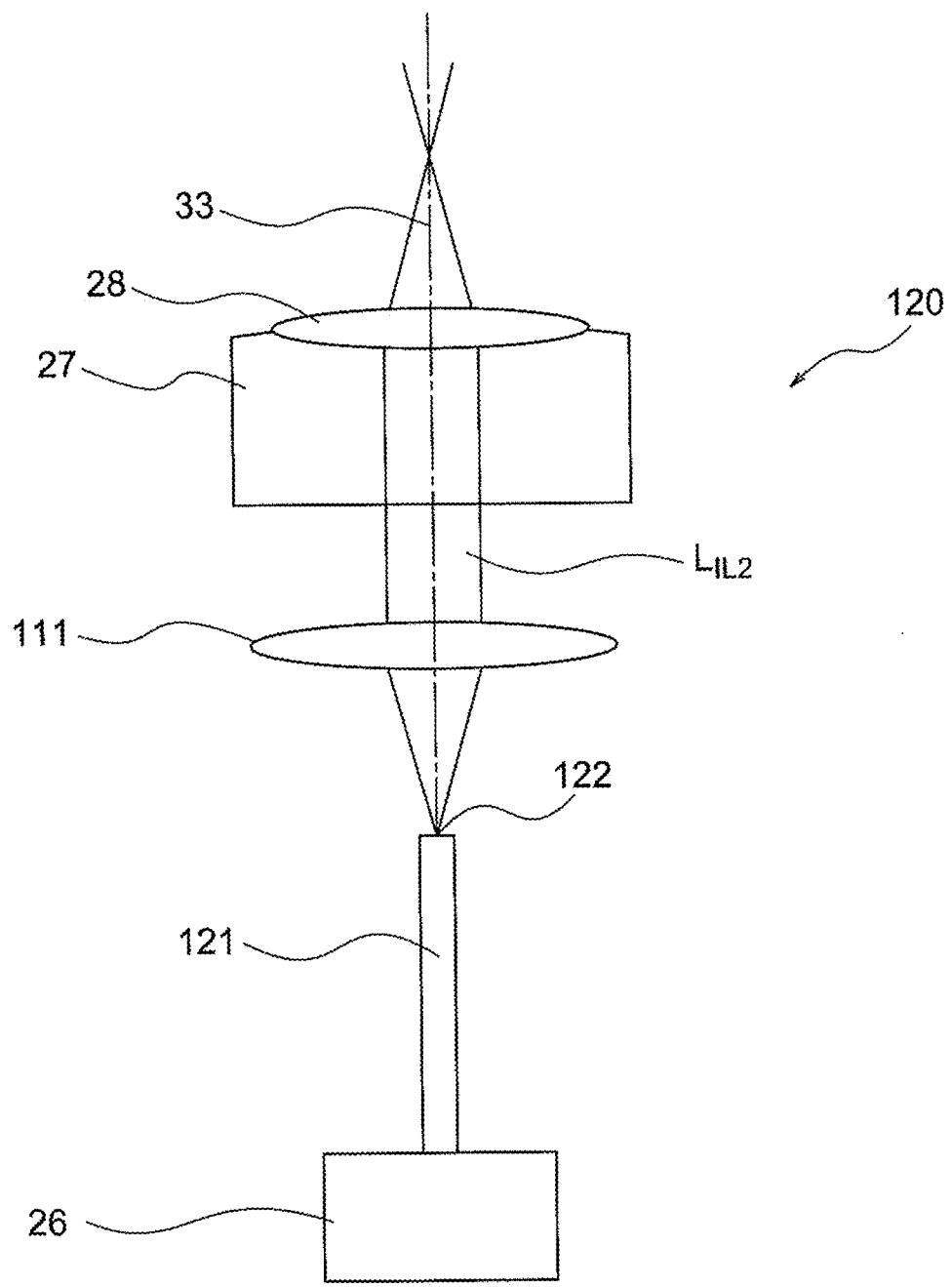
FIG. 27 is a diagram showing another example of the illuminating optical system.

FIG. 27 is a diagram showing another example of the illuminating optical system. Same reference numerals are assigned to components that are same as components in FIG. 26, and the description thereof is omitted.

An illuminating optical system 120 has an optical member between the light source 26 and the condenser lens 28. The optical member includes the lens 111. Furthermore, laser light emerged from the light source 26 is incident on an optical fiber 121. The laser light travels through the optical fiber 121 and emerges from an exit end 122 of the optical fiber 121.

In a case in which the optical fiber 121 is a single-mode optical fiber, a point light source is formed at the exit end 122. Therefore, the exit end 122 and the lens 111 are positioned such that the focal position of the lens 111 coincides with the exit end 122. As a result, it is possible to achieve an effect same as that of the abovementioned illuminating optical system 110.

In the illuminating optical system 120, still another lens may be disposed between the optical fiber 121 and the lens 111. In this case, an image of the point light source is formed by the still another lens. Moreover, light emerged from the image of the point light source is to be converted to a parallel light beam by the lens 111.

Moreover, an afocal zooming optical system may be disposed between the lens 111 and the condenser 27. By doing so, it is possible to change the diameter of the illumination light $L_{IL2}$.

Figure 28A:
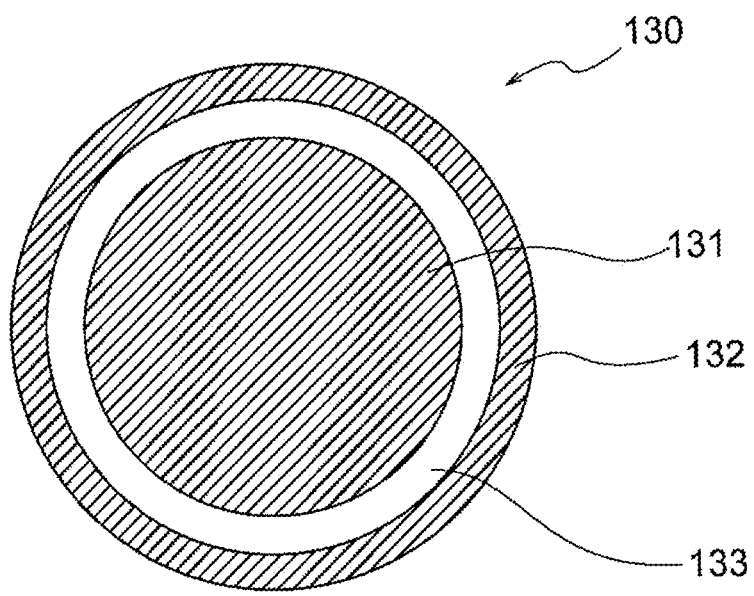
FIG. 28A is a diagram showing a modified example of an opening member.
Figure 28B:
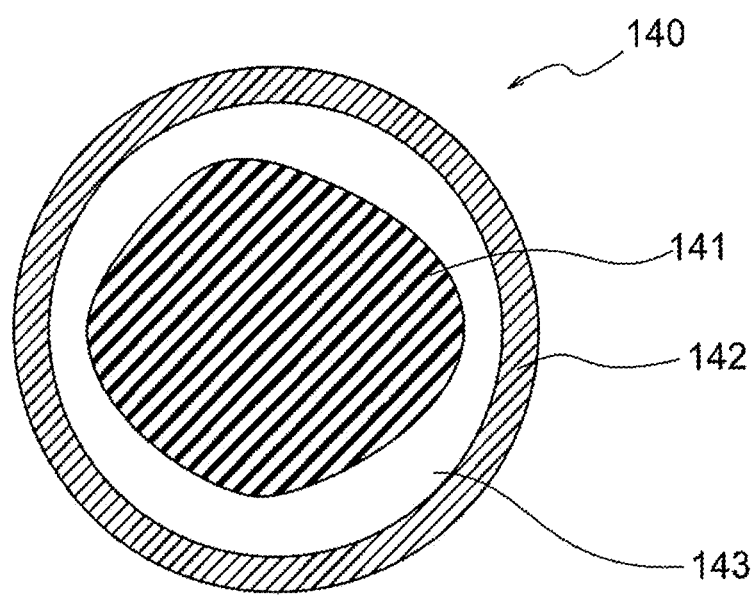
FIG. 28B is a diagram showing a modified example of an opening member.

Modified examples of the opening member will be described below. FIG. 28A and FIG. 28B show modified examples of the opening member. An opening member 130 shown in FIG. 28A includes a first light shielding portion 131, a second light shielding portion 132, and a transmitting portion 133.

The first light shielding portion 131 is positioned at a center of the opening member 130. The transmitting portion 133 is positioned at an outer side of the first light shielding portion 131. The second light shielding portion 132 is positioned at an outer side of the transmitting portion 133.

A shape of the first light shielding portion 131 is a circular shape. A shape of the transmitting portion 133 is an annular shape and a shape of the second light shielding portion 132 is an annular shape.

The opening member 130 corresponds to the optical member which forms the predetermined illumination region. The transmitting portion 133 is set such that the area of the region of the illumination light passing through the pupil of the observation optical system 22 becomes smaller than the area of the pupil of the observation optical system 22.

An opening member 140 shown in FIG. 28 includes a first light shielding portion 141, a second light shielding portion 142, and a transmitting portion 143.

The first light shielding portion 141 is positioned at a center of the opening member 140. The transmitting portion 143 is positioned at an outer side of the first light shielding portion 141. The second light shielding portion 142 is positioned at an outer side of the transmitting portion 143.

A shape of the first light shielding portion 141 is a non-circular shape. A shape of the transmitting portion 143 is an annular shape and a shape of the second light shielding portion 142 is an annular shape.

The opening member 140 corresponds to the optical member which forms the predetermined illumination region. The transmitting portion 143 is set such that the area of the region of the illumination light passing through the pupil of the observation optical system 22 becomes smaller than the area of the pupil of the observation optical system 22.

In the method and the apparatus described heretofore, the amount of inclination at the surface of the sample and the surface shape of the sample are measured by using the position of the image of the predetermined illumination region. However, it is possible to measure the amount of inclination at the surface of the sample and the surface shape of the sample by using the quantity of light of the image of the predetermined illumination region.

A sample shape measuring apparatus of the present embodiment includes an illuminating optical system, an observation optical system, a holding member, a detection element, and a processing unit, and the illuminating optical system includes a light source, a condenser lens, and an optical member which forms a predetermined illumination region, and the observation optical system includes an objective lens, and the holding member holds a sample and is disposed between the illuminating optical system and the observation optical system, and the detection element is disposed at one of a pupil position of the observation optical system and a position conjugate with the pupil position of the observation optical system, and the optical member is disposed on a light source side of the condenser lens, and the predetermined illumination region is set not to include an optical axis at the pupil position of the illuminating optical system and is set such that the illumination light is irradiated to a portion at an inner side of the pupil at the pupil position of the observation optical system and to an outer edge of the pupil of the observation optical system, at the pupil position of the observation optical system, and the illumination light irradiated to the sample by the illuminating optical system is transmitted through the sample, and light emerged from the sample is incident on the observation optical system, and the detection element receives light emerged from the observation optical system, and the processing unit calculates a quantity of light based on light received, and computes one of a difference between the quantity of light and a reference light quantity and a ratio of the quantity of light and the reference light quantity, and calculates an amount of inclination at a surface of the sample, from one of the difference and the ratio computed.

Figure 29:
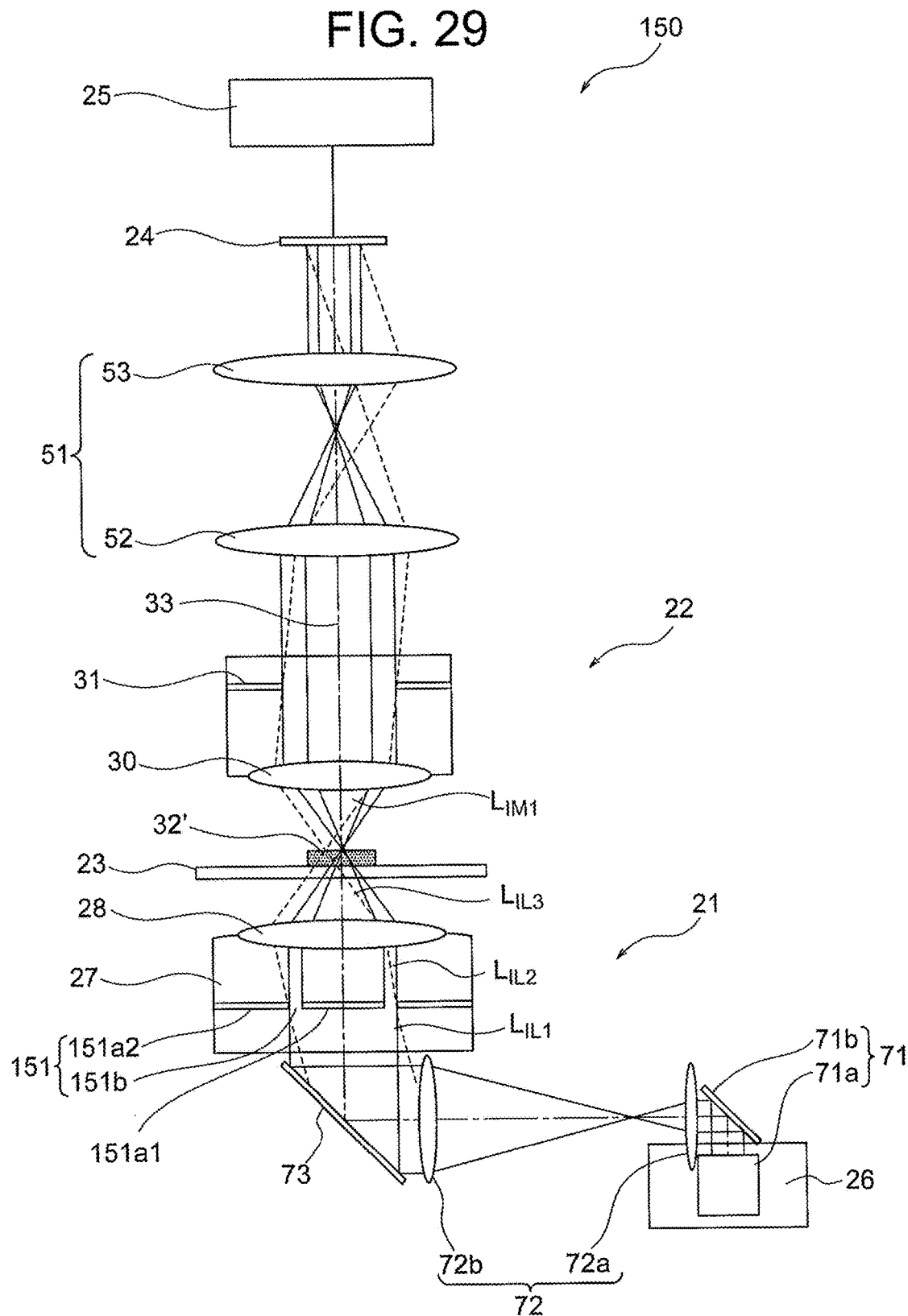
FIG. 29 is a diagram showing a sample shape measuring apparatus of the present embodiment.

FIG. 29 is a diagram showing a sample shape measuring apparatus of the present embodiment. Same reference numerals are assigned to components that are same as components in FIG. 24, and the description thereof is omitted.

A sample shape measuring apparatus 150 includes an opening member 151. The opening member 151 includes a light shielding portion 151a1, a light shielding portion 151a2, and a transmitting portion 151b. The light shielding portion 151a1, the light shielding portion 151a2, and the transmitting portion 151b is made up of a transparent member, for example a glass plate or a resin plate. The light shielding portion 151a1 and the light shielding portion 151a2 are formed by applying a light shielding paint to the glass plate, for example. Whereas, nothing is applied to the transmitting portion 151b. Therefore, the transmitting portion 151b is just a glass plate without anything applied to it.

The opening member 151 is disposed such that the light shielding portion 151a1 includes the optical axis 33. The light transmitting portion 151b does not include the optical axis 33. The predetermined illumination region is formed by the transmitting portion 151b. Therefore, the predetermined illumination region is set not to include the optical axis 33 at the pupil position of the illuminating optical system 21.

The illumination light $L_{IL1}$ having a circular shape is incident on the opening member 151. In the opening member 151, the shape of the transmitting portion 151b is an annular shape. Therefore, the illumination light $L_{IL2}$ having either a substantially annular shape or an annular shape (hereinafter, referred to as 'annular shape') is emerged from the opening member 151.

The illumination light $L_{IL2}$ emerged from the opening member 151 is incident on the condenser lens 28. A shape of the illumination light $L_{IL3}$ emerged from the condenser lens 28 also becomes an annular shape. The illumination light $L_{IL3}$ is emerged such that the illumination light $L_{IL3}$ intersect the optical axis of the observation optical system (optical axis of the illuminating optical system).

The illumination light $L_{IL3}$ emerged from the condenser lens 28 reaches the sample 32'. Light emerged from the sample 32', in other words, the image forming light $L_{IM1}$, is incident on the objective lens 30.

At the pupil 31 of the objective lens, light rays passed through an inner edge of the transmitting portion 151b reach an inner side of the pupil 31 of the objective lens. Light rays passed through an outer edge of the transmitting portion 151b reach an outer edge of the pupil 31 of the objective lens.

Figure 30:
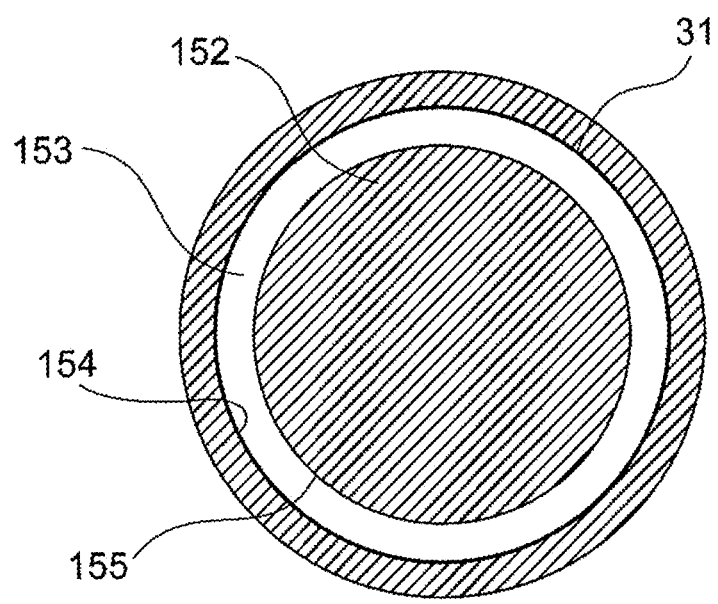
FIG. 30 is a diagram showing an appearance of image forming light.

FIG. 30 is a diagram showing an appearance of image forming light. An image 152 of the light shielding portion and an image 153 of the transmitting portion are formed on the pupil 31 of the objective lens. An outer edge 154 of the image 153 of the transmitting portion coincides with the outer edge of the pupil 31 of the objective lens. An inner edge 155 of the image 153 of the transmitting portion is positioned at the inner side of the pupil 31 of the objective lens. As it will be described later, the inner edge 155 can be deemed as an inner edge of an image of the opening member 151.

The predetermined illumination region is formed by the transmitting portion 151b. Consequently, the predetermined illumination region is set such that the illumination light is irradiated to an outer edge of the pupil and a portion of the inner side of the pupil at the pupil position of the observation optical system 21.

A position of the transmitting portion 151b and the position of the pupil 31 of the objective lens are conjugate. Consequently, an image of the predetermined illumination region is formed at the position of the pupil 31 of the objective lens.

The light $L_{IM1}$ emerged from the objective lens 30 is incident on the relay optical system 51. Moreover, the image of the pupil 31 of the objective lens and the image of the predetermined illumination region are formed on the detection element 24 by the image forming light $L_{IM1}$ emerged from the relay optical system 51.

When the surface of the sample 32' is inclined, the image of the predetermined illumination region is shifted with respect to the pupil 31 of the objective lens. In this case, a portion of the image of the predetermined illumination region moves to an outer side of the pupil 31 of the objective lens. Therefore, the quantity of light of the image of the predetermined illumination region decreases. The angle of inclination of the surface of the sample 32' and the quantity of light of the image of the predetermined illumination region correspond one-to-one. Therefore, it is possible to find the amount of inclination of the surface of the sample and to measure the shape of the surface of the sample by finding the quantity of light of the image of the predetermined illumination region.

In the sample shape measuring apparatus 150, the relative movement of the illumination light and the sample is carried out by the movement of the illumination light. However, as shown in FIG. 13, the relative movement of the illumination light and the sample may be carried out by the movement of the sample.

A method of computing the position of the illumination region will be described below. Here, the center of gravity position is let to be the position of the image of the predetermined illumination region. Moreover, it is assumed that the opening member 151 is used for the optical member which forms the predetermined illumination region. When the inner edge 155 of the image of the opening member 151 is let to be L (x, y), it is possible to find the center of gravity Rg (Xg, Yg) of the opening member 151 from the following expression.

$$Xg = \frac{\iint L(x, y)x dx dy}{\iint L(x, y) dx dy}$$

$$Yg = \frac{\iint L(x, y)y dx dy}{\iint L(x, y) dx dy}$$

where, when (x,y) is on the inner edge of the opening member 151, L(x,y)=1, and when (x,y) is not on the inner edge of the opening member 151, L(x,y)=0.

In the sample shape measuring apparatus of the present embodiment, it is preferable that the illuminating optical system have a light exit point group at a position conjugate with the sample, and the light exit point group include a plurality of light exit points, and the light exit points be positioned discretely, and the observation optical system include a collecting lens and a micro lens array, and the micro lens array be disposed at a position conjugate with the sample, and the detection element be disposed at a position conjugate with the pupil of the observation optical system.

Figure 31:
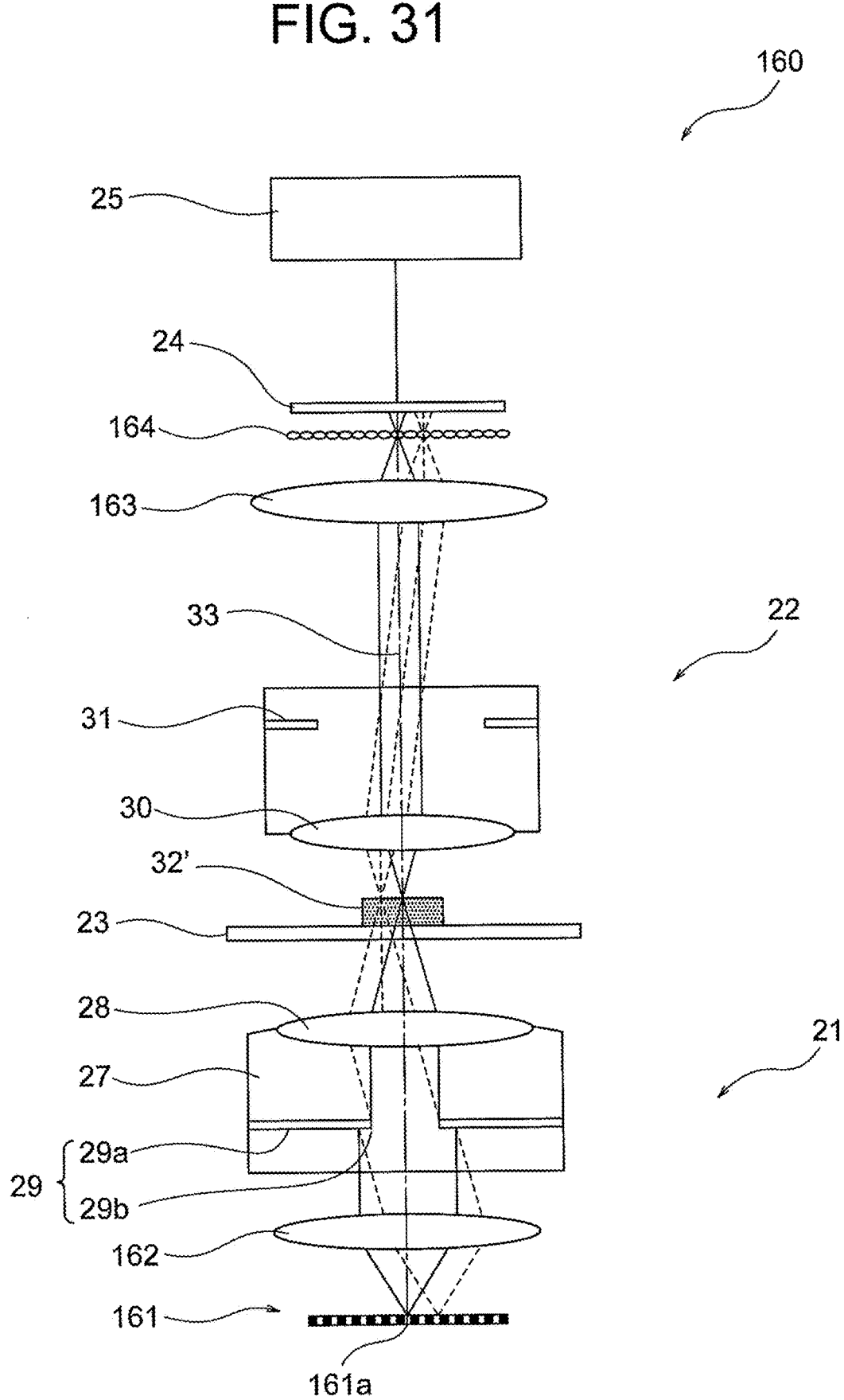
FIG. 31 is a diagram showing an arrangement of a sample shape measuring apparatus of the present embodiment.

FIG. 31 is a diagram showing an arrangement of a sample shape measuring apparatus of the present embodiment. Same reference numerals are assigned to components that are same as the components in FIG. 14, and the description thereof is omitted.

In a sample shape measuring apparatus 160, the illuminating optical system 21 includes a light exit point group 161. The light exit point group 161 includes a plurality of light exit points 161a. The light exit points 161a are positioned discretely.

Illumination light is emerged from the light exit point 161a. The illumination light passes through a lens 162, and is incident on the condenser 27. The illumination light is irradiated on the sample 32' via the condenser lens 28.

In the sample shape measuring apparatus 160, by the lens 162 and the condenser lens 28, the light exit point group 161 and the sample 32' have become conjugate. Therefore, a plurality of collecting points of the illumination light is formed simultaneously on the sample 32'. Moreover, the collecting points are formed such that one collecting point does not overlap another collecting point.

The image forming light is emerged from the collecting points. Since the collecting points are formed simultaneously, the plurality of image forming lights is emerged simultaneously from the sample 32'. In FIG. 31, two image forming lights are shown by solid lines and dashed lines.

The solid lines show the illumination light emerged from axial light exit points and the image forming light emerged from the axial collecting points. The dashed lines shown the illumination light emerged from off-axis light exit points and the image forming light emerged from off-axis collecting points.

The image forming light is incident on the observation optical system 22. The observation optical system 22 includes a collecting lens 163 and a micro lens array 164. The image forming light emerged from the sample 32' passes through the objective lens 30, and is collected by the collecting lens 163. The micro lens array 164 is disposed at a collecting position.

The micro lens array 164 includes a plurality of minute lens elements. The image forming light passes through the micro lens array 164 and is received by the detection element 24. A CCD image sensor or a CMOS image sensor is used for the detection element 24.

Since the image forming light is collected at a position of the micro lens array, the image forming light is emerged from the micro lens array 164 while being diverged. Therefore, the image forming light on the detection element 24 is not in the form of a point but is in the form of a plane. In the following description, a region of the image forming light on the detection element 24 is referred to as 'optical region'.

As mentioned above, the predetermined illumination region is formed by the opening member 29. The opening member 29 and the pupil 31 of the objective lens are conjugate. Moreover, the detection element 24 is disposed at a position conjugate with the observation optical system 22. Since the pupil of the observation optical system can be deemed as the pupil 31 of the objective lens, the detection element 24 and the opening member 29 are conjugate. This signifies that the optical region and the predetermined illumination region are conjugate.

The amount of inclination is calculated from the position of the image of the predetermined illumination region. Since the optical region and the predetermined illumination region are conjugate, it is possible to calculate the amount of inclination from a position of the optical region.

In the sample shape measuring apparatus 160, the micro lens array 164 is disposed at a position conjugate with the sample 32'. In other words, by the objective lens 30 and the collecting lens 163, the sample 32' and the micro lens array 164 are conjugate.

In the sample 32', despite being discrete, a range from a center up to a periphery is illuminated. Therefore, even in the micro lens array 164, light is incident not only on a lens element positioned at a center but also on a lens element positioned at a periphery. As a result, a plurality of optical regions is formed on the detection element 24.

Moreover, in the sample shape measuring apparatus 160, an optical system is arranged such that one light exit point and one lens element correspond one-to-one. In this case, one image forming light and one lens element correspond one-to-one. Therefore, the image forming light reaches each lens element.

In the sample 32', the image forming light is emerged from the axial collecting point and the off-axis collecting point. The image forming light emerged from the axial collecting point (hereinafter, referred to as 'axial image forming light') passes through the lens element positioned at a center of the micro lens array 164 and reaches a central portion of the detection element 24. An optical region by the axial image forming light is formed on the central portion of the detection element 24.

The image forming light emerged from the off-axis collecting point (hereinafter, referred to as 'off-axis image forming light') passes through a lens element positioned at a periphery of the micro lens array 164 and reaches a peripheral portion of the detection element 24. An optical region by the off-axis image forming light is formed in the peripheral portion of the detection element 24.

Figure 32:
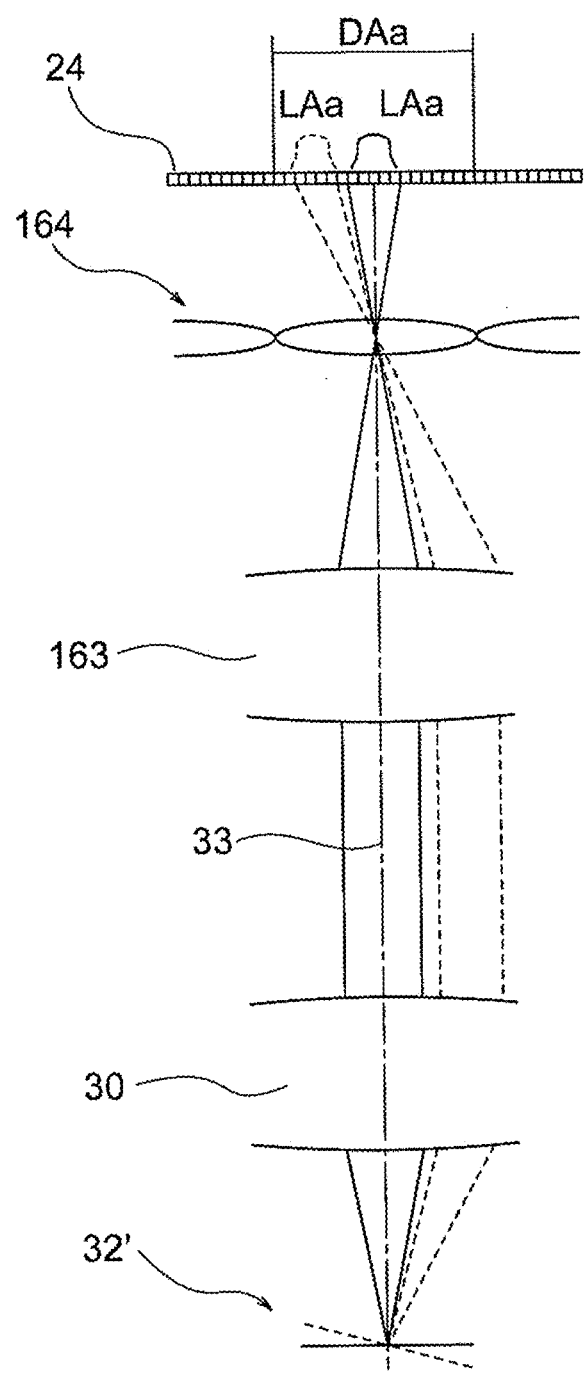
FIG. 32 is a diagram showing an appearance of axial image forming light.
Figure 33:
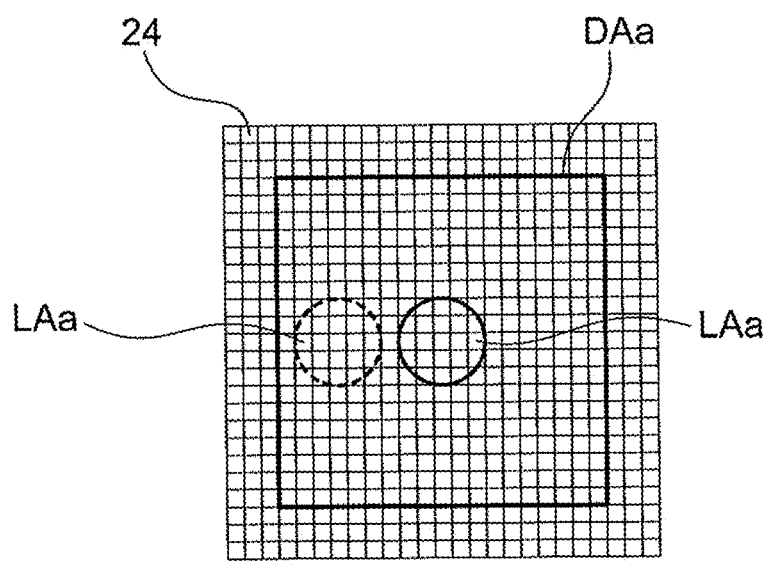
FIG. 33 is a diagram showing a position of the axial image forming light viewed from an optical axial direction.

FIG. 32 is a diagram showing an appearance of the axial image forming light. In FIG. 32, a portion around the optical axis 33 is enlarged. FIG. 33 is a diagram showing a position of the axial image forming light viewed from an optical axial direction.

In a case in which there is no inclination at the surface of the sample, the axial image forming light reaches the central portion of the detection element 24 as shown by solid lines. As a result, an optical region LAa is formed at the central portion of the detection element 24.

Whereas, in a case in which there is an inclination at the surface of the sample, the axial image forming light reaches the peripheral portion of the detection element as shown by dashed lines. As a result, the optical region LAa is formed at the peripheral portion of the detection element 24.

In such manner, in the case in which there is no inclination at the surface of the sample and in the case in which there is an inclination at the surface of the sample, a position of the optical region formed on the detection element 24 differs. Therefore, from the position of the optical region LAa, it is possible to calculate the amount of inclination at the surface of the sample.

Minute light receiving elements are disposed two-dimensionally on the detection element 24. In the sample shape measuring apparatus 160, an area of one light receiving element is smaller than an area of the optical region LAa. Accordingly, a light receiving region DAa that receives light of the optical region LAa includes plurality of light receiving elements.

When the position of the optical region LAa on the detection element 24 differs, the light receiving elements positioned in the optical region LAa also differ. By using the light receiving elements positioned in the optical region LAa, it is possible to identify the position of the optical region LAa.

The light receiving elements are arranged in rows two-dimensionally in the detection element 24. Consequently, the position of the optical region LAa is indicated by the position of the light receiving elements.

For instance, let us assume that the center of gravity position is used as the position of the optical region LAa. In this case, the center of gravity of a shape formed by the light receiving elements positioned in the optical region LAa is to be found. Moreover, the light receiving element corresponding to the center of gravity position that has been found is identified. The position of the light receiving element that have been identified correspond to the position of the optical region LAa.

It is possible to indicate the position of the optical region LAa by a shift from the reference position. For instance, a position of the light receiving element positioned at the center of the optical region DAa is set as the reference position. When such setting is made, by calculating a difference between the reference position and the position of the light receiving element identified, or in other words, a difference between the reference position and the position of the optical region LAa, it is possible to calculate the amount of inclination at the surface of the sample 32'.

In the illuminating optical system 21 and the observation optical system 22, it is desirable that an aberration and an assembling error do not occur. In this case, when it is assumed that there is no inclination at the surface of the sample, the position of the optical region LAa coincides with a center of the light receiving region DAa.

However, practically, the aberration and the assembling error occur to some extent. Therefore, depending on an amount of the aberration that occurs and the amount of the assembling error that occurs, even in a case in which there is no inclination at the surface of the sample, the position of the optical region LAa is shifted from the center of the light receiving region DAa.

In such case, the amount of shift is to be calculated in advance. Then, the amount of inclination at the surface of the sample is to be calculated from the difference that has been calculated and the amount of shift.

When the light receiving element which becomes the reference position is a light receiving element in the light receiving region DAa, it may be a light receiving element at any position.

Even for the off-axis image forming light, by calculating the difference between the reference position and the position of the optical region LAa, it is possible to calculate the amount of inclination at the surface of the sample 32'.

In such manner, in the sample shape measuring apparatus of the present embodiment, in the case in which there is no inclination on the surface of the sample and the case in which there is an inclination on the surface of the sample, the position of the image forming light on the detection element differs. Moreover, the amount of shift in the position of the image forming light varies in accordance with the amount of inclination. Therefore, according to the sample shape measuring apparatus of the present embodiment, it is possible to measure the amount of inclination at the surface of the sample. Moreover, it is possible to measure the shape of the surface of the sample by using the amount of inclination measured.

Moreover, the sum of quantity of light received at the light receiving element group corresponding to one image forming light indicates a brightness of the sample at a point from which that image forming light has emerged. Therefore, according to the sample shape measuring apparatus of the present embodiment, it is possible achieve optical information of the sample by calculating the sum of the quantity of light received of the light receiving element group.

Moreover, in the sample shape measuring apparatus of the present embodiment, the plurality of image forming lights emerges simultaneously from the observation optical system. However, since the detection element includes the plurality of light receiving elements, it is possible to receive the plurality of image forming lights simultaneously. Therefore, according to the sample shape measuring apparatus of the present embodiment, it is possible to carry out the measurement of the amount of inclination at the surface and the acquisition of the information of light and shade for the overall sample by measurement at one time.

In the sample shape measuring apparatus of the present embodiment, it is preferable that the light exit point be a minute opening. Or, in the sample shape measuring apparatus of the present embodiment, it is preferable that the light exit point be a minute light emitting portion.

By making such arrangement, it is possible to make the area of the collecting point small. As a result, it is possible to make high a resolution in a horizontal direction at the sample position. The resolution in the horizontal direction is a resolution in a plane orthogonal to the optical axis.

In a case in which the light exit point is a minute opening, a minute through hole is formed in a metallic plate. By forming a plurality of through holes, it is possible to form the light exit point group 161. This metallic plate is to be disposed at the position of the light exit point group 161, and an image of the light source is to be formed on the metallic plate. By doing so, it is possible to generate a plurality of illumination lights discretely and simultaneously.

In a case in which the light exit point is a minute light emitting portion, an LED is used. By using a plurality of LEDs, it is possible to form the light exit point group 161. The plurality of LEDs is to be disposed at an equal interval at the position of the light exit point group 161. By doing so, it is possible to generate a plurality of illumination lights discretely and simultaneously.

According to the sample shape measuring apparatus of the present embodiment, it is possible to generate the plurality of illumination lights discretely and simultaneously.

In the sample shape measuring apparatus of the present embodiment, it is preferable that the micro lens array include a plurality of lens elements, and an image of the light exit point be formed at a position of the lens element, and a size of the image of the light exit point be smaller than a size of the lens element.

As mentioned above, the collecting point is formed on the sample 32'. The collecting point is an image of the light exit point. Moreover, the micro lens array 164 is disposed at a position conjugate with the sample 32'. Accordingly, an image of the light exit point is formed at the position of the micro lens array 164.

Moreover, in the sample shape measuring apparatus 160, the optical system is arranged such that one light exit point and one lens element correspond one-to-one. Accordingly, an image of one light exit point is formed at the position of one lens element.

Figure 34:
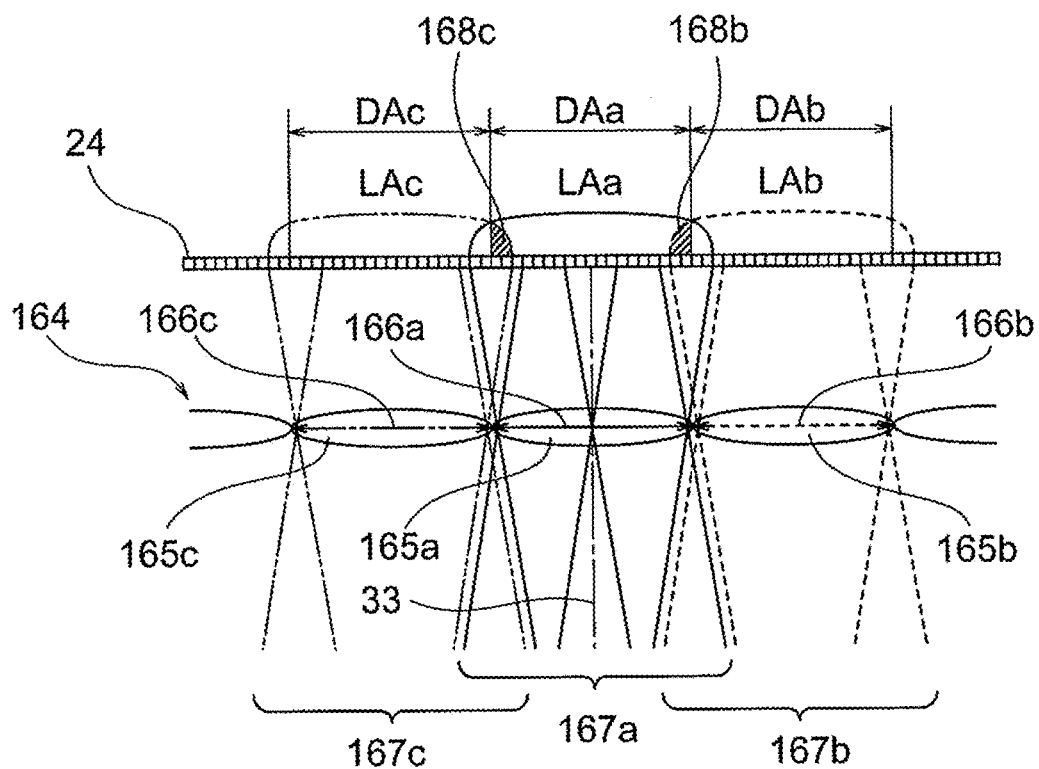
FIG. 34 is a diagram showing images of light exit points of a micro lens array.
Figure 35:
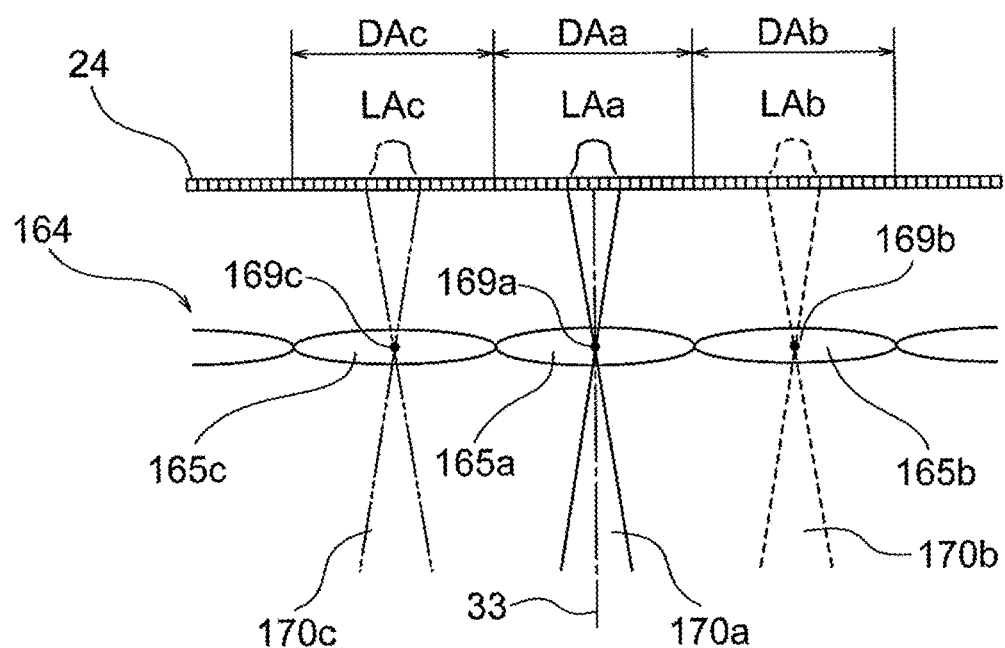
FIG. 35 is a diagram showing images of light exit points of a micro lens array.

FIG. 34 and FIG. 35 are diagrams showing images of light exit points and a micro lens array. FIG. 34 shows a case in which the size of the image of the light exit point is large. FIG. 35 shows a case in which the size of the image of the light exit point is small. Moreover, the two diagrams show an appearance of the image forming light in a case in which there is no inclination on the surface of the sample.

Lens elements 165b and 165c are positioned adjacent to the lens element 165a. Moreover, the light receiving region DAa, a light receiving region DAb, and a light receiving region DAc are provided corresponding to the lens elements 165a, 165b, and 165c respectively.

Image forming light 167a is incident on the lens element 165a. An image 166a of a light exit point is formed at a position of the lens element 165a. Moreover, based on the image forming light 167a, the optical region LAa is formed on the detection element 24. In FIG. 34 and FIG. 35, the image forming light 167a is shows by solid lines.

Image forming light 167b is incident on the lens element 165b. An image 166b of a light exit point is formed at a position of the lens element 165b. Moreover, based on the image forming light 167b, an optical region LAb is formed on the detection element 24. In FIG. 34 and FIG. 35, the image forming light 167 is shown by dashed lines.

Image forming light 167c is incident on the lens element 165c. An image 166c of a light exit point is formed at a position of the lens element 165c. Moreover, based on the image forming light 167c, an optical region LAc is formed on the detection element 24. In FIG. 34 and FIG. 35, the image forming light 167c is shown by alternate long and two short dashes lines.

A case in which a size of the image of the light exit point is substantially same as a size of the lens element will be described below by using FIG. 34.

As shown in FIG. 34, a size of the image 166a of the light exit point is substantially same as a size of the lens element 165a. In this case, some of the image forming light 167a reaches the light receiving region DAb and the light receiving region DAc.

As a result, the optical region LAa is formed not only in the light receiving region DAa but also in the light receiving region DAb and the light receiving region DAc. This signifies that in the optical region LAa, a portion of the optical region LAa is formed in the light receiving region DAb and the light receiving region DAc.

A phenomenon similar to the optical region LAa occurs for the optical region LAb and the optical region LAc. In other words, in the optical region LAb, a portion of the optical region LAb (hereinafter, referred to as 'partial region 168b') is formed in the light receiving region DAa. Moreover, in the optical region LAc, a portion of the optical region LAc (hereinafter, referred to as 'partial region 168c') is formed in the light receiving region DAa.

The amount of inclination is calculated from the position of the optical region. It is possible to calculate the accurate amount of inclination, provided that the optical region formed in the light receiving region is an optical region formed only by the image forming light corresponding to the light receiving region.

When the light receiving region DAa is taken into consideration, the optical region LAa, the partial region 168b, and the partial region 168c are formed in the light receiving region DAa.

The optical region LAa is formed by the image forming light 167a. The image forming light 167a is image forming light corresponding to the light receiving region DAa. Accordingly, the optical region LAa is an optical region formed by the image forming light corresponding to the light receiving region DAa.

The partial region 168b is formed by the image forming light 167b. The image forming light 167b being image forming light corresponding to the light receiving region DAb, is not image forming light corresponding to the light receiving region DAa. Accordingly, the partial region 168b is not an optical region which is formed by the image forming light corresponding to the light receiving region DAa.

The partial region 168c is formed by the image forming light 167c. The image forming light 167c being image forming light corresponding to the light receiving region DAc, is not image forming light corresponding to the light receiving region DAa. Accordingly, the partial region 168c is not an optical region which is formed by the image forming light corresponding to the light receiving region DAa.

The optical region LAa, the partial region 168b, and the partial region 168c are formed simultaneously. Therefore, it is not possible to separate the partial region 168b and the partial region 168c from the optical region LAb, both spatially and temporally.

In such manner, the optical region formed in the light receiving region DAa is formed not only by the image forming light 167a corresponding to the light receiving region DAa, but also by the image forming light 167b and the image forming light 167c not corresponding to the light receiving region DAa. Therefore, it is not possible to calculate the accurate amount of inclination.

The image forming light 167b and the image forming light 167c are not the only image forming lights that do not correspond to the light receiving region DAb. A plurality of lens elements is positioned around the lens element 165a. Any image forming light that is incident on each lens element is image forming light not corresponding to the light receiving region DAb.

The optical region being formed based on each image forming light, a plurality of optical regions is formed. In some of the plurality of optical regions, a part thereof is formed on the light receiving region DAa. Therefore, it is not possible to calculate the correct amount of inclination.

Furthermore, a part of the optical region LAa is not included in the light receiving region DAa. Therefore, even the optical region LAa cannot be said to be an optical region formed only by the optical region corresponding to the light receiving region. From this point, it is not possible to calculate the correct amount of inclination.

The calculation of the amount of inclination in the light receiving region DAa is described above, and similar can be said to be true for the calculation of the amount of inclination in the light receiving region DAb and the calculation of the amount of inclination in the light receiving region DAc.

As mentioned above, FIG. 34 shows the appearance of the image forming light in the case in which there is no inclination on the surface of the sample. In the case in which there is an inclination on the surface of the sample, the position of the optical region LAa changes. With the amount of inclination becoming larger, the shift in the position of the optical region LAa with respect to the reference position also becomes large.

In FIG. 34, the optical region LAa is distributed not only to the light receiving region DAa but also to the light receiving region DAb and the light receiving region DAc. In other words, a portion of the optical region LAa is in a state of sticking out of the light receiving region DAa.

In such state, even when the optical region LAa moves toward the light receiving region DAc, the light receiving region DAa is in a state of being covered by the optical region LAa until the region stuck out toward the light receiving region DAb is positioned in the light receiving region DAa.

In other words, during this time, in spite of the position of the overall optical region LAa being changed, there is no change in the position of the optical region LAa on the light receiving region DAa. This signifies that during this time, it is not possible to calculate the amount of inclination.

In such manner, in the case in which the size of the image of the light exit point is substantially same as the size of the lens element, the amount of inclination that cannot be measured exists in a certain proportion. Similar is true for the optical region LAb and the optical region LAc.

Moreover, the micro lens array 164 is disposed at a position conjugate with the sample 32'. Here, let the lens element 165a be reduction-projected on the sample 32'. The lens element 165 has a spreading to some extent. Therefore, a projected image of the lens element 165a projected on the sample 32' does not become a point image.

The image 166a of the light exit point is formed at the position of the lens element 165a. As shown in FIG. 34, the size of the image 166a of the light exit point is substantially same as the size of the lens element 165a.

As described above, the projected image of the lens element 165a projected on the sample 32' does not become a point image. Therefore, the projected image of the image 166a of the light exit point also does not become a point image.

The image 166a of the light exit point indicates the illumination region on the sample 32'. Since the projected image of the image 166a of the light exit point does not become a point image, the illumination region is not in the form of a point, and has a spreading to certain extent.

This illumination region indicates a resolution in the horizontal direction at the sample position. Therefore, as compared to a case in which the illumination region is in the form of a point, the resolution in the horizontal direction at the sample position becomes lower. The resolution in the horizontal direction is a resolution in a plane orthogonal to the optical axis.

The case in which the size of the image of the light exit point is substantially same as the size of the lens element has been described and a case in which the size of the image of the light exit point is larger than the size of the lens element is similar. In both the cases, it is not possible to calculate the accurate amount of inclination, and moreover, there is an amount of inclination that cannot be measured and furthermore, only low resolution is achieved.

A case in which, the size of the image of the light exit point is adequately smaller than the size of the lens element will be described below by using FIG. 35.

In FIG. 35, a case in which, images 169a, 169b, and 169c of light exit points are point images is shown. In this case, a size of the images 169a, 169b, and 169c of the light exit points is extremely small as compared to a size of the lens elements 165a, 165b, and 165c.

In this case, all of image forming light 170a reaches the light receiving regions DAa. In other words, some of the image forming light 170a does not reach the light receiving region DAb and the light receiving region DAc. As a result, the optical region LAa is formed only in the light receiving region DAa.

A phenomenon similar to the optical region LAa occurs for the optical region LAb and the optical region LAc. All of image forming light 170b reaches the light receiving region DAb, and all of image forming light 170c reaches the light receiving region DAc. As a result, the optical region LAb is formed only in the light receiving region DAb, and the optical region LAc is formed only in the light receiving region DAc.

When the light receiving region DAa is taken into consideration, only the optical region LAa is formed in the light receiving region DAa. The optical region LAa is formed by the image forming light 170a. The image forming light 170a is image forming light corresponding to the light receiving region DAa. Accordingly, the optical region LAa is an optical region formed by the image forming light corresponding to the light receiving region DAa.

In such manner, the optical region formed in the light receiving region DAa is formed only by the image forming light 170a corresponding to the light receiving region DAa. Therefore, it is possible to calculate the accurate angle of inclination.

Furthermore, the overall optical region LAa is included in the light receiving region DAa. Accordingly, the optical region LAa can be said to be an optical region formed only by the image forming light corresponding to the light receiving region. Even from this point, it is possible to calculate the correct amount of inclination.

The calculation of the amount of inclination of the light receiving region DAa was described above. Similar can be said to be true for the calculation of the amount of inclination of the light receiving region DAb and the calculation of the amount of inclination of the light receiving region DAc.

As mentioned above, FIG. 35 shows the appearance of the image forming light in the case in which there is no inclination on the surface of the sample. As mentioned above, in the case in which there is an inclination on the surface of the sample, the position of the optical region LAa changes. With the amount of inclination becoming larger, the shift in the position of the optical region LAa with respect to the reference position also becomes large.

In FIG. 35, the optical region LAa is distributed in a portion of the light receiving region DAa. In other words, a proportion of the optical region LAa occupying the light receiving region DAa is small, and moreover, from the optical region LAa up to an outer periphery of the light receiving region DAa, a region not including in the optical region LAa exists adequately.

In such state, when the optical region LAa moves even slightly toward the light receiving region DAc, there is a change in the position of the optical region LAa on the light receiving region DAa. Therefore, even when the amount of inclination is small, it is possible to detect the shift in the position of the optical region LAa with respect to the reference position.

In such manner, in the case in which the size of the image of the light exit point is adequately smaller than the size of the lens element, there is no amount of inclination that cannot be measured. The 'amount of inclination that cannot be measured' in this case is the 'amount of inclination that exists in a certain proportion' described in the case in which the size of the image of the light exit point is substantially same as the size of the lens element. Similar is true for the optical region LAb and the optical region LAc.

Moreover, the image 169a of the light exit point is formed at the position of the lens element 165a. As shown in FIG. 35, the size of the image 169a is adequately smaller than the size of the lens element 165a.

As mentioned above, the projected image of the lens element 165a projected on the sample 32' does not become a point image. However, the image 166a of the light exit point being a point image, the projected image of the image 166a of the light exit point becomes a point image.

The image 166a of the light exit point indicates the illumination region on the sample 32'. Since the projected image of the image 166a of the light exit point becomes a point image, the illumination region is in the form of a point. Therefore, the resolution in the horizontal direction at the sample position becomes high.

As described above, according to the sample shape measuring apparatus of the present embodiment, it is possible to calculate the correct amount of inclination, and moreover, there is no amount of inclination that cannot be measured, and furthermore, a high resolution is achieved.

In the sample shape measuring apparatus of the present embodiment, it is preferable to move the holding member in a plane orthogonal to the optical axis.

Figure 36:
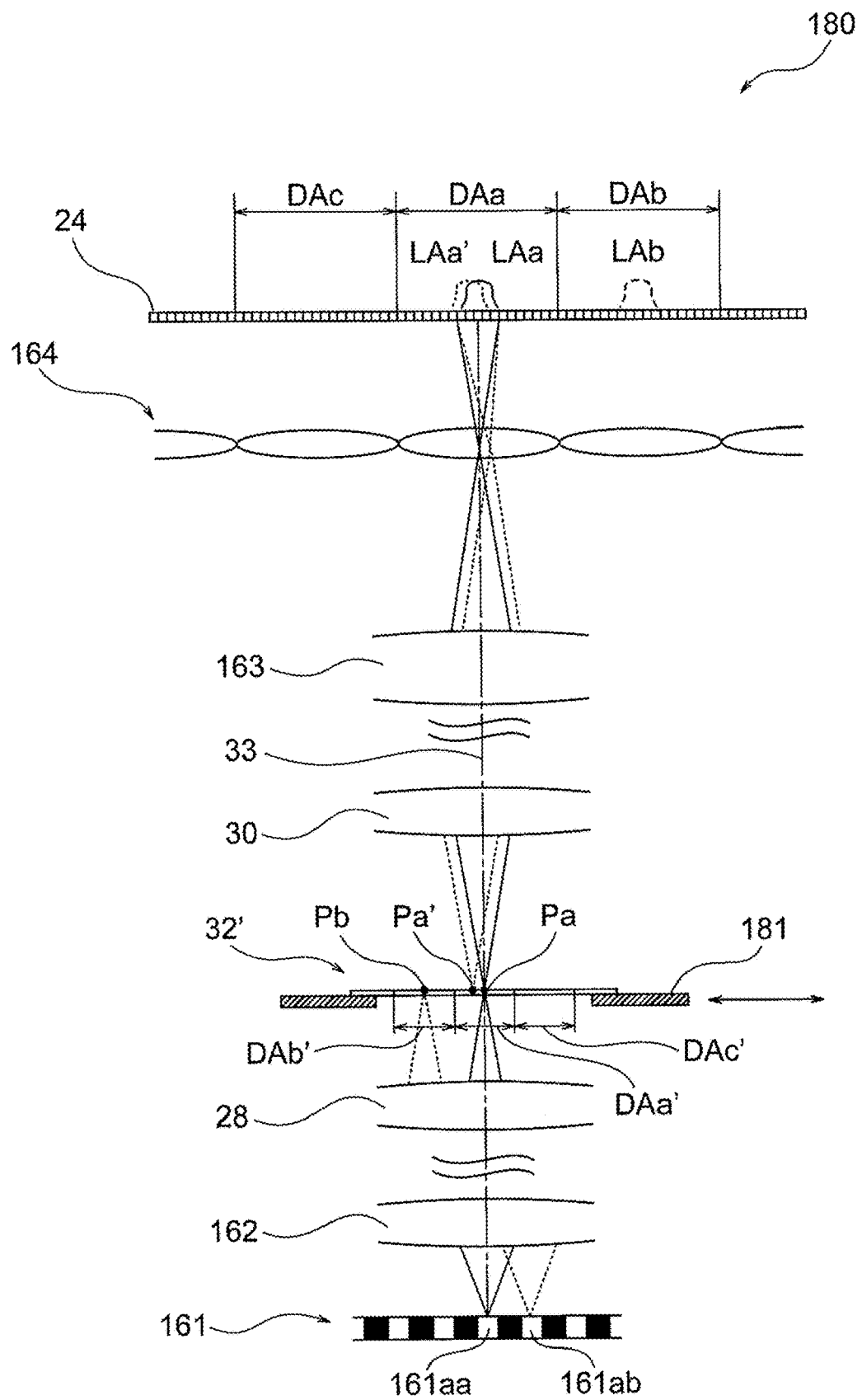
FIG. 36 is a diagram showing an arrangement of a sample shape measuring apparatus of the present embodiment.

FIG. 36 is a diagram showing an arrangement of a sample shape measuring apparatus of the present embodiment. Same reference numerals are assigned to components that are same as in FIG. 31, and the description thereof is omitted.

In the sample shape measuring apparatus of the present embodiment, it is possible to move the holding member in the plane orthogonal to the optical axis. Therefore, a sample shape measuring apparatus 180 includes a scanning mechanism 181 as the holding member. The scanning mechanism 61 as shown in FIG. 13 may be used as the scanning mechanism 181.

In FIG. 36, the scanning mechanism 181 is depicted by two members in the form of a flat plate. This is because a structure at a central portion is omitted in the diagram in order to make it easily viewable.

In the sample shape measuring apparatus 180, the light exit point group 161 includes a plurality of light exit points. Here, let light emerging from each light exit point be light emerged from a point light source.

A collecting point Pa on the sample 32' is illuminated by illumination light emerged from an axial light exit point 161aa. Axial image forming light emerged from the collecting point Pa reaches the light receiving region DAa. The optical region LAa is formed on the light receiving region DAa.

A collecting point Pb on the sample 32' is illuminated by illumination light emerged from an off-axis light exit point 161ab. Off-axis image forming light emerged from the collecting point Pb reaches the light receiving region DAb. The optical region LAb is formed on the light receiving region DAb.

The collecting point Pa and the optical region LAa correspond one-to-one. Moreover, the collecting point Pb and the optical region LAb correspond one-to-one. In this case, on the sample 32', a region DAa' exists as a region corresponding to the light receiving region DAa and a region DAb' exists as a region corresponding to the light receiving region DAb. Similarly, a region DAc' exists as a region corresponding to the light receiving region DAc.

Each of the light receiving regions DAa, DAb, and DAc is spread to certain extent. Accordingly, each of the regions DAa', DAb', and DAc' is spread to certain extent.

The light exit point 161aa and the light exit point 161ab are positioned discretely. In this case, the collecting point Pa and the collecting point Pb are also positioned discretely.

Therefore, in spite of the region DAa' being spread to certain extent, only the collecting point Pa exists in the region DAa'. In other words, only the amount of inclination at one point in the region DAa' is calculated.

Similarly, in spite of the region DAb' being spread to certain extent, only the collecting point Pb exists in the region DAb'. In other words, only the amount of inclination at one point in the region DAb' is calculated.

As mentioned above, in the sample shape measuring apparatus 160, it is possible to carry out the measurement of the amount of inclination at the surface and the measurement of the surface shape by measurement at one time. However, the measurement is carried out discretely.

A plurality of points exists between the collecting point Pa and the collecting point Pb. For instance, a point Pa' exists near the collecting point Pa. A case in which the collecting point Pa and the point Pa' are illuminated will be described below.

It is assumed that there is no inclination on the surface of the sample 32' both at the collecting point Pa and the point Pa'. In this case, axial image forming light emerged from the collecting point Pa reaches a central portion of the light receiving region DAa as shown by solid lines. As a result, the optical region LAa is formed at the central portion of the light receiving region DAa.

On the other hand, also image forming light emerged from the point Pa' reaches the central portion of the optical region LAa as shown by dotted lines. As a result, an optical region LAa' is formed at the central portion of the light receiving region DAa.

In FIG. 36, in order to be able to distinguish between the optical region LAa and the optical region LAa', a position of the optical region LAa' is shifted slightly with respect to a position of the optical region LAa.

It is possible to illuminate the collecting point Pa by the light exit point 161aa, but it is not possible to illuminate the point Pa'. Moreover, it is possible to illuminate the collecting point Pb by the light exit point 161ab, but it is not possible to illuminate the point Pa'.

For illuminating the point Pa', the sample 32' is to be moved in a plane orthogonal to the optical axis as shown by an arrow mark. The sample 32' is placed on the holding member. Therefore, the holding member is to be moved in the plane orthogonal to the optical axis.

As mentioned above, the sample shape measuring apparatus 180 includes the scanning mechanism 181 as the holding member. By moving the sample 32' by the scanning mechanism 181, it is possible to illuminate the point Pa'. At this time, since the collecting point Pa is not illuminated, it is possible to measure the amount of inclination only at the point Pa'.

The collecting point Pa is positioned in the region DAa'. Therefore, scanning by the scanning mechanism is to be carried out such that the overall region DAa' is scanned by the collecting point Pa.

Moreover, the collecting point Pb is positioned in the region DAb'. An area of the region DAa' and an area of the region DAb' are equal. Therefore, when scanning of the region DAa' is carried out by the collecting point Pa, scanning of the region DAb' is carried out by the collecting point Pb automatically. Similar is true for the region DAc' and other regions.

According to the sample shape measuring apparatus of the present embodiment, even when the light exit points are positioned discretely, it is possible to carry out continuously the measurement of the amount of inclination at the surface and the measurement of the surface shape by measurement at one time, for the whole sample.

In the sample shape measuring apparatus of the present embodiment, it is preferable to change a position of the illumination light emerged from the light exit point group.

According to the sample shape measuring apparatus of the present embodiment, even when the light exit points are positioned discretely, it is possible to carry out continuously the measurement of the angle of inclination at the surface and the measurement of the surface shape by measurement at one time, for the whole sample.

For changing the position of the illumination light emerged from the light exit point group, a digital micro mirror, a Nipkow disk, or an LED array is to be disposed at the position of the light exit point group 161.

A digital micro mirror includes a plurality of minute mirrors. The minute mirrors are arranged in rows two-dimensionally. The minute mirrors, with a diagonal line as an axis, oscillate only by a predetermined angle around the axis. It is possible to change a direction of a mirror surface by the oscillations.

For instance, let the illumination light be irradiated to the sample 32' when the minute mirror is not oscillating. By letting one minute mirror to oscillate, and not letting the other mirrors to oscillate, it is possible to illuminate one point of the sample 32'. By changing the mirror that is to be made to oscillate and the mirrors that are not to be made to oscillate, it is possible to change a position of the illumination light emerged from the light exit point group.

Moreover, the minute mirrors are to be prepared such that a plurality of images of the minute mirrors is formed in the region DAa'. By making such arrangement, it is possible to carry out scanning of the region DAa' with the collecting point Pa by changing an order of the mirrors to be oscillated.

The Nipkow disk has a plurality of minute transmitting portions. The minute transmitting portions are formed helicoidally on an opaque flat plate. By rotating the Nipkow disk, it is possible change the position of the illumination light emerged from the light exit point group.

In the Nipkow disk, a minute transmitting portion is to be arranged such that a plurality of images of the minute transmitting portion is formed in the region DAa'. By making such arrangement, it is possible to carry out scanning of the region DAa' with the collecting point Pa by rotating the Nipkow disk.

The LED array includes a plurality of LEDs having a minute light emitting portion. The LEDs are arranged in rows two-dimensionally. By preparing the same number of LEDs as the light exit point groups, and changing the LED that is to be made to emit light, it is possible to change the position of the illumination light emerged from the light exit point group.

In the LED array, the LEDs are to be prepared such that a plurality of images of the minute light emitting portion is formed in the region DAa'. By making such arrangement, it is possible to carry out scanning of the region DAa' with the collecting point Pa by changing in order the LEDs to be made to emit light.

A sample shape measuring apparatus of the present embodiment includes an illuminating optical system, an observation optical system, a holding member, a detection element, and a processing unit, and the illuminating optical system includes a planar light source, a condenser lens, and an optical member which forms a predetermined illumination region, and the observation optical system includes an objective lens, a collecting lens, and a micro lens array, and the holding member holds a sample and is disposed between the illuminating optical system and the observation optical system, and the optical member is disposed on the planar light source side of the condenser lens, and the predetermined illumination region is set such that an area of a region of the illumination light passing through a pupil of the observation optical system is smaller than an area of the pupil of the observation optical system, and the micro lens array is disposed at a position conjugate with the sample, and the detection element is disposed at a position conjugate with the pupil of the observation optical system, and illumination light irradiated from the illuminating optical system is transmitted through the sample, and light emerged from the sample is incident on the observation optical system, and a plurality of optical regions is formed on the detection element by the micro lens array, and the detection element receives light of the overall optical region for each optical region, and the processing unit computes a position of each optical region, and computes a difference between the position of the optical region and a reference position, for each optical region, and calculates an amount of inclination at a surface of the sample from the difference calculated.

Figure 37:
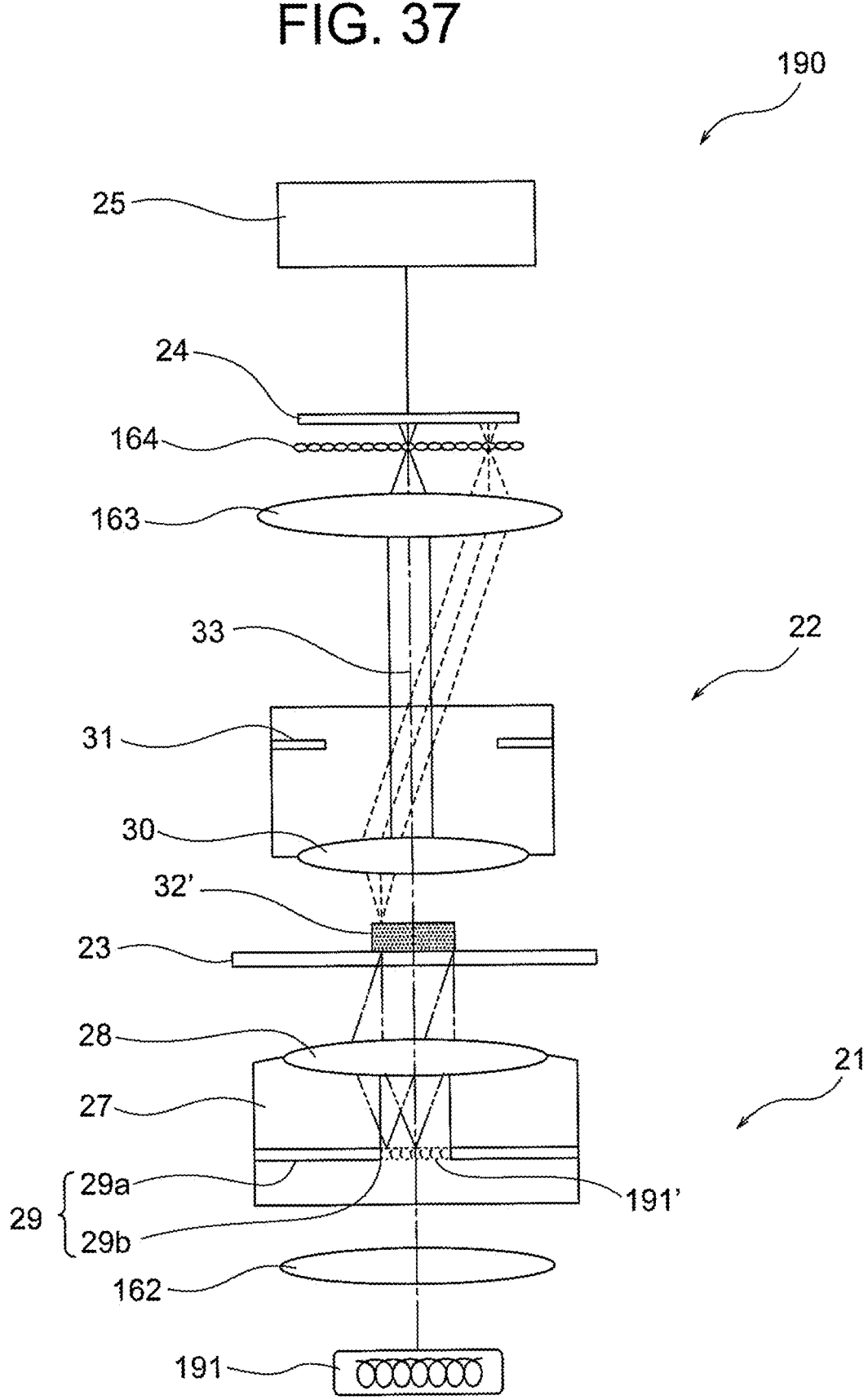
FIG. 37 is a diagram showing an arrangement of a sample shape measuring apparatus of the present embodiment.

FIG. 37 is a diagram showing an arrangement of the sample shape measuring apparatus of the present embodiment. Same reference numerals are assigned to components that are same as in FIG. 31, and the description thereof is omitted.

A sample shape measuring apparatus 190 is an upright microscope for example, and includes the illuminating optical system 21, the observation optical system 22, the holding member 23, the detection element 24, and the processing unit 25.

The illuminating optical system 21 includes a planar light source 191, lens 162, and a condenser 27. The observation optical system 22 includes the objective lens 30, the collecting lens 163, and the micro lens array 164. The pupil 31 of the objective lens is positioned at an interior of the objective lens 30.

As the planar light source 191, light sources such as a halogen lamp, a xenon lamp, a mercury lamp, and a light emitting diode (LED) are available. Illumination light emerges from the planar light source 191. The illumination light passes through the lens 162 and is directed toward the opening member 29.

The opening member 29 includes the light shielding portion 29a and the transmitting portion 29b. In the sample shape measuring apparatus 190, an image of the planar light source 191 (hereinafter, referred to as 'light source image 191'') is formed at a position of the transmitting portion 29b by the lens 162.

A size of the light source image 191' is substantially same as the size of the transmitting portion 29b. The size of the light source image 191' may be larger than the size of the transmitting portion 29b. However, in this case, there is a loss of quantity of the light. For suppressing the loss of quantity of light, it is preferable that the size of the light source image 191' be either substantially same as the size of the transmitting portion 29b or smaller than the size of the transmitting portion 29b.

The opening member 29 is disposed at a pupil position of the condenser 27. Since the light source image 191' is formed at the position of the transmitting portion 29b, illumination by Koehler illumination is carried out. In the Koehler illumination, illumination light emerged from each point of the light source image 191' is irradiated to the sample 32' as a parallel light beam. Accordingly, in the sample shape measuring apparatus 190, the overall sample 32' is illuminated.

Image forming light emerges from each point of the sample 32'. A light-beam diameter of the image forming light is virtually determined by a numerical aperture of the light beam emerged from the sample 32'. When the numerical aperture of the light beam emerging from the sample 32' becomes small, a light-beam diameter of the image forming light passing through the objective lens 30 becomes small.

When it is assumed that no scattering occurs at the sample 32', the numerical aperture of the light beam emerged from the sample 32' can be deemed as a numerical aperture of the illumination light.

In a case in which the size of the light source image 191' is substantially same as the size of the transmitting portion 29b, or in a case in which the size of the light source image 191' is larger than the size of the transmitting portion 29b, the numerical aperture of the illumination light is determined by the size of the transmitting portion 29b.

In a case in which the size of the light source image 191' is smaller than the size of the transmitting portion 29b, the numerical aperture of the illumination light is determined by the size of the light source image 191'.

In the sample shape measuring apparatus 190, the size of the transmitting portion 29b or the size of the light source image 191' are set such that the numerical aperture of the illumination light becomes smaller than the numerical aperture of the objective lens 30.

Therefore, the numerical aperture of the light beam emerging from the sample 32' becomes smaller than the numerical aperture of the objective lens 30. As a result, the light-beam diameter of the image forming light passing through the pupil 31 of the objective lens becomes smaller than the size of the pupil 31 of the objective lens.

In the sample shape measuring apparatus 190, the opening member 29 is positioned on a planar light source 191 side of the condenser lens 28. Moreover, the transmitting portion 29b is set such that the area of the region of the illumination right passing through the pupil of the observation optical system 22 becomes smaller than the area of the pupil of the observation optical system 22. In such manner, in the sample shape measuring apparatus 190, the predetermined illumination region is formed by the transmitting portion 29b. Accordingly, the opening member 29 corresponds to the optical member which forms the predetermined illumination region.

The image forming light emerged from each point of the sample 32' passes through the objective lens 30 and is collected by the collecting lens 163. The micro lens array 164 is disposed at the collecting position. The image forming light passes through the micro lens array 164 and is received by the detection element 24.

In the sample shape measuring apparatus 190, the micro lens array 164 is disposed at a position conjugate with the sample 32'. In other words, the sample 32' and the micro lens array 164 are conjugate by the objective lens 30 and the collecting lens 163.

Moreover, the detection element 24 is disposed at a position conjugate with the pupil of the observation optical system 22. In other words, the pupil 31 of the objective lens and the detection element 24 are conjugate by the collecting lens 163 and the micro lens array 164.

The image forming light is collected at the position of the micro lens array 164. Therefore, the image forming light emerges from the micro lens array 164 while being diverged. As a result, an optical region is formed on the detection element 24.

The micro lens array 164 includes a plurality of minute lens elements. As mentioned above, in the sample shape measuring apparatus 190, the sample 32' is illuminated continuously from the center up to the periphery. Accordingly, the image forming light reaches each of the lens elements. As a result, a plurality of optical regions is formed on the detection element 24.

The axial image forming light passes through a lens element positioned in the middle of the micro lens array 164 and reaches the central portion of the detection element 24. An optical region by the axial image forming light is formed at the central portion of the detection element 24.

The off-axis image forming light passes through the lens element positioned at the periphery of the micro lens array 164 and reaches the peripheral portion of the detection element 24. An optical region by the off-axis image forming light is formed at the peripheral portion of the detection element 24.

As mentioned above, since the light receiving region includes the plurality of light receiving elements, the light receiving region is spread to certain extent. Therefore, even in the sample shape measuring apparatus 190, the image forming light emerged from two adjacent points is incident on one light receiving region.

However, as mentioned above, in the sample shape measuring apparatus 190, the sample 32' is illuminated continuously from the center up to the periphery. This state of illumination is equivalent to a state in which the collecting point Pa and the collecting point Pb in FIG. 36 are illuminated simultaneously.

As shown in FIG. 36, in a case in which there is no inclination on the surface of the sample 32' both at the collecting point Pa and the point Pa', the optical region LAa and the optical region LAa' are formed at a central portion of the detection element 24.

Figure 38:
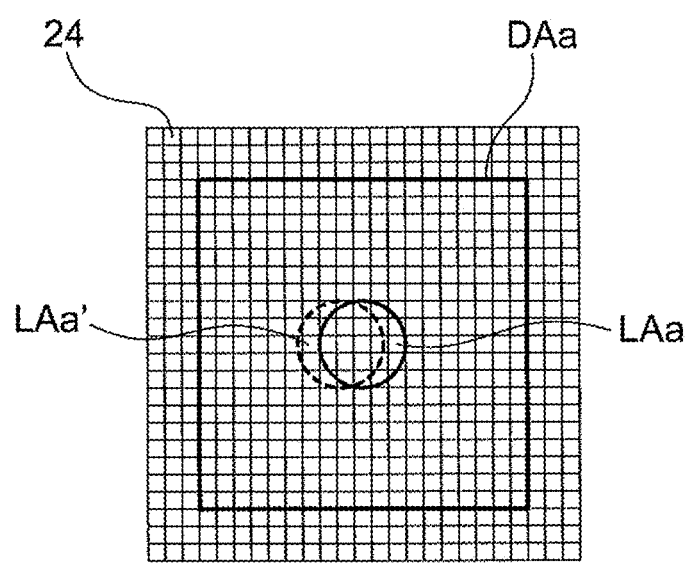
FIG. 38 is a diagram showing positions of two image forming lights viewed from the optical axial direction.

Next, let there be no inclination on the surface of the sample at the collecting point Pa, and let there be an inclination on the surface of the sample at the point Pa'. FIG. 38 is a diagram showing positions of the two image forming lights seen from an axial direction.

In this case, axial image forming light emerged from the collecting point Pa reaches the central portion of the light receiving region DAa as shown by solid lines. As a result, an optical region LAa is formed at the central portion of the light receiving region DAa.

Whereas, image forming light emerged from the point Pa' reaches a position somewhat away from the central portion of the light receiving region DAa as shown by dashed lines. As a result, an optical region LAa' is formed at a position somewhat away from the central portion of the light receiving region DAa.

The collecting point Pa and the point Pa' being in proximity, a portion of the light receiving region LAa' overlaps the optical region LAa. Moreover, the optical region LAa and the optical region LAa' are formed simultaneously on the light receiving region DAa. Therefore, it is not possible to achieve light receiving of the optical region LAa and the optical region LAa' as light, both spatially and temporally.

In such manner, in the sample shape measuring apparatus 190, light receiving of a region in which the optical region LAa and the optical region LAa' are added, are achieved as one optical region. Therefore, a position of the optical region is to be computed from a light receiving element positioned in the optical region LAa and a light receiving element positioned in the optical region LAa'.

The inclination at the collecting point Pa and the inclination at the point Pa' are reflected in the position of the optical region that has been computed. Accordingly, the amount of inclination that has been measured is an amount in which an average of the amount of inclination at the collecting point Pa and the amount of inclination at the point Pa' is taken. Moreover, the sum of the quantity of light received by the light receiving elements is a brightness in which an average of brightness at the collecting point Pa and brightness at the point Pa' is taken.

The point Pa' is positioned near the collecting point Pa, and is a point of launching the image forming light that can form an optical region in the light receiving region DAa. Points such as the point Pa' exist innumerably apart from the point Pa'. Image forming light from these innumerable points is also incident on the light receiving region DAa.

Accordingly, the amount of inclination achieved in the light receiving region DAa is an amount in which an average of the amount of inclination at these innumerable points and the amount of inclination at the collecting point Pa is taken. Moreover, the brightness of the sample achieved at the light receiving region DAa is an average of brightness at these innumerable points and the brightness at the collecting point Pa.

The region DAa' shown in FIG. 36 is a region determined by a range of an image when the light receiving region DAa is projected on the sample 32' side. The region DAa' can be said to be indicating a region in which points such as the point Pa' are included. In the sample shape measuring apparatus 190, the average amount of inclination at the region DAa' and the average brightness at the region DAa' are achieved.

For the regions DAb' and the region DAc', the average amount of inclination and the average brightness are achieved similarly as for the region DAa'. Same type of regions exist around the regions DAa', DAb', and DAc'. Accordingly, by connecting together two-dimensionally the amount of inclination and the brightness at the regions, the amount of inclination and the brightness at the surface of the sample are achieved.

The amount of inclination at the surface of the sample and the brightness of the sample are to be calculated from each of the regions DAa', DAb', and DAc'. Accordingly, in the sample shape measuring apparatus 190, the resolution on the sample side is determined by the size of the region DAa'.

According to the sample shape measuring apparatus of the present embodiment, it is possible to carry out continuously the measurement of the amount of inclination at the surface and the measurement of the sample shape by measurement at one time, for the whole sample.

According to the present embodiment, it is possible to provide a sample shape measuring method and a sample shape measuring apparatus which enable to measure an inclination and a shape of a sample surface with high accuracy, even for a sample for which the reflectance of a surface is low and the surface shape is smooth.

As described heretofore, the present invention is suitable for the sample shape measuring method and the sample shape measuring apparatus which enable to measure the inclination and the shape at the surface of the sample with high accuracy, even for a sample for which the reflectance of a surface is low and the surface shape is smooth.

What is claimed is:

1. A sample shape measuring method, comprising:
   a step of preparing illumination light that is to be passed through a predetermined illumination region;
   a step of irradiating the illumination light to a sample; and
   a predetermined processing step, wherein
   the predetermined illumination region is set such that an area of a region of the illumination light passing through a pupil of an observation optical system is smaller than an area of the pupil of the observation optical system, and
   the illumination light is transmitted through the sample, and
   light emerged from the sample is incident on the observation optical system, and
   the predetermined processing step includes,
   a step of receiving light emerged from the observation optical system,
   a step of computing a position of an image of the predetermined illumination region from light received,
   a step of computing a difference between the position of the image of the predetermined illumination region and a reference position, and
   a step of calculating an amount of inclination at a surface of the sample, from the difference computed.

2. The sample shape measuring method according to claim 1, wherein the light is received at a position of the pupil of the observation optical system.

3. The sample shape measuring method according to claim 1, wherein the light is received at a position conjugate with the pupil of the observation optical system.

4. The sample shape measuring method according to claim 1, wherein
the amounts of inclination are calculated based on a correspondence relationship obtained in advance,
the correspondence relationship is expressed in a lookup table having the position of the image of the predetermined illumination region and the amount of inclination as parameters, and
a correction coefficient is calculated from a ratio of a size of the image of the predetermined illumination region in a state in which the sample is not there and a size of the image of the predetermined illumination region in a state in which the sample is there, and
data of the lookup table is corrected by using the correction coefficient.

5. The sample shape measuring method according to claim 1, wherein
the amounts of inclination are calculated based on a correspondence relationship obtained in advance,
the correspondence relationship is expressed by an expression having the position of the image of the predetermined illumination region and the amount of inclination as parameters, and
a correction coefficient is calculated from a ratio of a size of the image of the predetermined illumination region in a state in which the sample is not there and a size of the image of the predetermined illumination region in a state in which the sample is there, and
an expression having the position of the image of the predetermined illumination region and the amount of inclination as parameters is corrected by using the correction coefficient.

6. The sample shape measuring method according to claim 1, wherein a position of the sample is adjusted along the optical axis such that the size of the image of the predetermined illumination region in the state in which the sample is there, coincides with the size of the image of the predetermined illumination region in the state in which the sample is not there.

7. The sample shape measuring method according to claim 6, wherein
a boundary of the predetermined illumination region has either a convex portion or a concave portion, and
the convex portion or the concave portion has a boundary which is formed by two straight lines intersecting at an angle not more than 90 degrees.

8. The sample shape measuring method according to claim 1, wherein the following conditional expression (1) is satisfied:

$$0<\sigma<0.9 \tag{1}$$

where,
$\sigma$ is expressed by $\sigma=NA_{ill}/NA_{ob}$, and here
$NA_{ill}$ denotes a numerical aperture of illumination light passed through the predetermined illumination region, and
$NA_{ob}$ denotes a numerical aperture on a sample side of the observation optical system.

9. The sample shape measuring method according to claim 1, wherein the light quantity distribution of the illumination light is such that a quantity of light becomes gradually smaller in a direction away from the optical axis.

10. A sample shape measuring apparatus, comprising:
an illuminating optical system,
an observation optical system,
a holding member,
a detection element, and
a processing unit, wherein
the illuminating optical system includes a light source, a condenser lens, and an optical member which forms a predetermined illumination region, and
the observation optical system includes an objective lens, and
the holding member holds a sample and is disposed between the illuminating optical system and the observation optical system, and
the optical member is disposed on a light source side of the condenser lens, and
the predetermined illumination region is set such that an area of a region of the illumination light passing through a pupil of the observation optical system is smaller than an area of the pupil of the observation optical system, and
illumination light irradiated to the sample by the illuminating optical system is transmitted through the sample, and
light emerged from the sample is incident on the observation optical system, and
the detection element receives light emerged from the observation optical system, and
the processing unit
computes a position of an image of the predetermined illumination region from light received, and
computes a difference between the position of the image of the predetermined illumination region and a reference position, and
calculates an amount of inclination at a surface of the sample from the difference computed.

11. The sample shape measuring apparatus according to claim 10, wherein the detection element is disposed at a pupil position of the observation optical system.

12. The sample shape measuring apparatus according to claim 10, wherein the detection element is disposed at a position conjugate with a pupil of the observation optical system.

13. The sample shape measuring apparatus according to claim 10, wherein
the amounts of inclination are calculated based on a correspondence relationship obtained in advance,
the processing unit has a lookup table having the position of the image of the predetermined illumination region and the amount of inclination as parameters,
calculates the amount of inclination by using the lookup table, and
a correction coefficient is calculated from a ratio of a size of the image of the predetermined illumination region in a state in which the sample is not there and a size of the image of the predetermined illumination region in a state in which the sample is there, and
data of the lookup table is corrected by using the correction coefficient.

14. The sample shape measuring apparatus according to claim 10, wherein
the amounts of inclination are calculated based on a correspondence relationship obtained in advance,
the processing unit has an expression having the position of the image of the predetermined illumination region and the amount of inclination as parameters, and
a correction coefficient is calculated from a ratio of a size of the image of the predetermined illumination region in a state in which the sample is not there and a size of the image of the predetermined illumination region in a state in which the sample is there, and an expression having the position of the image of the predetermined illumination region and the amount of inclination as parameters is corrected by using the correction coefficient.

15. The sample shape measuring apparatus according to claim 10, wherein a position of the holding member is adjusted along the optical axis such that the size of the image of the predetermined illumination region in the state in which the sample is there, coincides with the size of the image of the predetermined illumination region in the state in which the sample is not there.

16. The sample shape measuring apparatus according to claim 15, wherein
a boundary of the predetermined illumination region has either a convex portion or a concave portion, and
the convex portion or the concave portion has a boundary which is formed by two straight lines intersecting at an angle not more than 90 degrees.

17. The sample shape measuring apparatus according to claim 10, wherein the following conditional expression (1) is satisfied:

$$0<\sigma<0.9 \qquad (1)$$

where,
$\sigma$ is expressed by $\sigma = NA_{ill}/NA_{ob}$, and here
$NA_{ill}$ denotes a numerical aperture of illumination light passed through the predetermined illumination region, and
$NA_{ob}$ denotes a numerical aperture on a sample side of the observation optical system.

18. The sample shape measuring apparatus according to claim 10, wherein the light quantity distribution of the illumination light is such that a quantity of light becomes gradually smaller in a direction away from the optical axis.

19. A sample shape measuring apparatus, comprising:
an illuminating optical system,
an observation optical system,
a holding member,
a detection element, and
a processing unit, wherein
the illuminating optical system includes a light source, a condenser lens, and an optical member which forms a predetermined illumination region, and
the observation optical system includes an objective lens, and
the holding member holds a sample and is disposed between the illuminating optical system and the observation optical system, and
the detection element is disposed at one of a pupil position of the observation optical system and a position conjugate with the pupil position of the observation optical system, and
the optical member is disposed on a light source side of the condenser lens, and
the predetermined illumination region is set not to include an optical axis at a pupil position of the illuminating optical system and is set such that illumination light is irradiated to a portion at an inner side of a pupil at the pupil position of the observation optical system and to an outer edge of the pupil of the observation optical system, at the pupil position of the observation optical system, and
the illumination light irradiated to the sample by the illuminating optical system is transmitted through the sample, and
light emerged from the sample is incident on the observation optical system, and
the detection element receives light emerged from the observation optical system, and
the processing unit
calculates a quantity of light based on light received, and
computes one of a difference between the quantity of light and a reference light quantity and a ratio of the quantity of light and a reference light quantity, and
calculates an amount of inclination at a surface of the sample, from one of the difference and the ratio.

* * * * *